US012196297B2

(12) United States Patent
Mathers

(10) Patent No.: US 12,196,297 B2
(45) Date of Patent: Jan. 14, 2025

(54) HYDROMECHANICAL SYSTEMS AND DEVICES

(71) Applicant: Mathers Hydraulics Technologies Pty Ltd, Bridgeman Downs (AU)

(72) Inventor: Norman Ian Mathers, Brisbane (AU)

(73) Assignee: Mathers Hydraulics Technologies Pty Ltd, Bridgeman Downs (AU)

( * ) Notice: Subject to any disclaimer, the term of this patent is extended or adjusted under 35 U.S.C. 154(b) by 0 days.

(21) Appl. No.: 18/255,511

(22) PCT Filed: Nov. 30, 2021

(86) PCT No.: PCT/AU2021/051427
§ 371 (c)(1),
(2) Date: Jun. 9, 2023

(87) PCT Pub. No.: WO2022/115904
PCT Pub. Date: Jun. 9, 2022

(65) Prior Publication Data
US 2024/0034144 A1    Feb. 1, 2024

Related U.S. Application Data

(60) Provisional application No. 63/121,649, filed on Dec. 4, 2020.

(51) Int. Cl.
*F16H 39/32* (2006.01)
*B60K 6/12* (2006.01)
*F16H 61/4096* (2010.01)

(52) U.S. Cl.
CPC ............... *F16H 39/32* (2013.01); *B60K 6/12* (2013.01); *F16H 61/4096* (2013.01); *B60K 2006/126* (2013.01)

(58) Field of Classification Search
CPC ............................ F16H 39/32; F16H 61/4096
See application file for complete search history.

(56) References Cited

U.S. PATENT DOCUMENTS 10,788,112 B2 * 9/2020 Mathers ................. F16D 31/00
2011/0056195 A1   3/2011 Lloyd
2017/0370360 A1   12/2017 Sutton

FOREIGN PATENT DOCUMENTS

| CN | 116710682 A | 9/2023 | |
| WO | WO-9641067 A1 * | 12/1996 | ............. F04C 14/20 |
| WO | WO-2011011682 A2 | 1/2011 | |
| WO | WO-2016116809 A1 * | 7/2016 | ............. B60K 17/10 |
| WO | WO-2018161108 A1 * | 9/2018 | .......... F01C 21/0809 |

(Continued)

OTHER PUBLICATIONS

"International Application Serial No. PCT/AU2021/051427, International Search Report mailed Jan. 31, 2022", 5 pgs.

(Continued)

*Primary Examiner* — Thomas E Lazo
(74) *Attorney, Agent, or Firm* — Schwegman Lundberg & Woessner, P.A.

(57) ABSTRACT

Systems and apparatuses are disclosed that include a plurality of hydraulic vaned devices arranged in-line with one another such as along a drive line of a vehicle. Various system operation modes achieved by such devices in the in-line arrangement are also disclosed.

18 Claims, 65 Drawing Sheets

(56) References Cited

FOREIGN PATENT DOCUMENTS

WO     WO-2022115904 A1     6/2022
WO     WO-2022115904 A9     6/2022

OTHER PUBLICATIONS

"International Application Serial No. PCT/AU2021/051427, Written Opinion mailed Jan. 31, 2022", 6 pgs.
"European Application Serial No. 21899336.8, Extended European Search Report mailed Apr. 17, 2024", 6 pgs.
"International Application Serial No. PCT/AU2021/051427, International Preliminary Report on Patentability mailed Jun. 15, 2023", 8 pgs.

\* cited by examiner

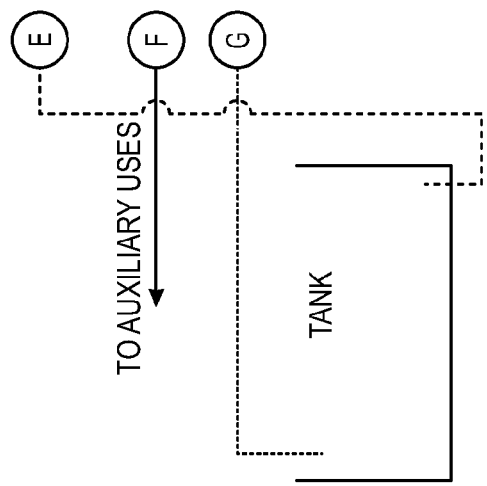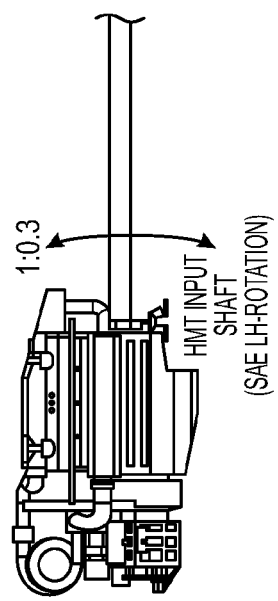
FIG. 11A (CONTINUED)

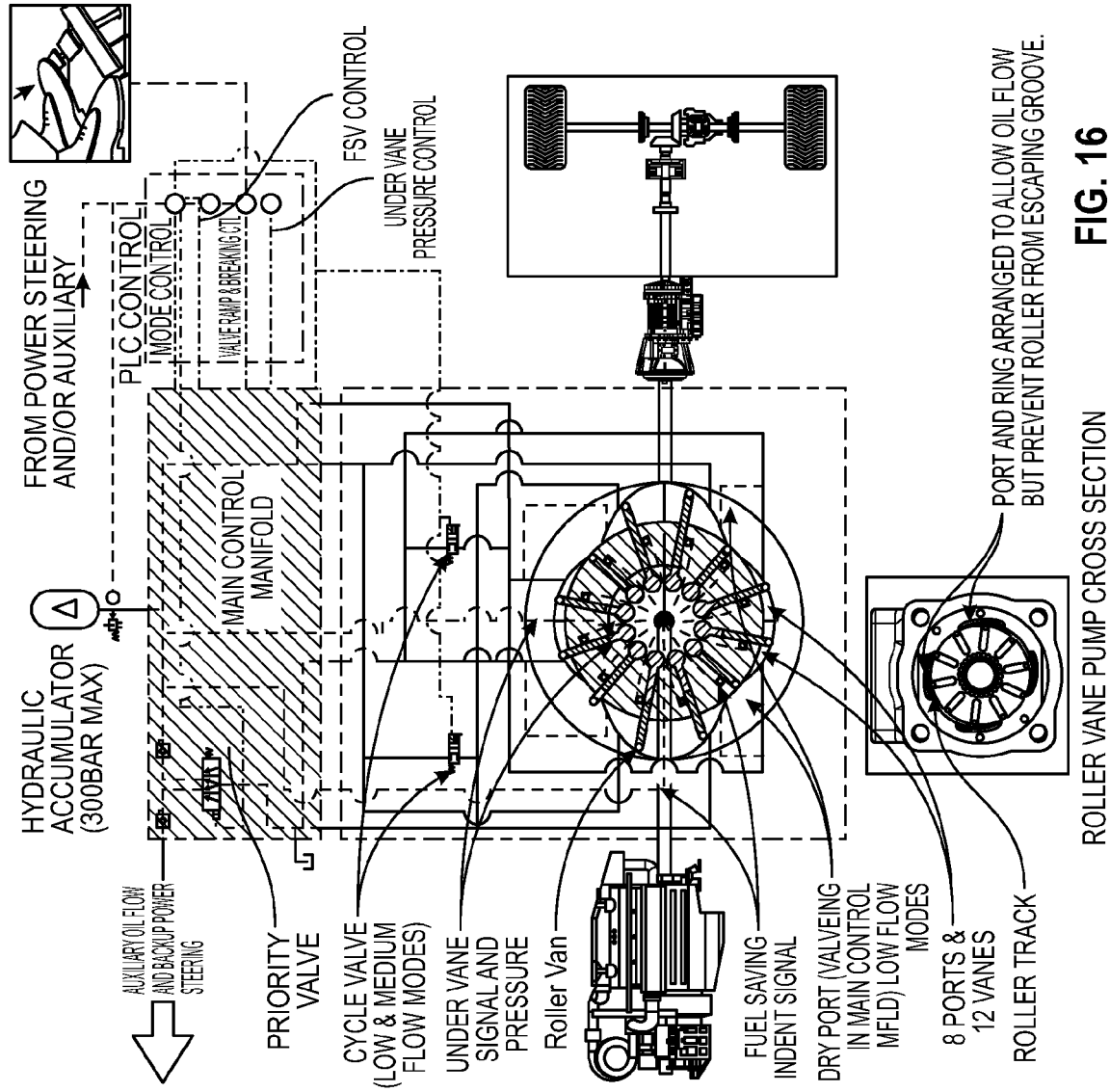

HYDROMECHANICAL SYSTEMS AND DEVICES

CROSS REFERENCE TO RELATED APPLICATIONS

The present application is a U.S. National Stage Filing under 35 U.S.C. 371 from International Application No. PCT/AU2021/051427, filed on Nov. 30, 2021, and published as WO 2022/115904 A1 on Jun. 9, 2022, which application claims the benefit of priority to U.S. Patent Application Ser. No. 63/121,649, filed Dec. 4, 2020, which are incorporated by reference herein.

The present application is related to international application no. PCT/AU2016/050967, publication no. WO/2017/066826, United States publication no. US/2018/0298881, entitled "Turbine Power Storage and Regeneration" filed Oct. 14, 2016; international application no. PCT/IB2010/003161, publication no. WO/2011/061630, United States publication no. US/2013/0067899A1 entitled "Hydrostatic torque converter and torque amplifier" filed Nov. 19, 2010; international application no. PCT/AU2007/000772, publication no. WO/2007/140514, United States publication no. US/2010/0028181A1 entitled "Vane Pump for Pumping Hydraulic Fluid," filed Jun. 1, 2007; international application no. PCT/AU2006/000623, publication no. WO/2006/119574, United States publication no. US/2008/0310988A1, entitled "Improved Vane Pump," filed May 12, 2006; international application no. PCT/AU2004/00951, publication no. WO/2005/005782, United States publication no. US/2006/0133946A1, entitled "Hydraulic Machine," filed Jul. 15, 2004; U.S. patent application Ser. No. 13/510,643, publication no. U.S. 2013/0067899, entitled "Hydraulically Controlled Rotator Couple," filed Dec. 5, 2012; international application no. PCT/AU2020/050389, application as yet unpublished, entitled TIDAL POWER HARNESSING, STORAGE AND REGENERATION SYSTEM AND METHOD," filed Apr. 22, 2020; U.S. Provisional patent application Ser. No. 62/945,946, entitled "HYDRAULIC DEVICE CONFIGURED AS A STARTER MOTOR", filed Dec. 10, 2019, and U.S. Provisional patent application Ser. No. 63/079,842, entitled "MULTI-CHAMBER CONFIGURATION FOR HYDRAULIC VANE DEVICE", filed Sep. 17, 2020, the entire specification of each of which is incorporated herein by reference in their entirety.

TECHNICAL FIELD

This document pertains generally, but not by way of limitation, to a hydraulic devices and systems utilizing such devices.

BACKGROUND

Rotary couplings are utilized in vehicles, industrial machines, and marine applications to transmit rotating mechanical power. For example, they have been used in automobile transmissions as an alternative to a mechanical clutch. Use of rotary couplings is also widespread in applications where variable speed operation and controlled start-up without shock loading of the power transmission system is desired.

OVERVIEW

Various apparatuses, systems and methods are disclosed that can utilize an arrangement of in-line (series) hydraulic devices. Thus, the present application contemplates a system or assembly of a plurality of hydraulic devices coupled together along a drive shaft. Such an arrangement allows for various operation modes and capability as further discussed herein. One or more of the hydraulic devices disclosed herein can optionally be configured to be operable as a starter motor for an engine. The plurality of hydraulic devices can also be configured to be selectively operable as hydrostatic coupling, as a vane pump, etc. as further discussed herein.

The present inventor has recognized that traditional torque converters slip when subjected to high torque and low or no travel speed, such as when a backhoe drives forward and uses its bucket to break into a heap of material. Slippage can waste energy, lowering efficiency and creating high heat. Traditional hydrostatic drives are designed to provide a minimum displacement when operating as a pump and a maximum displacement when operating as a motor. Again, such operation characteristics can have low efficiency.

Hydraulic devices utilizing vanes sometimes called hydraulic vane devices, vane pumps, power split couplings or vane couplings have been developed. These are also called hydromechanical devices in the present document. For simplicity such devices with vanes are simply referred to as hydraulic devices in some instances herein. Because of their capability to operate as a starter motor, occasionally one or more of the hydraulic devices discussed herein may be referred to as a starter motor. However, it is understood these hydraulic devices have other operational capability and are not limited to operation as a starter motor as further discussed herein. The hydraulic devices when arranged in-line (series) along a drive shaft can offer improved power density and service life as compared to traditional variable piston pump/motor hydraulic devices and indeed even standard vane pumps. The systems using the hydraulic devices are sometimes referred to as Mather's Hydraulic Transmission (MHT) herein.

The present inventor has also recognized that in-line (series) arrangements of the plurality of the hydraulic devices can achieved various operations modes that can adapt to various operation conditions as further discussed herein. Some of these operation modes can be achieved with greater efficiency than have been achieved using a digitally controlled piston pump (also referred to as a pump motor in my prior patents and patent applications) such as was contemplated in several of my prior patent applications such as PCT/IB2010/003161 and PCT/IB2016/000090, for example. Other operation modes achieved by the in-line (series) arrangements of the plurality of the hydraulic devices disclosed herein could not be achieved with use of the digitally controlled piston pump in combination with my hydraulic device as discussed in PCT/IB2010/003161 and PCT/IB2016/000090.

The in-line (series) arrangements of the plurality of the hydraulic devices can achieve various goals including greater fuel efficiency, reduced pollution, higher traction and in some cases can supplement or eliminate certain components such as a mechanical transmission used in various vehicles.

Taking public transportation or trucking as an example, the systems disclosed herein can Provide High Efficiency Automatic Transmission with Dynamic Braking Power Regeneration on Buses and Trucks. The systems can enable STOP-START on Large on-road Diesel Engines via Dual Displacement Hydraulic Devices acting as Starter Motors Placed In-line (series) With Drive Line. The systems can Contribute to the European Manufacturers association (ACEA) objective of a 20% reduction in $CO_2$ emissions by 2025 on both Trucks and Bus. The systems can provide Diesel or Gas engines free movement in dense traffic to reduce industrial pollution.

The in-line (series) arrangements of the plurality of the hydraulic devices can be mounted between a power source (e.g., engine, motor, etc.) and drive gears such as a transmission. The systems contemplate the use of storage devices such as accumulator(s) that can be used to store hydraulic energy for when it is needed (such as at engine start) with starter motor operation.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 16 is a system diagram illustrating various aspects of the hydraulic device and operation thereof in further detail.

DETAILED DESCRIPTION

Figure 1:
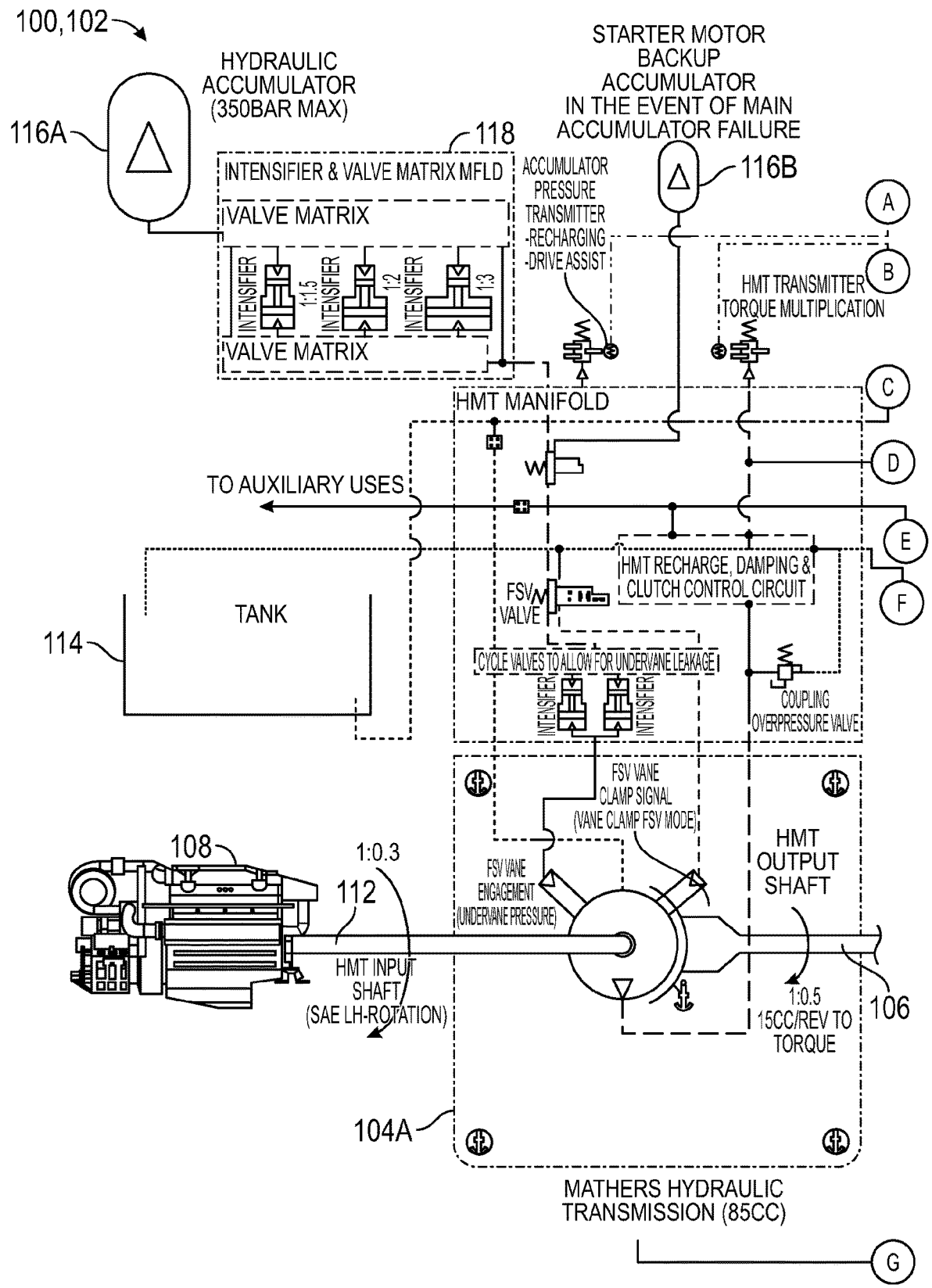
FIG. 1 is a system diagram of components of a vehicle including a plurality of hydraulic devices arranged in-line (series) with a drive shaft and between an engine and a transmission according to an embodiment.
Figure 1:
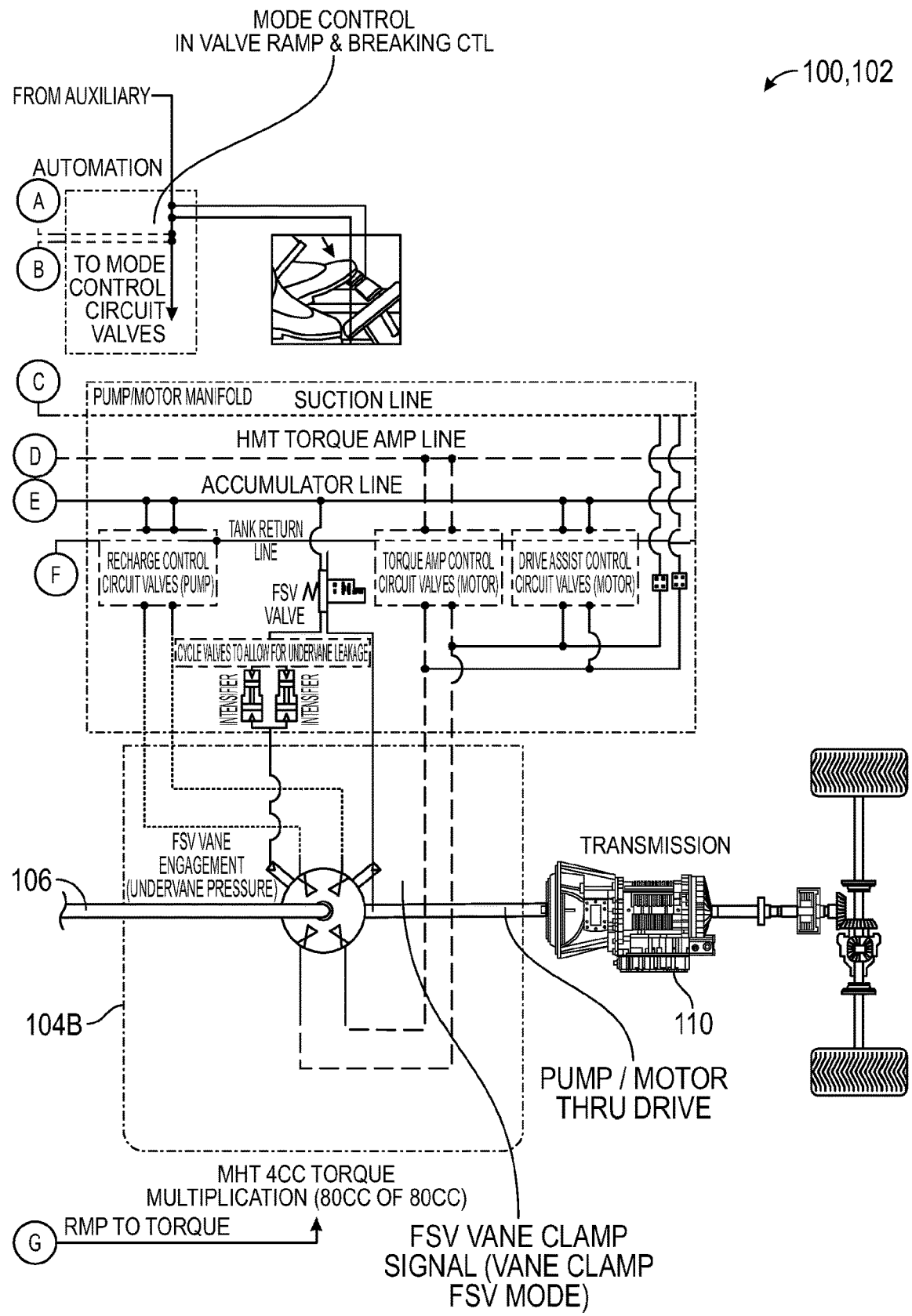
Figure 2:
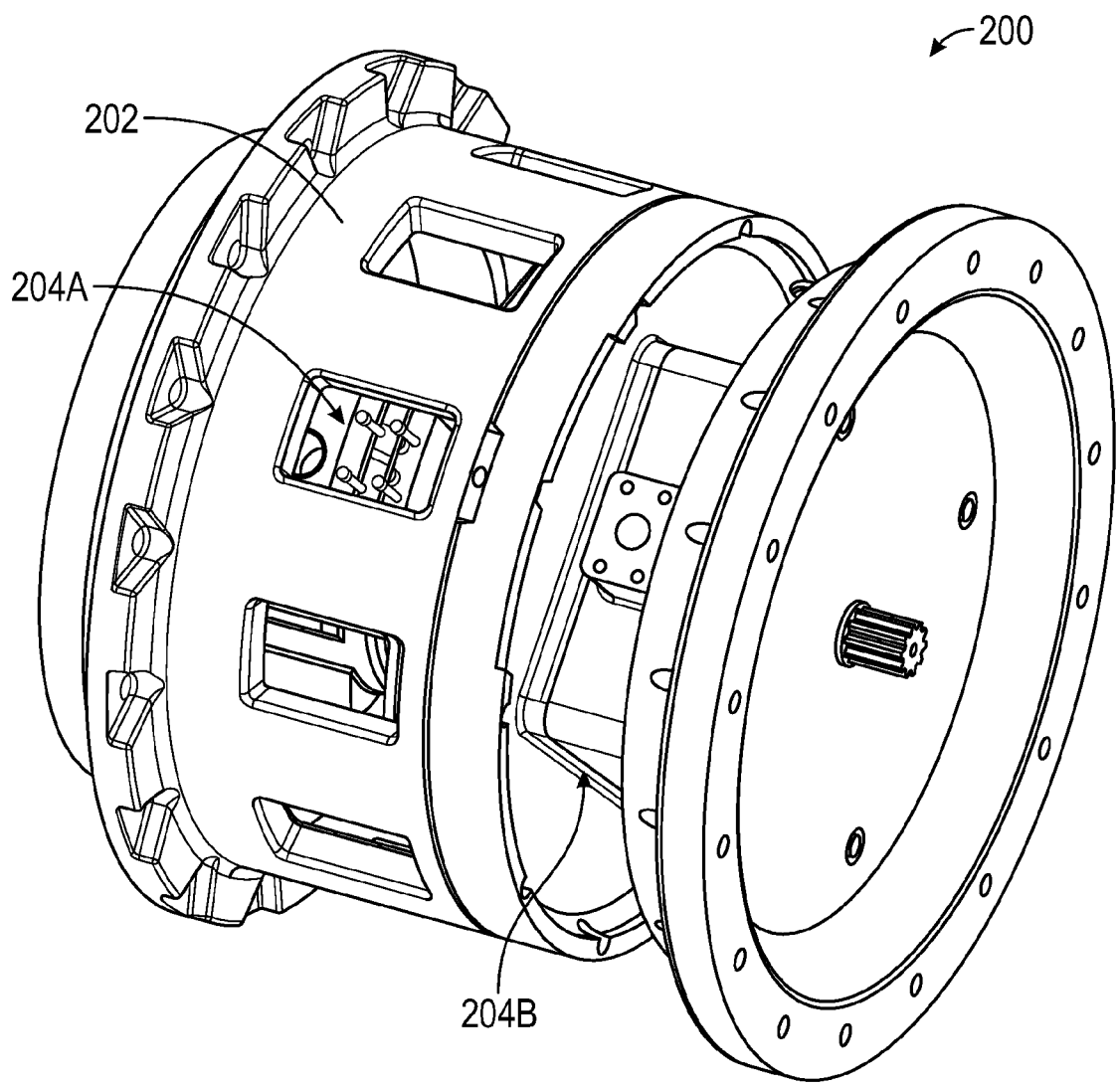
FIG. 2 is a perspective view of an assembly of the plurality of hydraulic devices of FIG. 1 according to an embodiment.

The present application relates apparatuses, systems and methods that can utilize a plurality of hydraulic devices arranged in-line (series) (series) along a drive shaft. The hydraulic devices can also be configured to be operable as a hydrostatic coupling, as a vane pump and/or as a power split coupling as further described herein and in my prior patent applications discussed and incorporated herein by reference above.

As used herein and in the FIGURES:
MHT—Mathers Hydrodynamic Transmission (one or more of the systems described herein using the plurality of hydraulic devices).
RPM—Revelations per Minute
FSV—Fuel Savings Vane's (Vane Clamping)

According to some examples, the hydraulic device can be part of a system and can allow the system to operate in various operation modes and with various accessories. Examples of some of these operation modes are detailed below. Additional examples contemplate that the fluid communicating interior portions of the system including, for example, the plurality of hydraulic devices, the plurality of accessories, and the transmission can be coated in a diamond or diamond-like carbon. This can allow more environmentally friendly hydraulic fluids such as glycol or water-glycol to be used by the system.

As used herein the term "vehicle" means virtually all types of vehicles such as earth moving equipment (e.g., wheel loaders, mini-loaders, backhoes, dump trucks, crane trucks, transit mixers, etc.), waste recovery vehicles, marine vehicles, industrial equipment (e.g., mining or agricultural equipment), personal vehicles, public transportation vehicles (e.g., buses), and commercial road vehicles (e.g., heavy road trucks, semi-trucks, etc.). Although described in reference to vehicles, the systems, apparatuses and methods herein can also be used in power generation without the use of powering a vehicle. The present application also relates to systems and techniques for turbine power storage and regeneration that use the hydraulic devices such as a power split coupling. As used herein the term "turbine" unless otherwise described can connote either a wind turbine or a tidal turbine. The following detailed description includes examples intended to be illustrative of the subject matter disclosed herein and are in no way intended to be limiting. Features and steps described in relation to one or more examples may be combined with the subject matter of other examples and methods provided in this disclosure. The following examples are sufficient to enable one of skill in the art to practice the systems and techniques described in the following detailed description.

As discussed herein, the in-line (series) arrangement of the plurality of hydraulic devices can be operatively coupled to a power generation device (e.g., a motor, an engine, a turbine rotor, etc.) by an input shaft and to another device (a transmission, a generator, etc.) with an output shaft. The in-line (series) arrangement of the plurality of hydraulic devices can be configured to transmit torque to the output shaft at an adjustable torque ratio of the input shaft. The in-line (series) arrangement of the plurality of hydraulic devices can divert hydraulic fluid in response to the output shaft exceeding a threshold power, torque, or angular velocity. By diverting hydraulic fluid, the power transmitted to the device (e.g., transmission, generator, etc.), and accordingly the power produced by that device can be adjusted in a more controlled an efficient manner.

FIG. 1 shows a system 100 diagram of components of a vehicle 102 including a plurality of hydraulic devices 104A, 104B arranged in-line (series) with a drive shaft 106 and between an engine 108 and a transmission 110 according to an embodiment.

As is known from my prior applications incorporated herein by reference the plurality of hydraulic devices can be operatively coupled between a power source (e.g. the engine 108) and the transmission 110 or other gear box. For instance, the engine can include an output shaft 112. This output shaft can be an input to a first of the plurality of hydraulic devices 104A. Optionally, the plurality of hydraulic devices can divert hydraulic fluid under high pressure to a storage vessel (e.g. a tank 114, a first accumulator 116A, a second accumulator 116B, etc.). The hydraulic fluid stored under high pressure can be used for auxiliary power purposes including, but not limited to, supplying high pressure hydraulic fluid to engine and/or one or more of the plurality of hydraulic devices for power generation or regeneration, pumping fluid, supplying cooling fluid to components of the vehicle, or the like.

The plurality of hydraulic devices 104A, 104B can each include one or more inlet ports and one or more outlet ports. In some cases, the inlet port can be coupled to the reservoir (e.g., the tank 114, first accumulator 116A, second accumulator 116B, etc.) to communicate the hydraulic fluid from the reservoir to the plurality of hydraulic devices 104A, 104B. A hydraulic storage conduit can couple the plurality of hydraulic devices to the hydraulic storage vessel. The high pressure hydraulic fluid can be stored at high pressure in the storage vessel. For instance, high pressure hydraulic fluid can be hydraulic fluid at pressures including, but not limited to, 20 bar, 100 bar, 300 bar, 350 bar, 500 bar, or other pressure. The hydraulic storage conduit can include at least one cutoff valve or valve matrix 118 located along the hydraulic storage conduit between the plurality of hydraulic devices 104A, 104B and the hydraulic storage vessel. The communication of hydraulic fluid from the plurality of hydraulic devices 104A and the hydraulic storage vessel can be interrupted or stopped where the cutoff valve and/or valve matrix 118 is in the closed position. Closing the cutoff valve and/or valve matrix can prevent reverse flow of hydraulic fluid from the hydraulic storage vessel (e.g., the first accumulator 116A, second accumulator 116B, etc.) to the plurality of hydraulic devices 104A, 104B.

In an example, the system 100 includes various conduits as labeled. In an example, the hydraulic fluid can include, but is not limited to water, glycol, ethylene glycol, a water glycol mixture, hydraulic oil, or the like. The plurality of hydraulic devices can operate with water as a fluid medium for transmitting torque from the input shaft to the output shaft resulting in cost savings over more expensive fluids. Couplings, fittings, hoses, conduits, and the like can leak hydraulic fluid in the course of normal operation. The use of water as the hydraulic fluid can result in an environmentally friendly solution. In an example, glycol or ethylene glycol can be added to water to form the water glycol mixture. For instance, the water glycol mixture can include a lower freezing point and a higher boiling point than pure water.

In the example of FIG. 1, the reservoir can include a fluid storage tank 114 for holding the hydraulic fluid at low pressures, such as atmospheric pressure. The reservoir can provide hydraulic fluid for cooling various components of the system 100 and/or vehicle 102 including for vessels (e.g., the first accumulator 116A, second accumulator 116B, etc.) storing the hydraulic fluid at high pressure generated by the plurality of hydraulic devices 104A, 104B. In an example, where the hydraulic fluid from the reservoir is not stored under high pressure, it can be returned to the reservoir. For instance, where the hydraulic fluid is circulated in a cooling circuit.

The hydraulic storage vessel (e.g., the first accumulator 116A, second accumulator 116B, etc.) can be configured to store high pressure hydraulic fluid for long durations of time. For instance, the hydraulic storage vessel can contain pressures of up to 350 bar for hours, days, weeks, or months. In the example of FIG. 1 the hydraulic storage vessel is a hydraulic accumulator. The accumulator can be charged with a gas or a liquid, such as nitrogen gas or liquid nitrogen, to increase the storage pressure of the accumulator. In an example, the stored hydraulic fluid can provide up to 1 megawatt of power or more.

The circuits shown can circulate hydraulic fluid (e.g., from the reservoir) in a conduit. In the example, the hydraulic fluid diverted to or from particular ones of the plurality of hydraulic devices.

As previously described, the plurality of hydraulic devices 104A, 104B can include an input shaft from the engine and are arranged in-line along the drive shaft 106 coupled to the transmission 110 (if utilized). The plurality of hydraulic devices 104A, 104B can separate the drive shaft or drive line (motor thru drive) into a plurality of distinct input shafts and an output shafts. One or more of the plurality of hydraulic devices 104A and/or 104B can have an output shaft and an input shaft according to some examples. However, it is also contemplated that one or more of the hydraulic devices 104A, 104B can be configured to provide for a thru shaft (common shaft) without having a distinct input shaft or output shaft according to some examples.

The torque applied to the output shaft can be adjusted according to an adjustable torque ratio by the hydraulic device 104A, 104B of the input shaft. In an example, the torque of the output shaft can be reduced according to the adjustable torque ratio by one or more of the plurality of hydraulic devices 104A, 104B. Displacing hydraulic fluid through an outlet port of one or more of the plurality of hydraulic devices 104A, 104B can decrease the adjustable torque ratio (i.e., reduce the amount of torque on the output shaft in relation to the torque of the input shaft.

Figure 3:
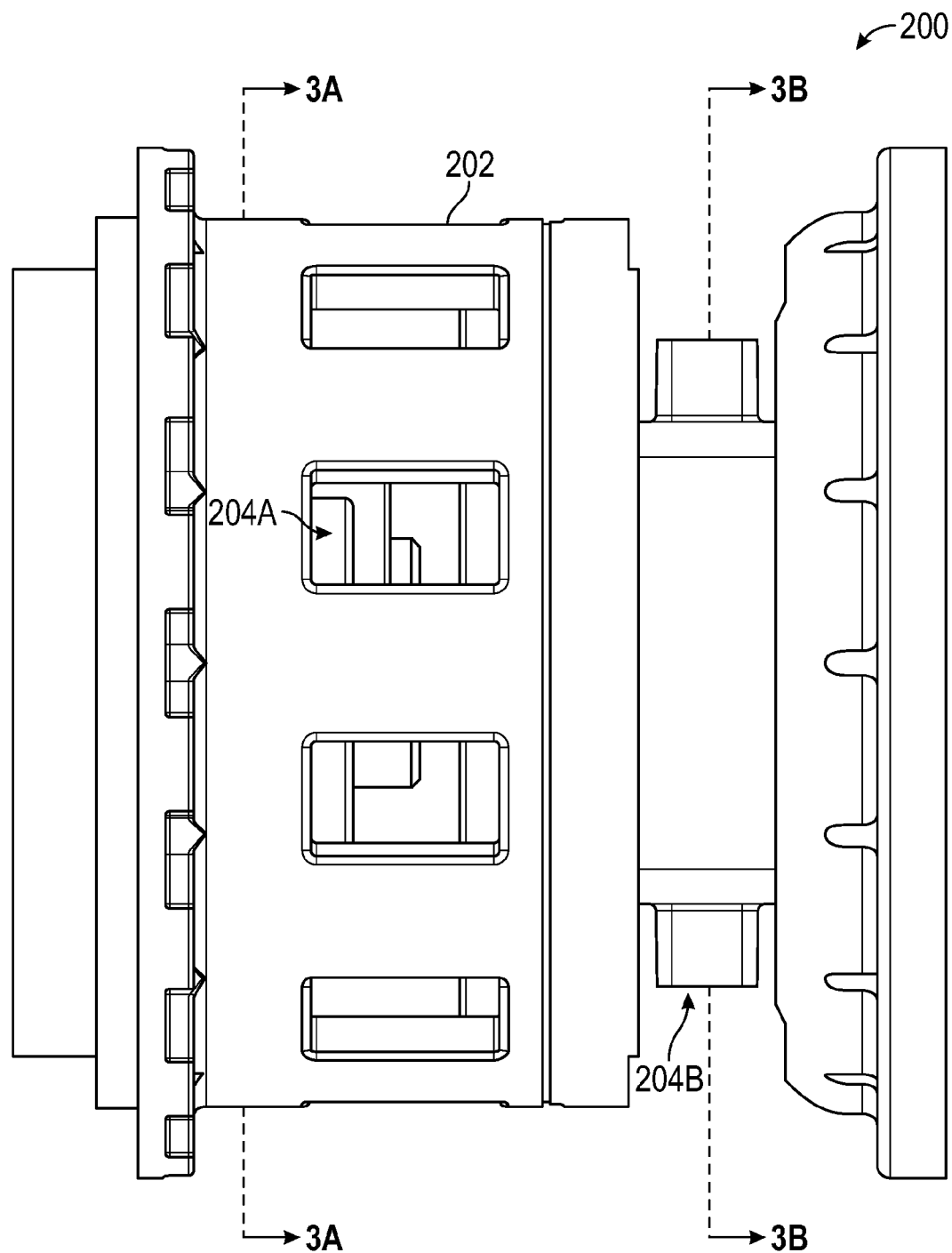
FIG. 3 is a plan view of the assembly of the plurality of hydraulic devices of FIG. 2.
Figure 3A:
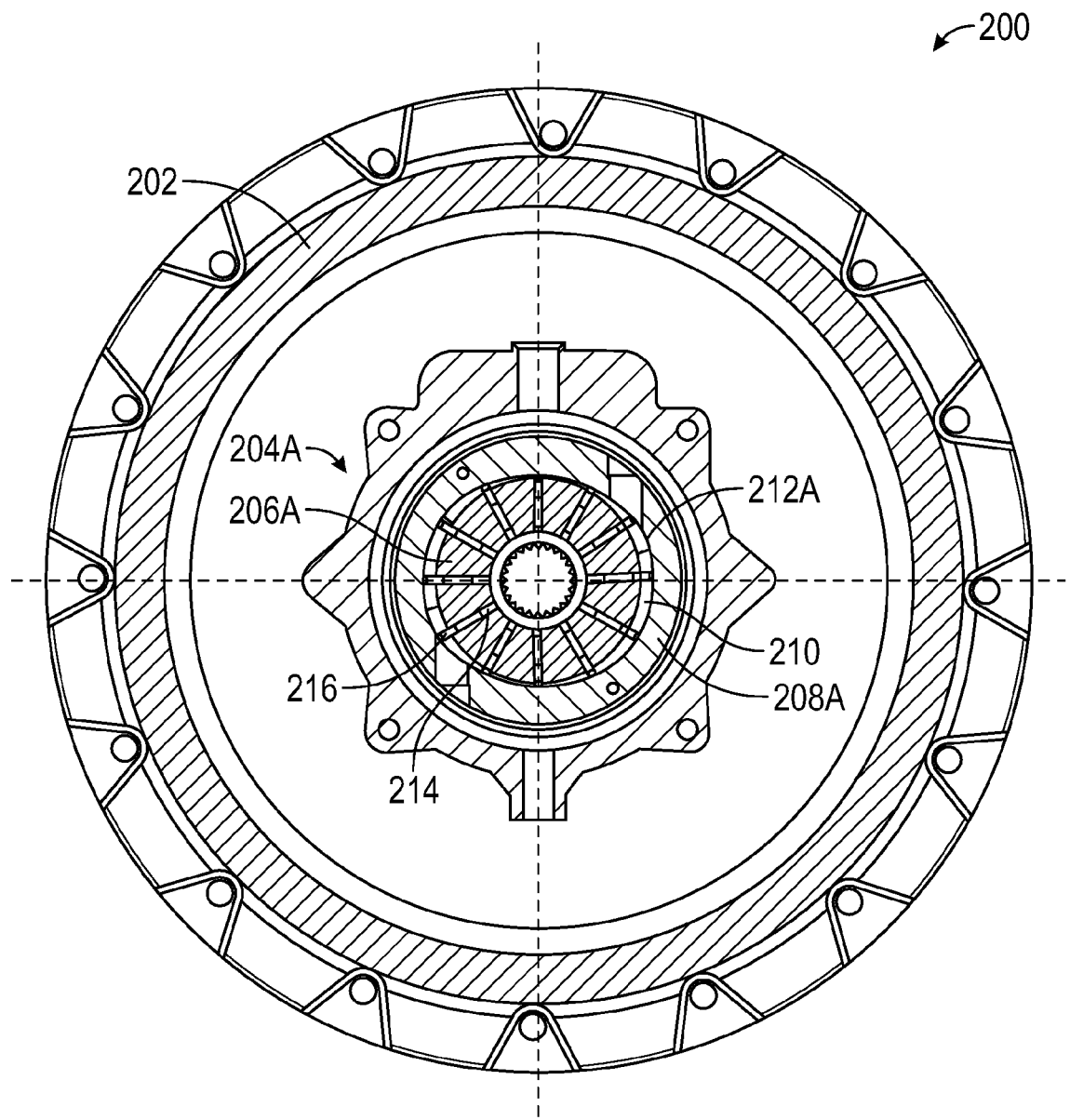
FIG. 3A is a cross section view of the plurality of hydraulic devices of along a line A-A of FIG. 3.
Figure 3B:
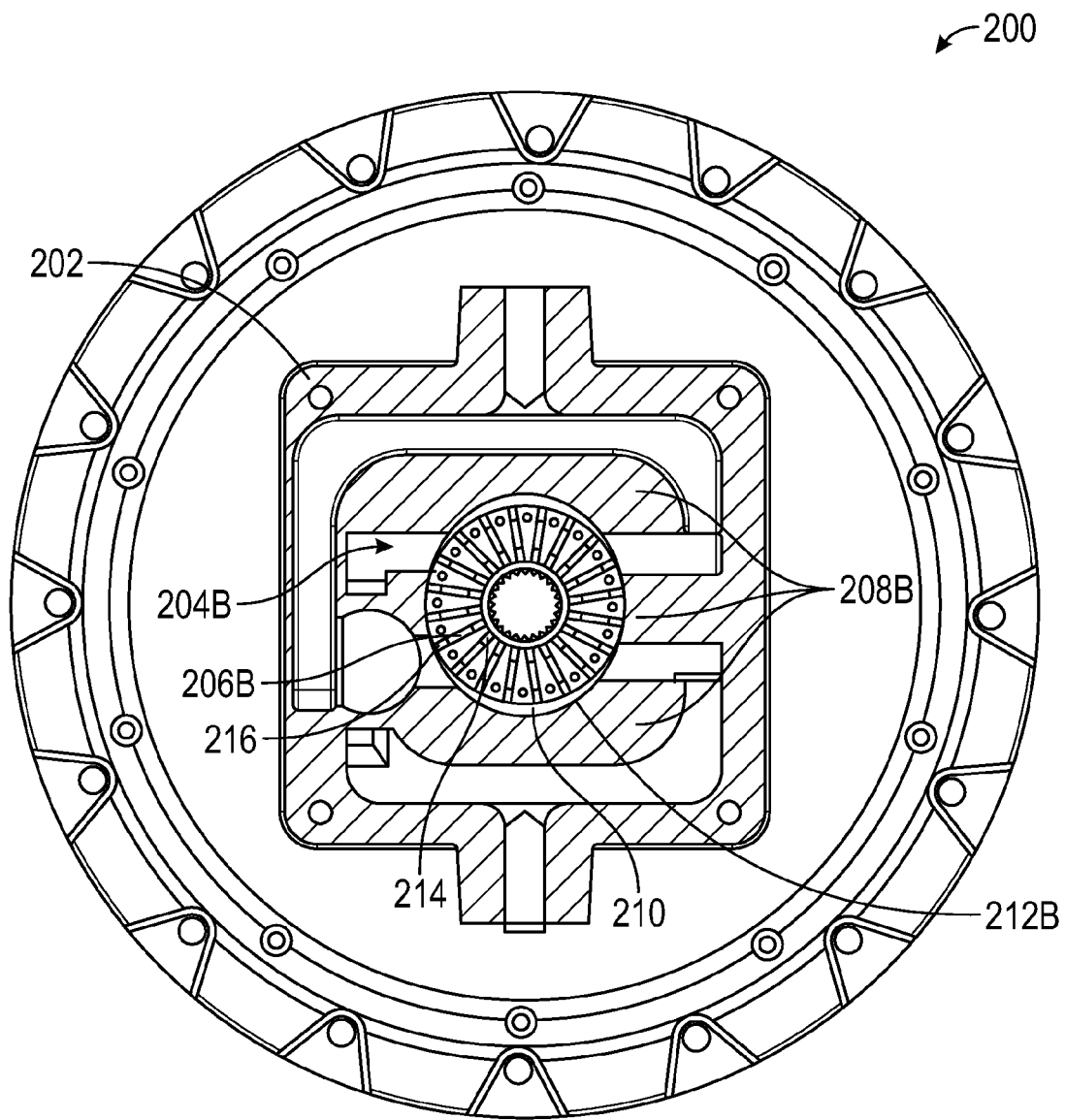
FIG. 3B is a cross section view of the plurality of hydraulic devices of along a line B-B of FIG. 3.
Figure 4:
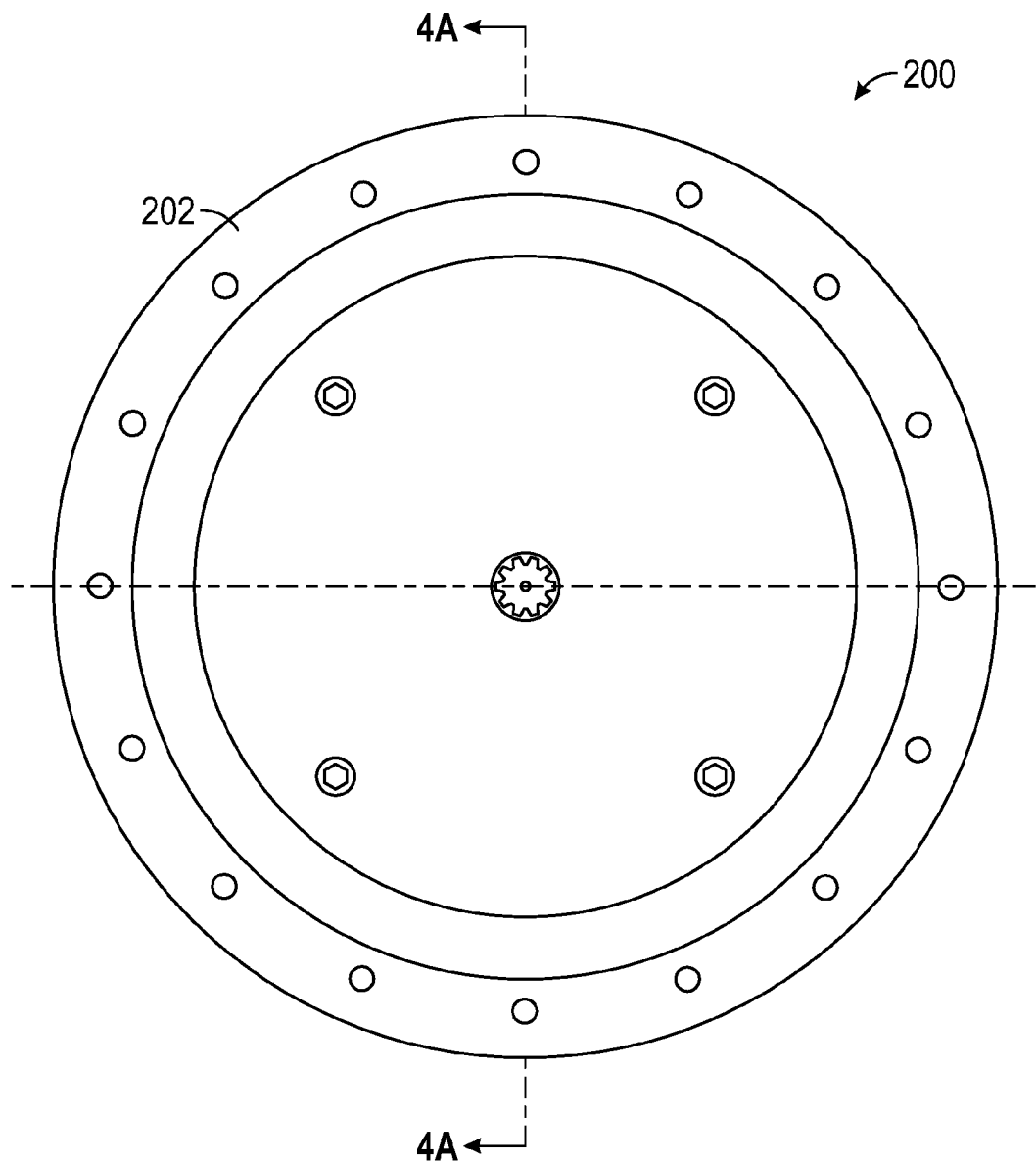
FIG. 4 is an axial end view of the assembly of the plurality of hydraulic devices of FIG. 2.
Figure 4A:
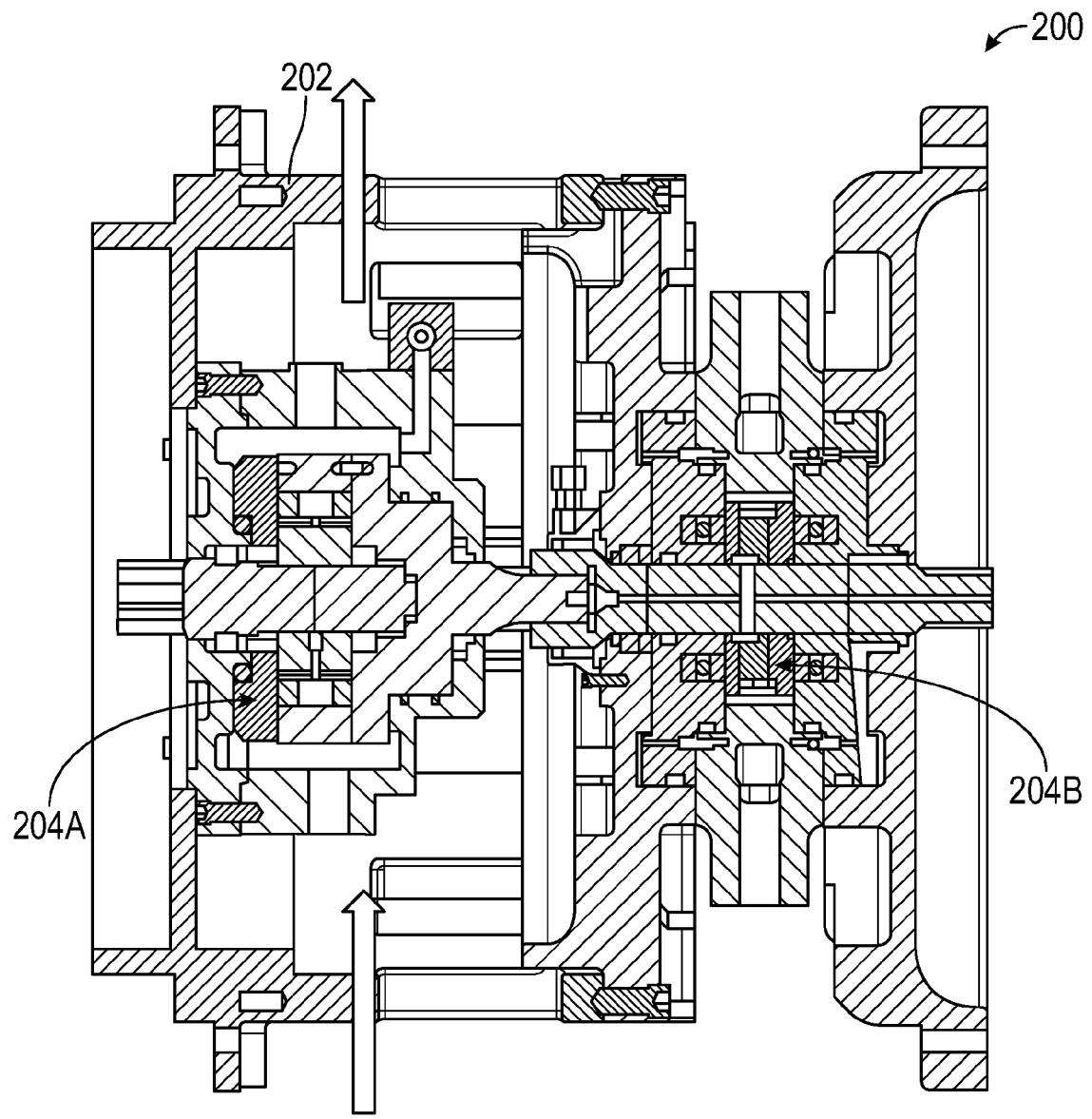
FIG. 4A is a cross section view of the plurality of hydraulic devices of along a line A-A of FIG. 4.

FIGS. 2-4A show an assembly 200 of the plurality of hydraulic devices 204A, 204B according to one embodiment. These devices can utilize a common housing 202 according to some examples. As shown in FIGS. 3A, 3B and 4A, a rotor hub 206A, 206B (shown in various ones of FIGS. 2-4A and described herein) can be fixably attached to the input shaft 208 (or thru shaft) in some case. The rotor hub 206A, 206B can be rotatable within a cam ring 208A, 208B. In an example, the cam ring 208A, 208B can be fixably attached to an input or output shaft (such as with the closest of the hydraulic devices to the engine). However, this is not always the case such as when one or more of the hydraulic devices 204A, 204B is configured to be utilized with a thru shaft. The plurality of hydraulic devices 204A, 204B can have a through drive mode, pumping mode, power split mode, and other modes, etc. as further discussed herein. In the through drive mode, the rotor hub 206A, 206B and the cam ring 208A, 208B rotate in a substantially fixed 1:1 ratio (i.e., the output torque is substantially equal to the input torque). The power split mode, the plurality of hydraulic devices 204A, 204B can mitigate excess power or shock being applied to the system. For instance, adjustable torque ratio of the plurality of hydraulic devices 204A, 204B can be adjusted so the torque of the drive shaft is constant where there can be variation of torque applied to the input shaft or vice versa.

In an example, the plurality of hydraulic devices can include the common housing 202. The cam ring 208A, 208B and rotor hub 206A, 206B can be disposed within the housing 202. The hydraulic fluid can be included in a cavity 210 between the housing and the cam ring, input shaft, output shaft, thru shaft or other components for lubrication or coolant.

FIGS. 3A, 3B, 4A and 5B show an example of a cross section view of a hydraulic vane assembly configured as the plurality of hydraulic devices 204A, 204B. It is understood that the further hydraulic vane devices having the multiple chambers, such as those disclosed in FIGS. 6A and 6B herein could be substituted for one or more of the plurality of hydraulic devices shown in FIGS. 2-5B. This substitution can result in differences to the operation of the system.

FIGS. 4A-5B show an embodiment where one of the plurality of hydraulic devices 204A, 204B is configured to allow for a thru shaft (indicated as a motor thru drive in FIG. 1) as previously discussed.

Figure 5:
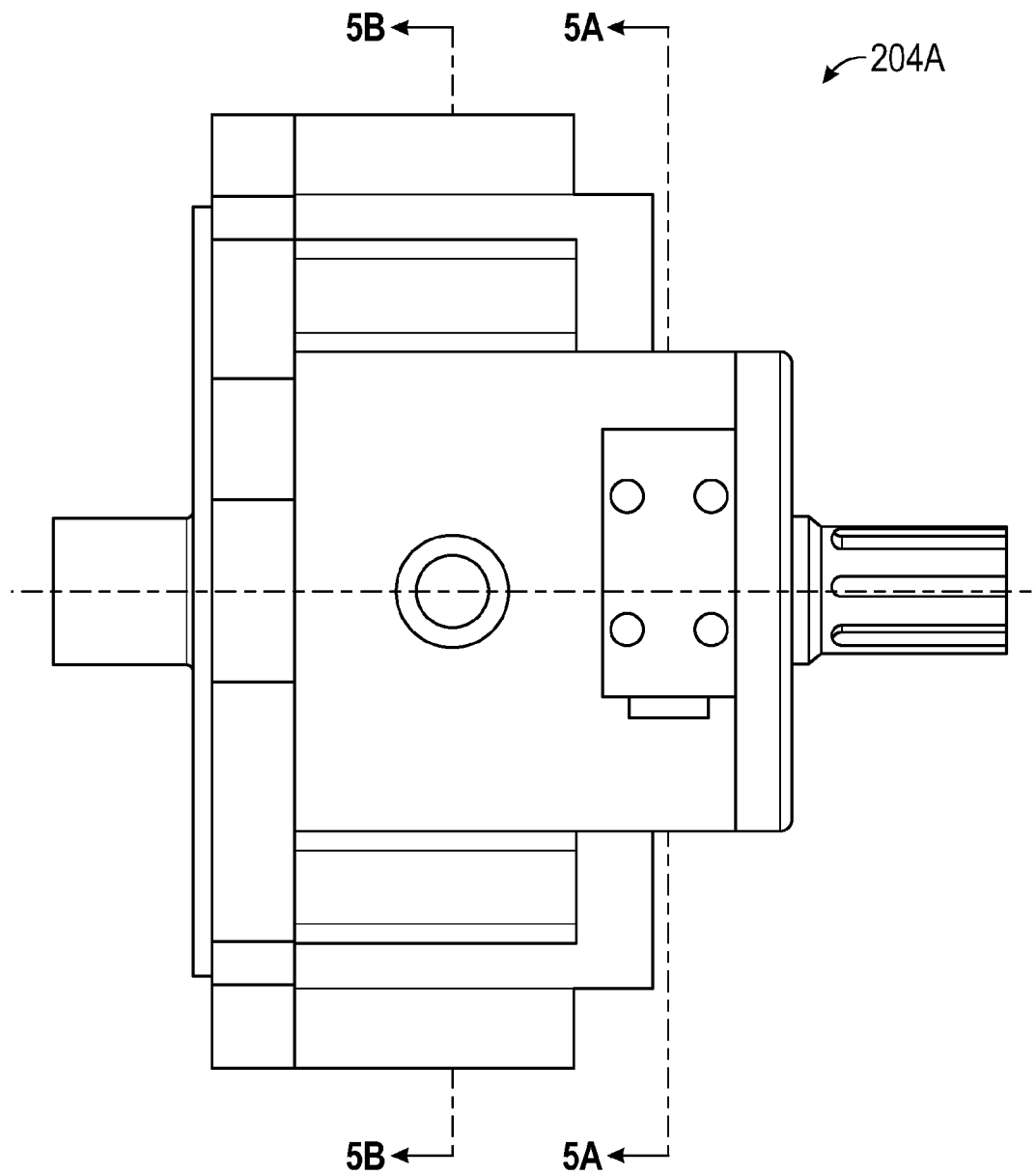
FIG. 5 is a plan view of a portion of the assembly of the plurality of hydraulic devices of FIG. 2 showing components of one of the plurality of hydraulic devices according to an example.
Figure 5A:
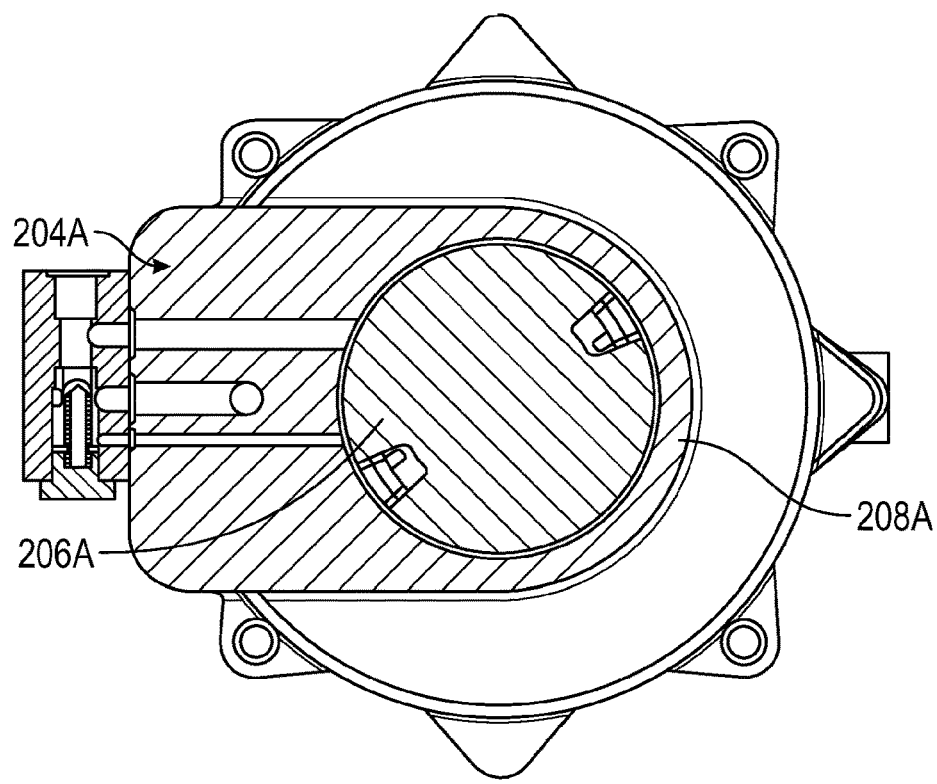
FIG. 5A is a cross section view of the hydraulic device of FIG. 5 of along a line A-A of FIG. 5.
Figure 5B:
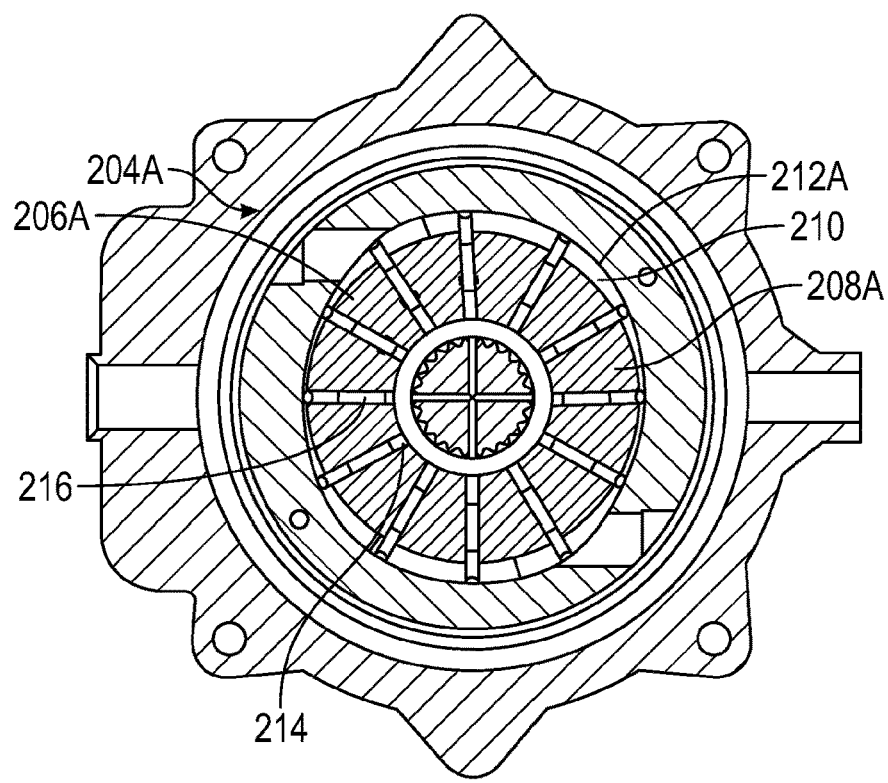
FIG. 5B is a cross section view of the hydraulic device of FIG. 5 of along a line B-B of FIG. 5.

In FIGS. 3A, 3B and 5B, the cross-section view is located perpendicular to the shaft and centered within the rotor hub. The cam ring 208A, 208B includes one or more inlet ports (best shown in FIG. 3B), one or more outlet ports (again best shown in FIG. 3B) and a cam ring surface 212A, 212B (FIGS. 3A and 3B). The cam ring surface 212A, 212B defines the cavity 210, which can be an elliptical shape. This elliptical shape can provide the hydraulic vane device with two chambers. These chambers are defined by the cam ring surface and the rotor hub 206A, 206B within the cavity 210. The one or more inlet ports can extend from the outer portion of the cam ring 208A, 208B and can divide into one or more conduits, each extended to opposite quadrants of the cam ring surface in the examples shown. The one or more outlet ports can extend from the outer portion of the cam ring and divide into one or more conduits, each extended to opposite quadrants of the cam ring surface and adjacent to the inlet port quadrants. The one or more inlet ports and one or more outlet ports can terminate at the cam ring surface forming one or more apertures or ports at least partially defined by the cam ring surface. These internal ports defined the cam ring surface communicate with one of the chambers and are typically referred to as suction and pressure/delivery ports. The suction ports communicate with the one or more outlet ports and the pressure ports communicate with the one or more inlet ports. Thus, the hydraulic vane device 204A, 204B will have two chambers and four internal ports (two inlet port and two outlet ports) as illustrated in FIGS. 3A and 3B.

In one example, the elliptical shape of the cam ring can be symmetrical. Symmetry of the cam ring can balance the forces applied to bearings of the plurality of hydraulic devices. For instance, bearings supporting the input shaft 302 and the output shaft. Balanced forces can extend the life of the plurality of hydraulic devices 204A, 204B as mechanical stress and fatigue are reduced.

The rotor hub 206A, 206B can be located at the center axis of the cam ring surface 212A, 212B. As shown in FIGS. 2-5B, the rotor hub 206A, 206B can include a circular shape sized to fit within the elliptical shape of the cam ring surface 212A, 212B. For instance, the rotor hub 206A, 206B can be sized with a clearance fit to the cam ring surface 212A, 212B, such as a precision running fit to allow for the rotor hub to rotate within the cam ring with minimal clearance. The rotor hub 206A, 206B can include a plurality of circumferentially spaced slots 214 extending radially outward from the center axis of the rotor hub 206A, 206B. Each slot 214 can be sized and shaped to support a vane 216 therein. The inner portion of the slot 214 can include a signal passage in communication with a high pressure fluid.

As shown in the cross-sections, the vane 216 can be located within the slot. The vanes can be extended radially outward from the center axis of the rotor hub 206A, 206B in response to the application of the high pressure fluid to the base of the vane through the signal passage. In an example, the high pressure fluid can be high pressure hydraulic fluid. A tip of the vane 216 can contact the cam ring surface in a fully extended position. Each vane 216 can extend and retract throughout the rotational cycle of the rotor hub 206A, 206B. For instance the tip can be substantially flush with the outer surface of the rotor hub 206A, 206B in a first orientation of the rotor hub and then be displaced to a partially extended position or a fully extended position as the rotor hub rotates from the start of a first quadrant to the start of the second quadrant. In the retracted position, the input shaft can be independently rotatable with respect to the output shaft.

In an example, the tip can include a roller bearing (referred to herein as a roller vane). The roller vane can decrease friction between the vane and the cam ring surface and can be used in a large scale plurality of hydraulic devices (e.g., 200 kilowatts or greater). Where the hydraulic fluid includes an environmentally friendly or non-flammable fluid (such as water glycol), the roller vane can be used to reduce friction between the vane 216 and the cam ring 208A, 208B. The vane 216 can also include a coating to reduce friction, increase corrosion resistance, or reduce wear. For instance, the vane can include a diamond-carbon coating or diamond-dust coating to improve the corrosion resistance of the vane. The coating can be selected from a variety of coatings to reduce friction where a particular hydraulic fluid is used in the plurality of hydraulic devices. The diamond-dust coating can reduce corrosion where water glycol is used in the plurality of hydraulic devices.

As previously stated, each of the plurality of hydraulic devices 204A, 204B can be independently operated in a thru drive mode, a pump mode and a power split mode. It should be noted that the beauty of the disclosed systems with the in-line arrangement of the plurality of hydraulic devices 204A, 204B is that these devices can be operated independently of one another such that one can be in one of the thru drive mode, a pump mode and a power split mode but another can be in another mode of operation. Together as a system the plurality of hydraulic devices 204A, 204B can be operated in tandem to achieve various of the additional system operation modes discussed in reference to FIGS. 7-16. These system operation modes are illustrated in some of the operation modes further illustrated herein.

FIGS. 5-5B show one of the assembly of the hydraulic devices of FIGS. 2-4A. This one hydraulic device can interface with the transmission and can be configured to operate with a thru shaft along the drive line as previously discussed herein and illustrated in the system of FIG. 1.

Figure 6A:
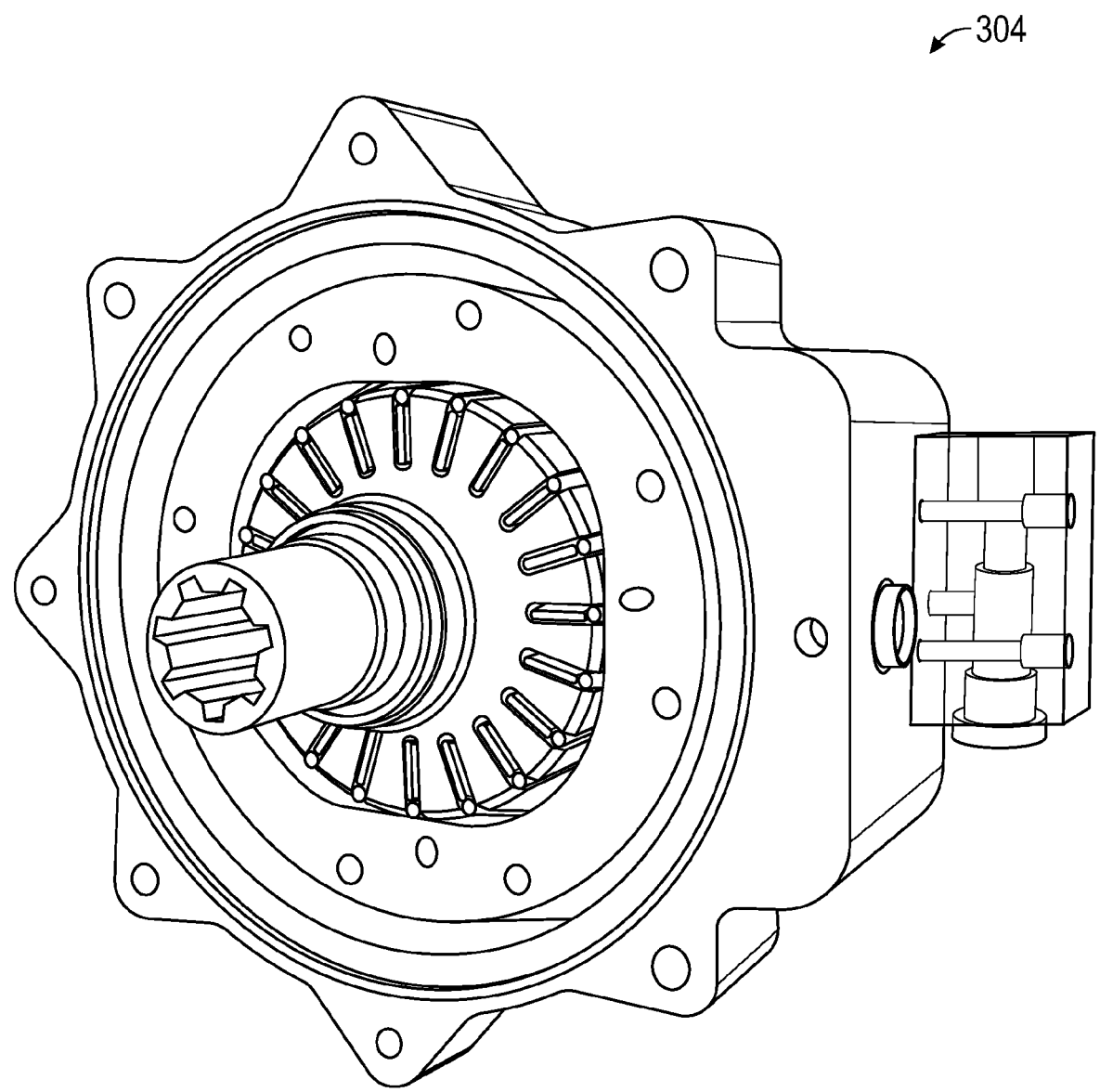
FIG. 6A is a perspective view of an alternative configuration for one or more of the plurality of hydraulic devices as discussed herein.
Figure 6B:
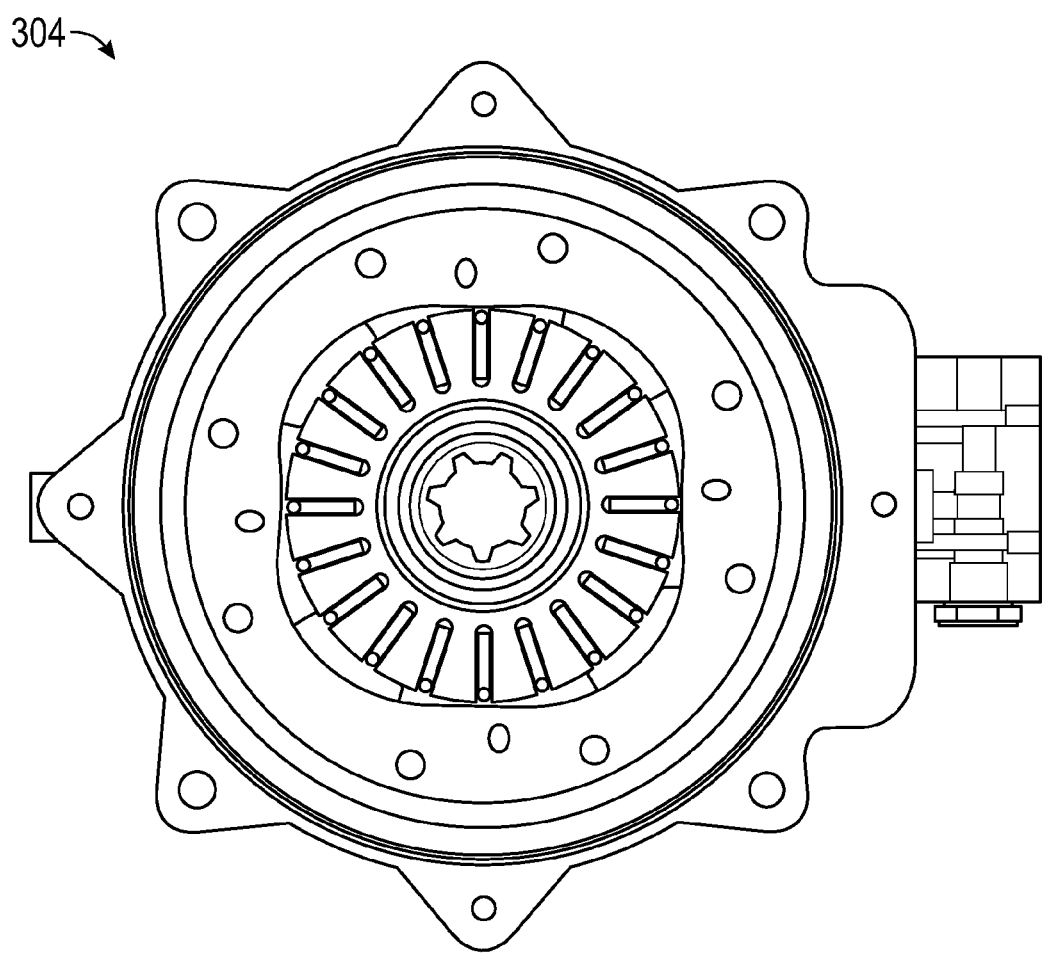
FIG. 6B is a plan view of the hydraulic device of FIG. 6A.

FIGS. 6A and 6B illustrate an alternative construction for the hydraulic vane device 304 according to another example. This hydraulic vane device (or multiple of such devices) can be substituted for any of those of the previous FIGS. 1-5B as desired. This hydraulic vane deice has a similar construction to that of the plurality of hydraulic devices of FIGS. 1-5B in that it can include a rotor hub positioned within a cam ring. However, the hydraulic vane device differs in that the cam ring includes more inlet ports, more outlet ports and is shaped to have at least four chambers.

As a result of the at least four chambers, the hydraulic vane device can have least eight internal ports. However, it should be noted that the embodiment of FIGS. 6A and 6B is exemplary and according to further embodiments five chambers, six chambers, seven chambers, eight chambers, or more are contemplated. Similarly, ten internal ports, twelve internal ports, fourteen internal ports, sixteen internal ports, or more are contemplated. Some of these internal ports can be located axially relative to the vanes rather than radially outward as illustrated.

Further details regarding the construct of the hydraulic device of FIGS. 6A and 6B can be found in my U.S. Provisional patent application Ser. No. 63/079,842, entitled "MULTI-CHAMBER CONFIGURATION FOR HYDRAULIC VANE DEVICE", filed Sep. 17, 2020, the entire specification of which is incorporated herein by reference in its entirety In the through drive mode for one of the hydraulic devices 104A, 104B, 204A, 204B, 304, etc. the input shaft and the output shaft (if utilized) can include a 1:1 adjustable torque ratio. For instance, the input shaft and the output shaft can rotate together (i.e., at the same angular velocity). The hydraulic fluid between the rotor hub and the cam ring can be pressurized by the plurality of hydraulic devices. For instance, where the vane is extended, a pressure can be applied to the hydraulic fluid by the vane. Torque is transferred from the rotor hub to the cam ring by the pressurized hydraulic fluid on the cam ring. The outlet port can be closed (i.e., deadheading). With the hydraulic fluid trapped within the plurality of hydraulic devices, substantially all of the torque from the rotor hub can be transferred to the cam ring. The torque applied to the generator, transmission (or another device) can be substantially equal to the torque of the input shaft. The plurality of hydraulic devices 104A, 104B, 204A, 204B, 304, etc. can operate in the thru drive mode where the power applied to the input shaft is lower than the rated power of the transmission, generator, etc. Efficiency of the engine can be maximized by operating the plurality of hydraulic devices 104A, 104B, 204A, 204B, 304, etc. in the thru drive mode where the engine power is below the rated power of the gear of the transmission.

In the power split mode (such as illustrated in FIG. 1 and other FIGURES herein), the outlet port can be open or partially open. Hydraulic fluid can exit the plurality of hydraulic devices 104A, 104B, 204A, 204B, 304, etc. through the outlet port. The pressure of the hydraulic fluid between the rotor hub and the cam ring can be reduced as a result of the exiting (diverted) hydraulic fluid. Accordingly, less than substantially all of the input shaft torque can be transferred to the output shaft. In an example, the volume between vanes in the inlet quadrants of the cam ring increase as the rotor hub rotates within the cam ring. The volume between the vanes in the outlet quadrants of the cam ring decrease as the rotor hub rotates within the can ring. The increasing volume in the inlet quadrants draws the hydraulic fluid into the plurality of hydraulic devices. For instance, the increasing volume can generate a negative pressure that draws hydraulic fluid into the plurality of hydraulic devices. The decreasing volume in the outlet quadrants can increase the pressure of the hydraulic fluid, for instance, by compressing the hydraulic fluid. A portion of the hydraulic fluid in the outlet quadrant can be diverted through the outlet port in response to the power transferred from the input shaft to the output shaft exceeding a threshold level (e.g., a maximum rated generator power). The diverted hydraulic fluid can be stored under pressure (e.g., the pressure at which the hydraulic fluid exits the plurality of hydraulic devices) and stored in the storage vessel. Stated another way, the hydraulic fluid exiting the plurality of hydraulic devices can be high pressure hydraulic fluid.

The adjustable torque ratio of the plurality of hydraulic devices can be adjusted to provide a desired output shaft condition including but not limited to, an output shaft torque, power, rotational speed, or the like. The difference in the torque of the input shaft and the torque of the output shaft is proportional to the volume of high pressure hydraulic fluid diverted from the plurality of hydraulic devices. For instance, the outlet port can include an adjustable valve. An orifice of the adjustable valve can be adjusted to increase or decrease the flow rate of fluid flowing through the outlet port. Increasing the flowrate of hydraulic fluid through the outlet port can decrease the amount of torque transferred from the input shaft to the output shaft. In an example, the extension of the vane can be controlled with mechanisms as known in my prior patents to achieve the desired output shaft condition. The position of the tip of the vane can be adjusted to a location flush with the outer surface of the rotor hub, a location in contact with the cam ring, or any location therebetween. The adjustable torque ratio can be controlled by any number of mechanical or electromechanical devices including, but not limited to, an electric motor, servo, flow control valve, mechanical linkage, hydraulic motor, hydraulic system, pneumatic motor, pneumatic system, or the like. In an example, the adjustable torque ratio can be controlled by a computer in communication with the electromechanical device.

In an example, the stored hydraulic fluid can be supplied under high pressure to a second or more of the hydraulic vane devices to increase the power produced by the system to the transmission. For instance, where the power applied to the transmission is below an ideal gear ratio for the transmission, additional power can be supplied to the transmission from one or more of the hydraulic vane devices along the drive line. This can increase the efficiency of the vehicle as energy is not wasted operating the transmission inefficiently at a speed(s) that it is not optimally designed to operate at.

In an example, one or more of the hydraulic devices can be configured to reduce the power transmitted to the transmission. This could be used to prevent damage to the transmission, prevent wheel spinning, prevent the transmission from operating in an inefficient gear, etc. In the power split mode, power generated is not wasted by reducing the power transmitted by the transmission. Instead, excess power can be stored as high pressure fluid to be used at another time or location, such as used to provide additional power to the transmission as needed or to provide additional power to engine (e.g., such as to start the motor in a starter motor operation). In an example, the plurality of hydraulic devices can smooth the torque and/or power transmitted from the input shaft to the output shaft. For instance, an inconsistent input shaft torque can be converted to a constant output shaft torque by the plurality of hydraulic devices. In an example, the energy efficiency of the plurality of hydraulic devices can be 90% or greater. In comparison, a piston pump can have an energy efficiency of only 70%. The plurality of hydraulic devices can operate at power capacities over of less than one megawatt or more than one megawatt, such as two megawatts, three megawatts, or more.

FIGS. 7-16 show various systems, vehicles and modes operation of such systems. FIG. 7A shows a system 400 with an arrangement of four hydraulic devices 404A, 404B, 404C and 404D in-line along the drive line of a vehicle 402. Three of the four hydraulic devices 404B, 404C and 404D are configured for operating with a thru shaft as shown.

Figure 8A:
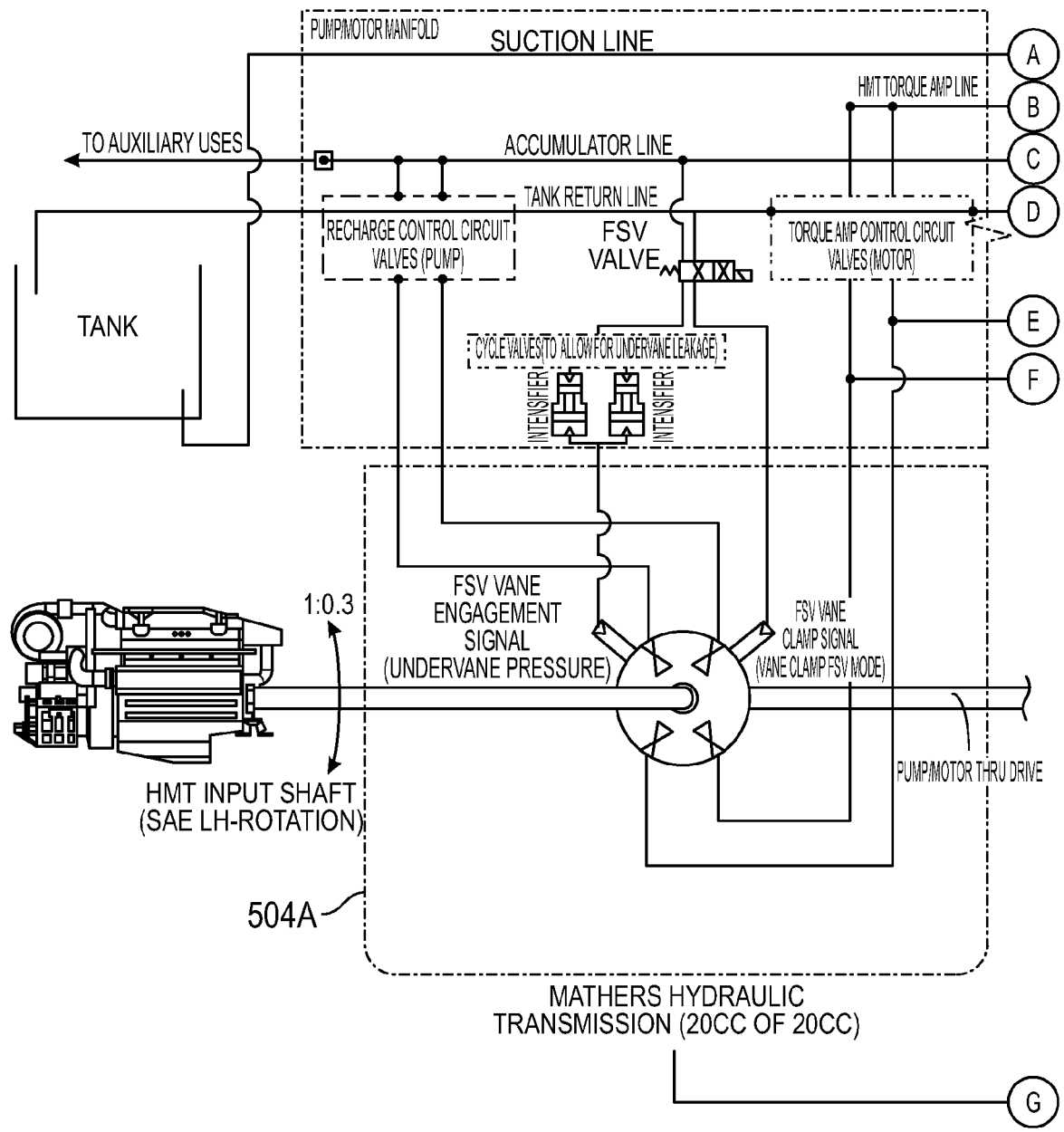
FIG. 8A is a system diagram of components of a vehicle including one hydraulic device of one configuration arranged in-line (series) with two hydraulic devices of a different configuration (such as those of FIGS. 6A and 6B) according to an embodiment.
Figure 8A:
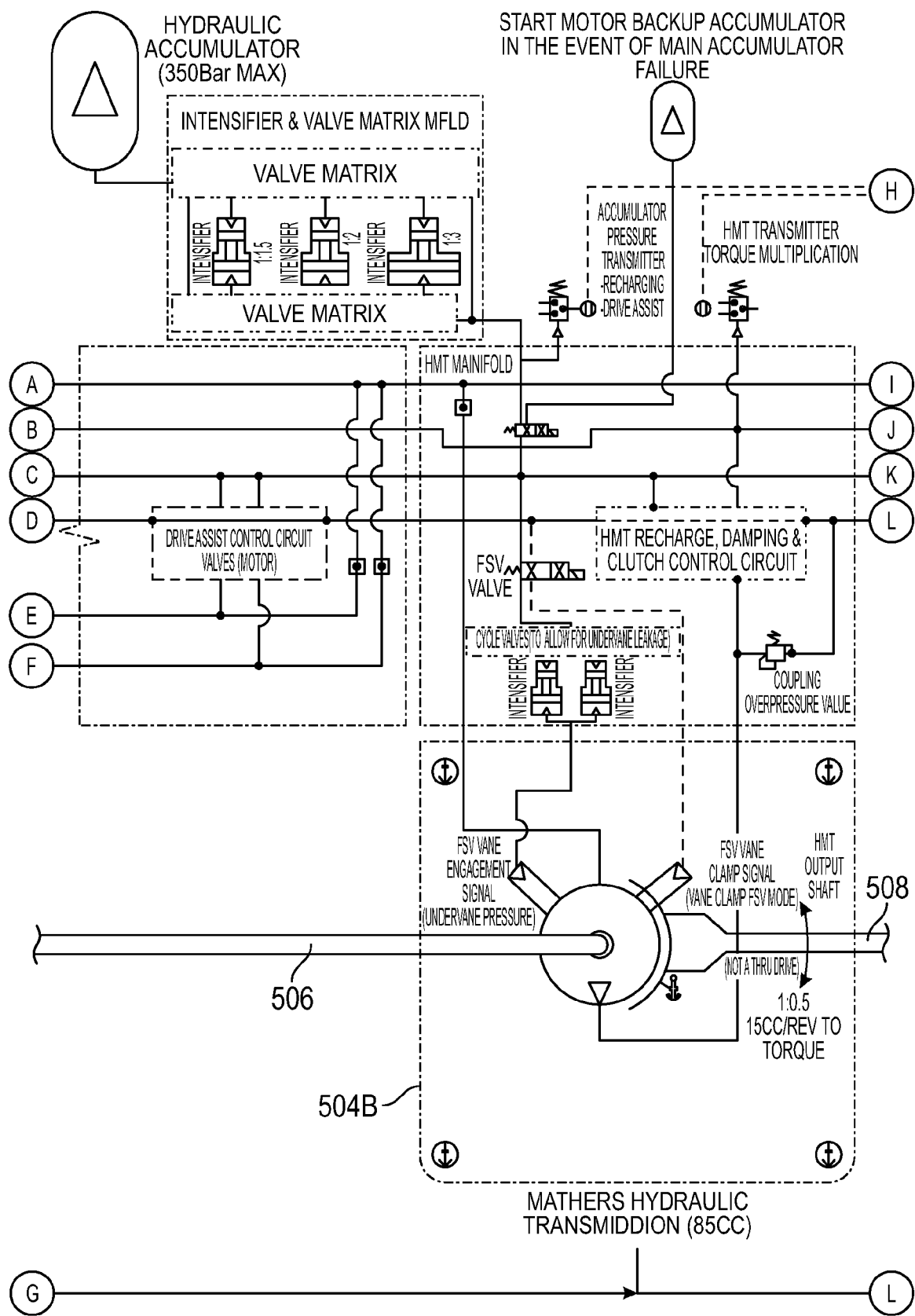
Figure 8A:
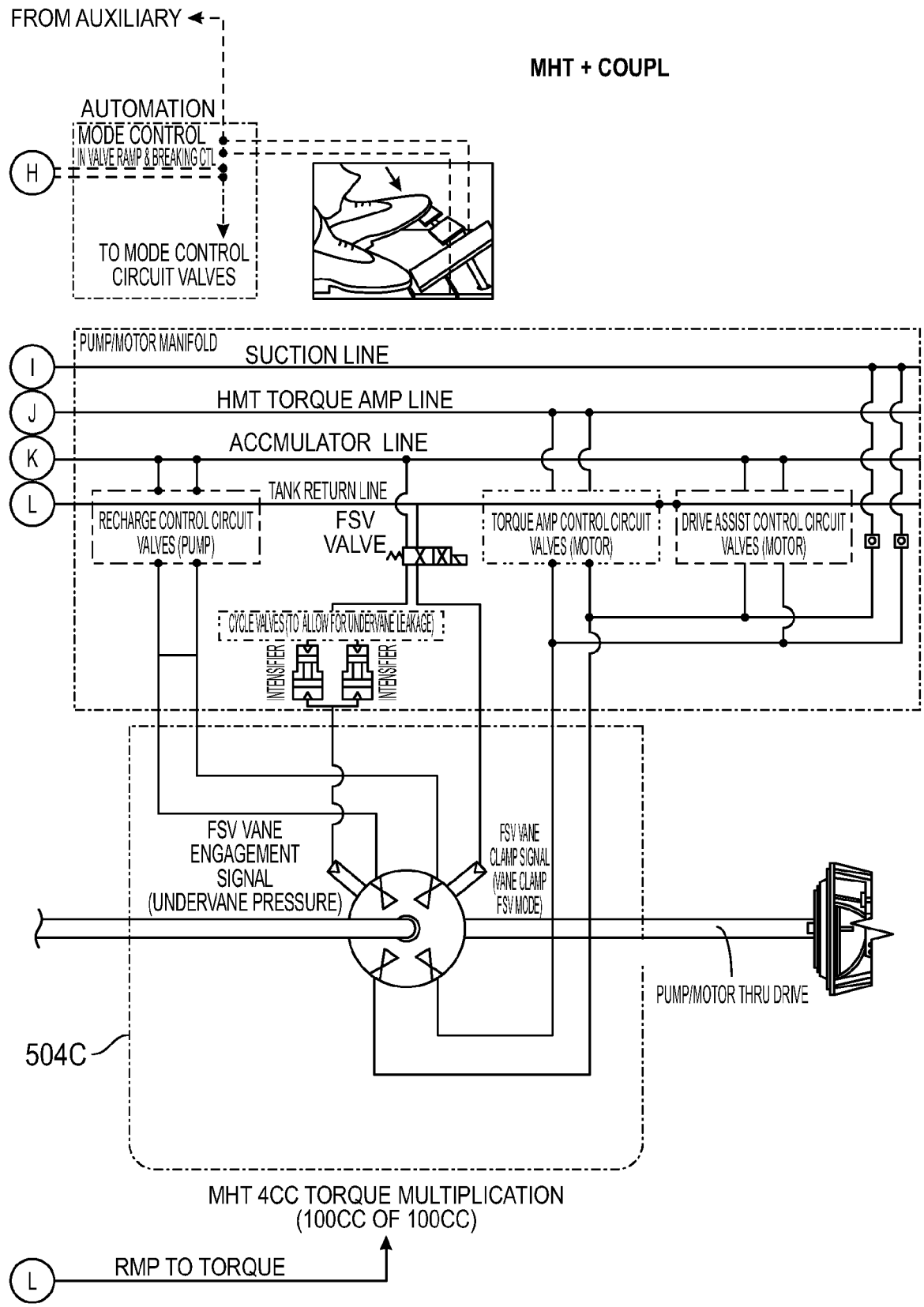

FIG. 8A show an alternative arrangement of three hydraulic devices 504A, 504B and 504C but with a middle device of the three (hydraulic device 504B) having a distinct separation between an input shaft 506 and an output shaft 508. The hydraulic device closest to the engine operates with a thru shaft and the device closest to the transmission operates with a thru shaft.

Figure 9A:
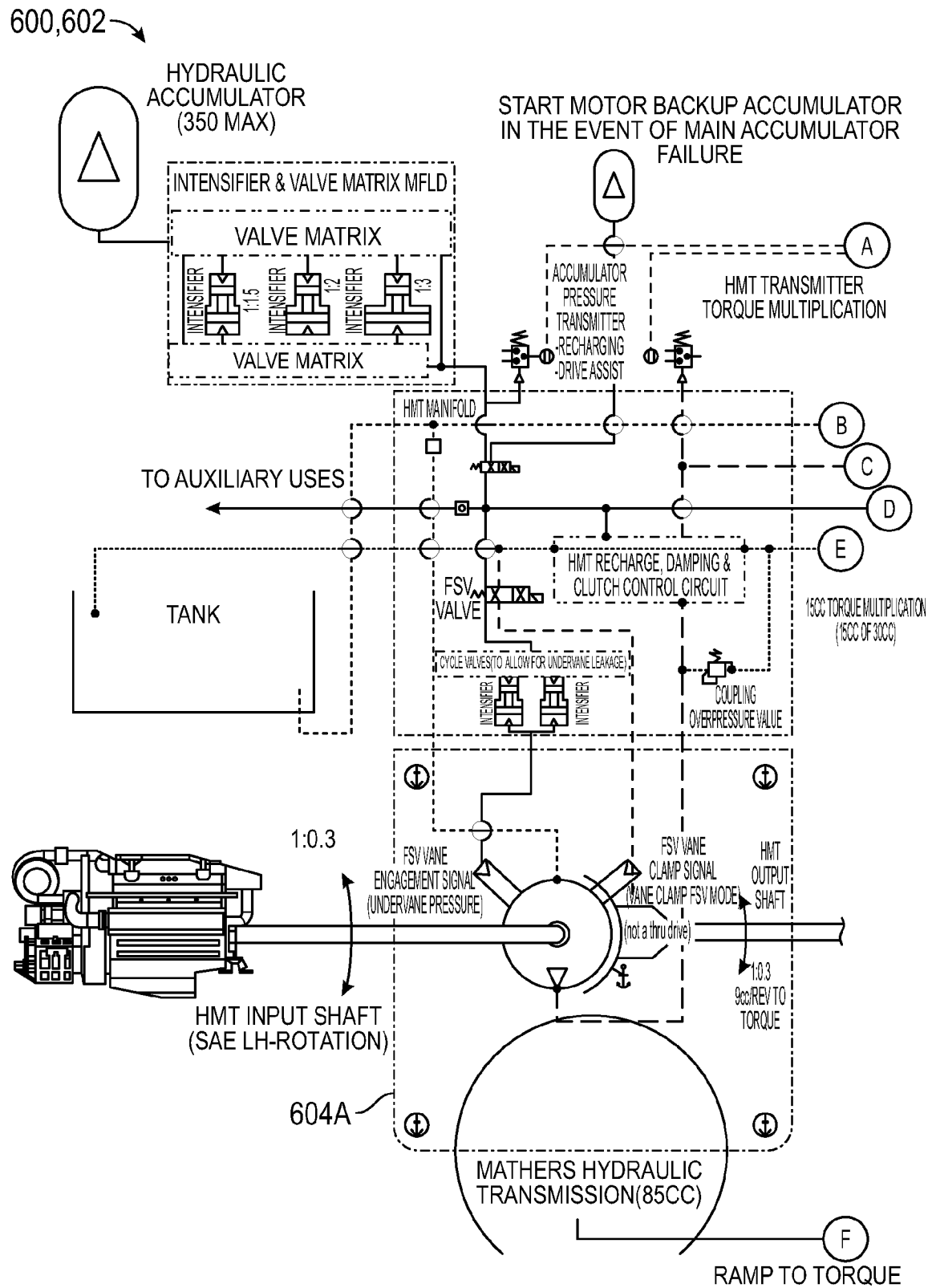
FIG. 9A is a system diagram of components of a vehicle including a plurality hydraulic devices (e.g., eight devices) arranged in-line (series) with a drive shaft where the need for a transmission has been eliminated by such devices according to an embodiment.
Figure 9A:
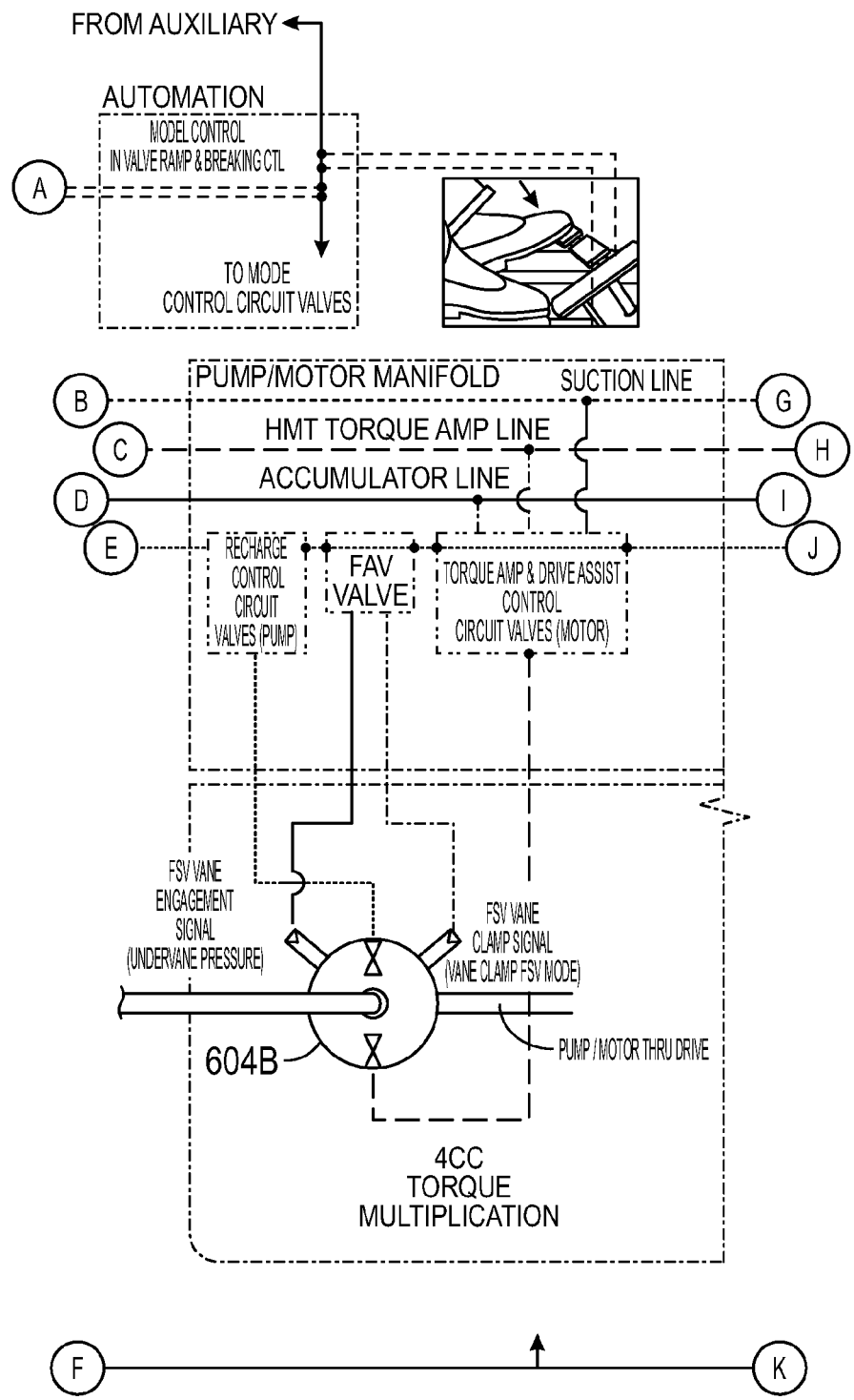
Figure 9A:
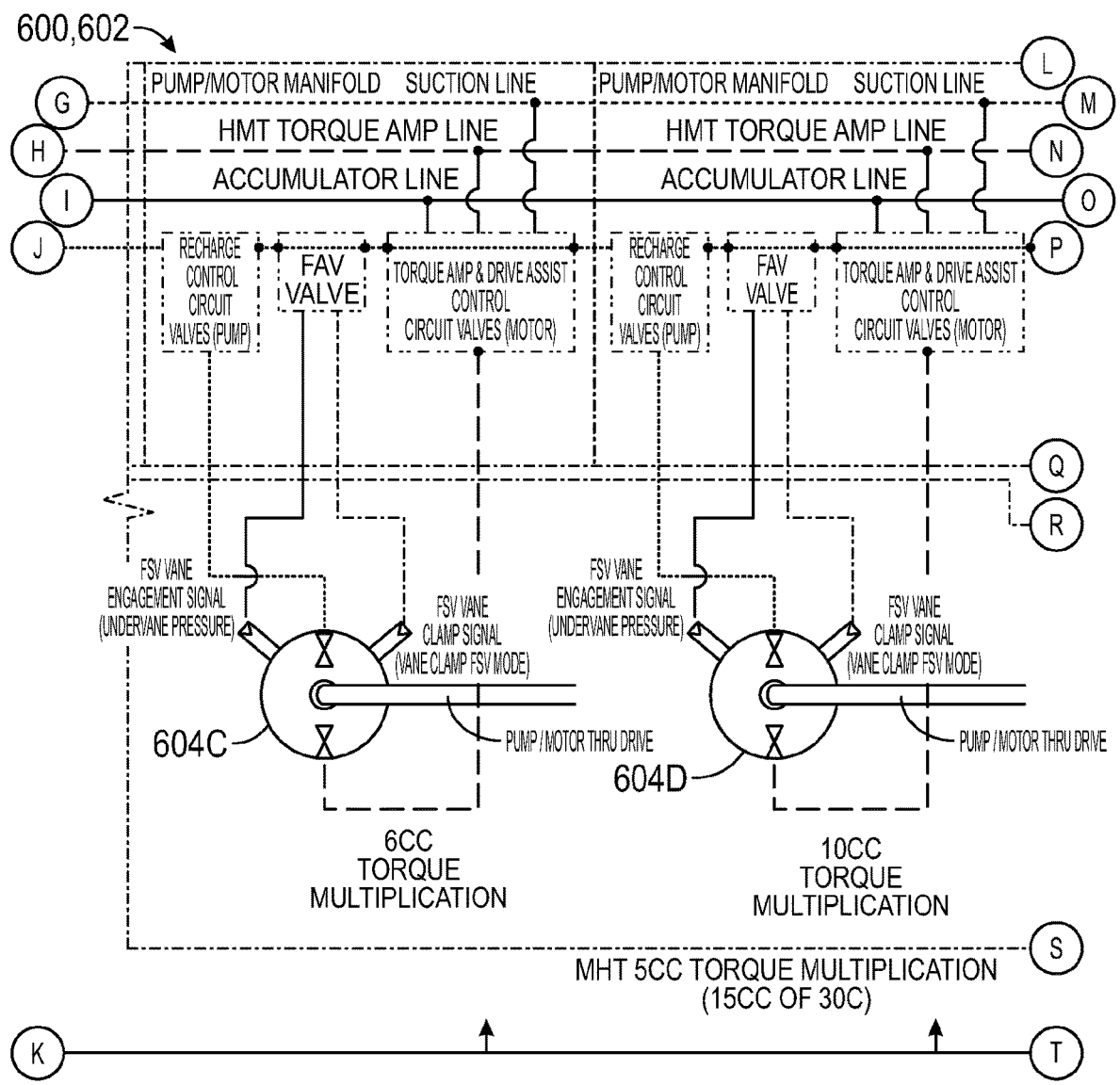
Figure 9A:
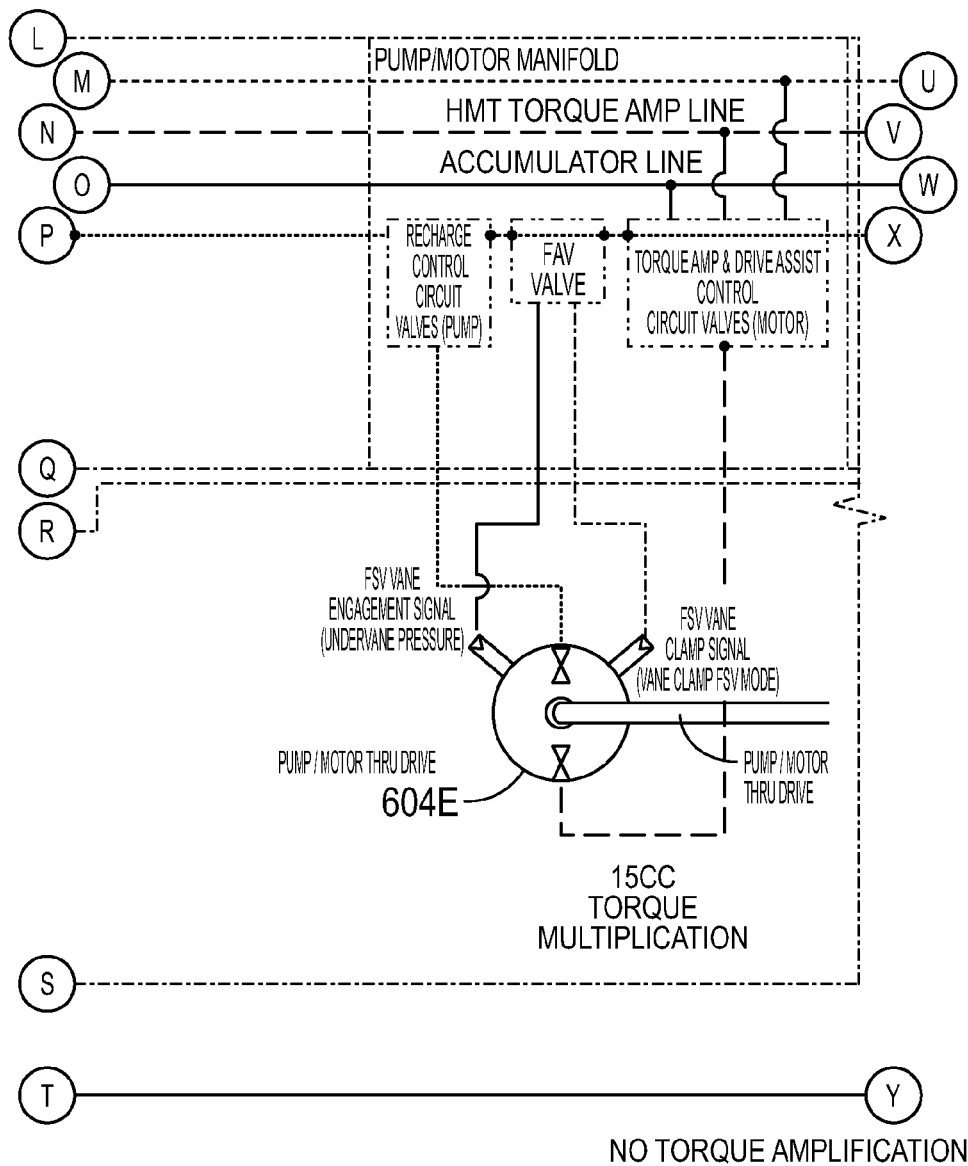
Figure 9A:
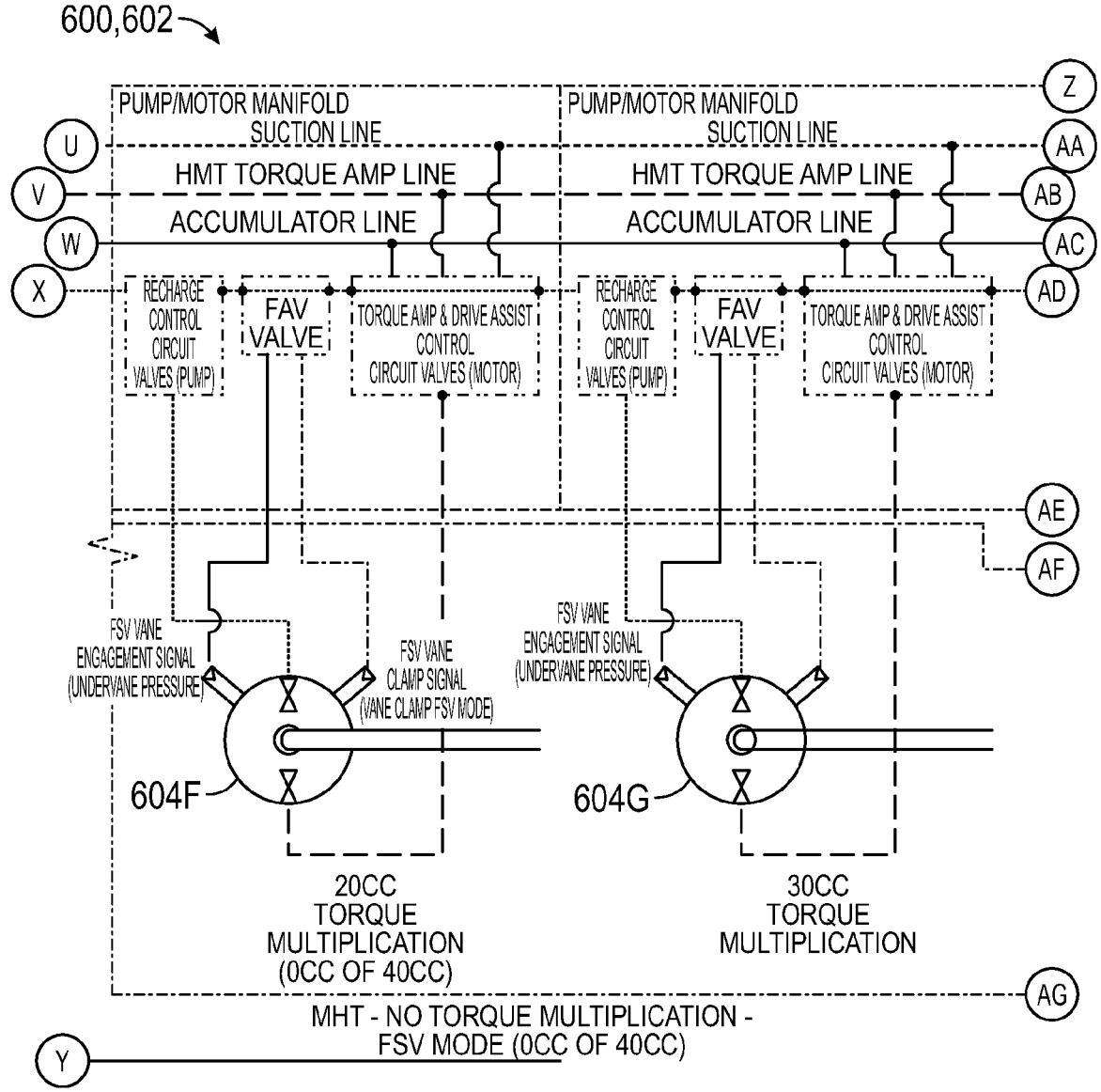
Figure 9A:
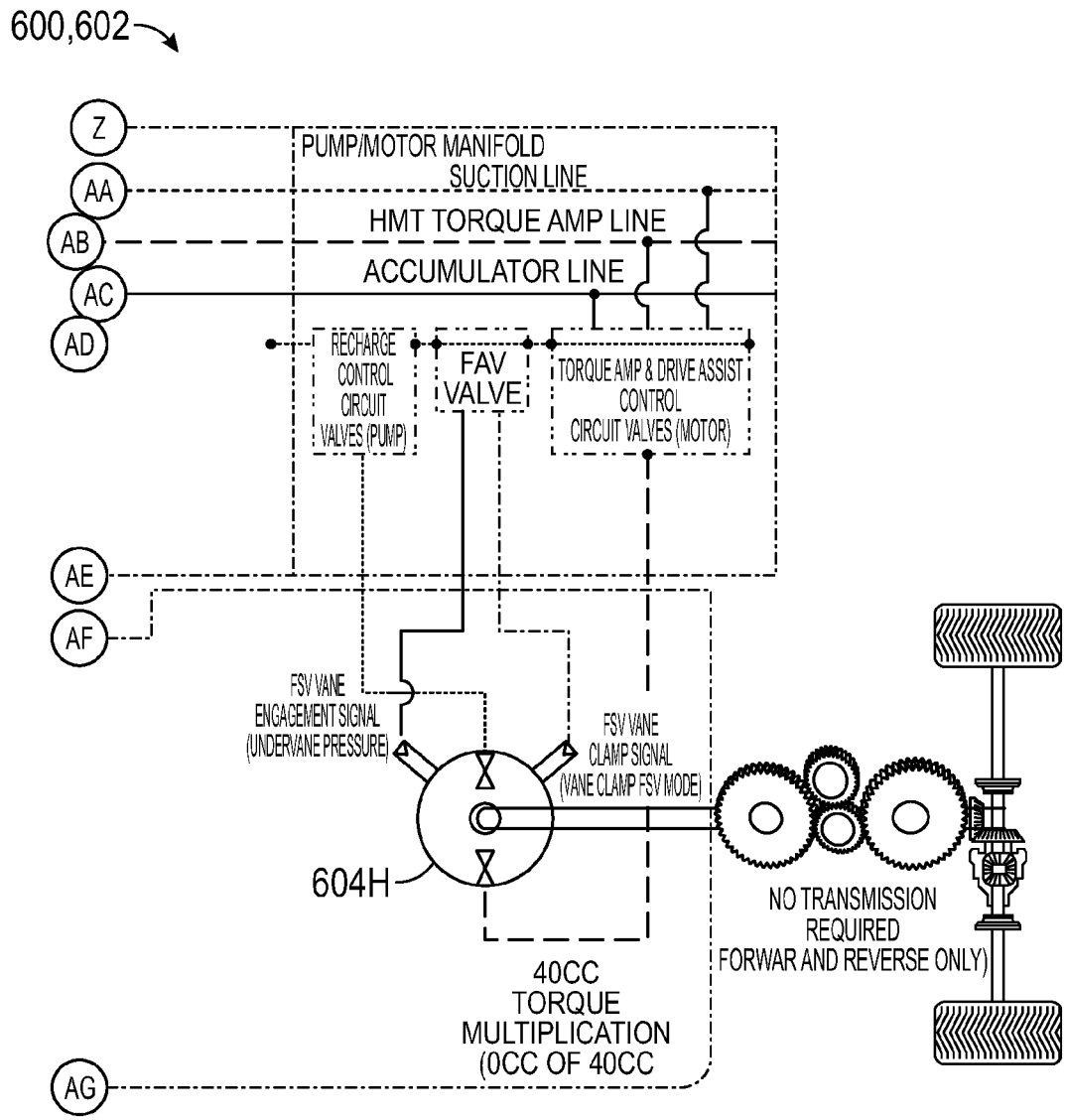

FIG. 9A show an arrangement of more than four hydraulic devices (actually eight hydraulic devices) 604A, 604B, 604C, 604D, 604E, 604F, 604G and 604H some of which can be used in some cases to eliminate use of a transmission for the vehicle 602. Thus, the hydraulic devices and system 600 can replace a transmission of the vehicle 602 according to some examples.

Figure 7A:
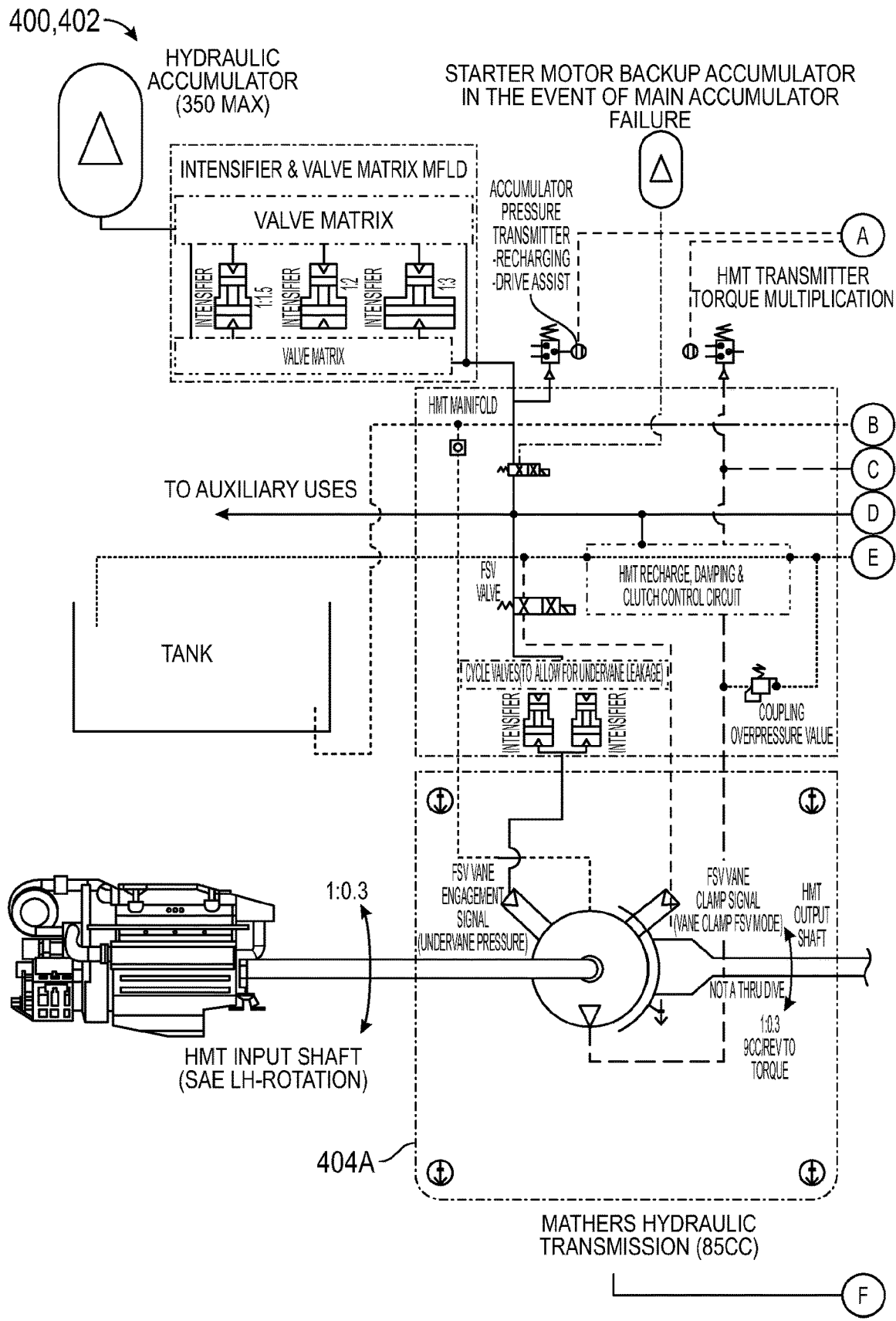
FIG. 7A is a system diagram of components of a vehicle including four hydraulic devices arranged in-line (series) with a drive shaft and between an engine and a transmission according to an embodiment.
Figure 7A:
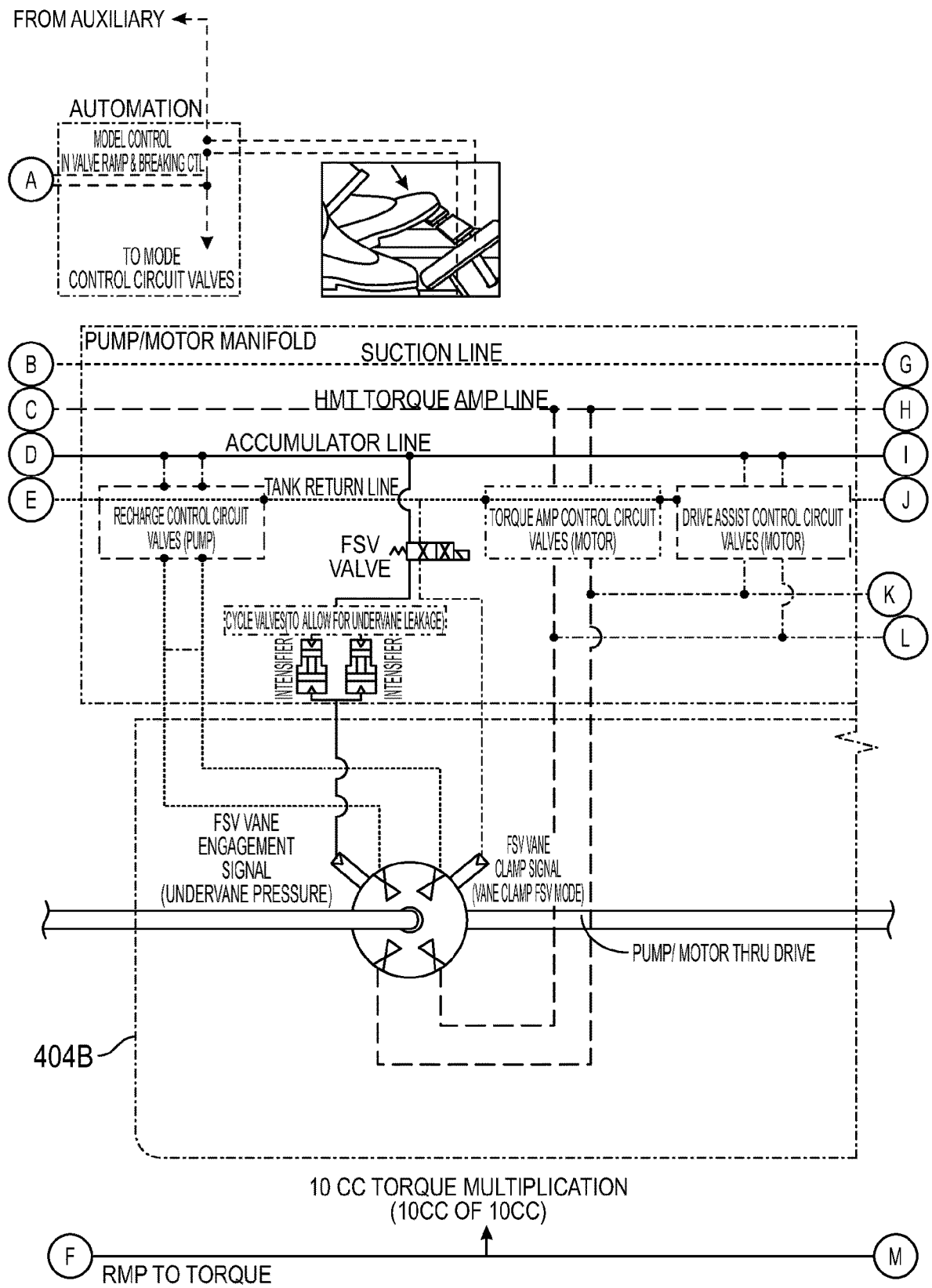
Figure 7A:
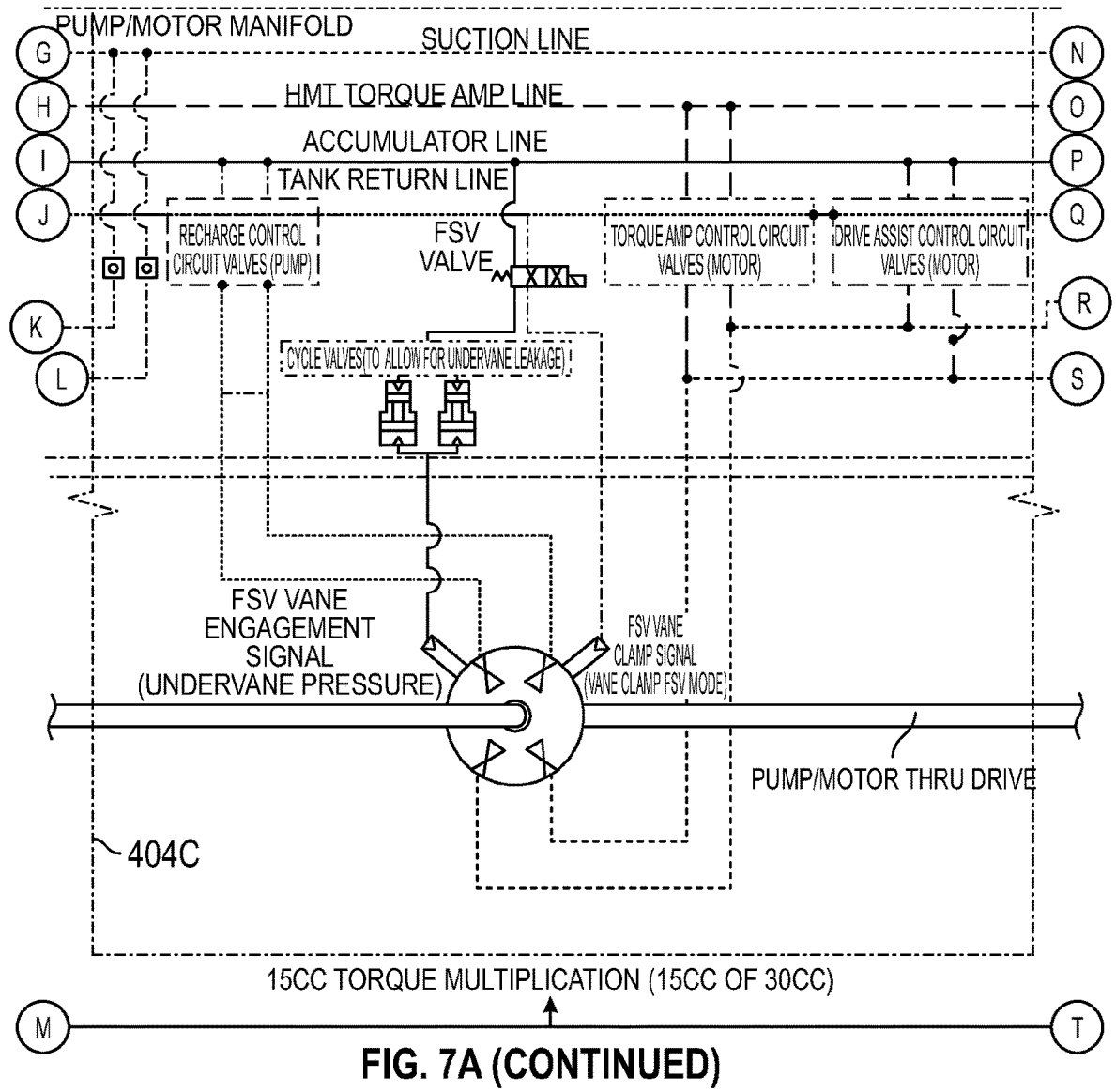
Figure 7A:
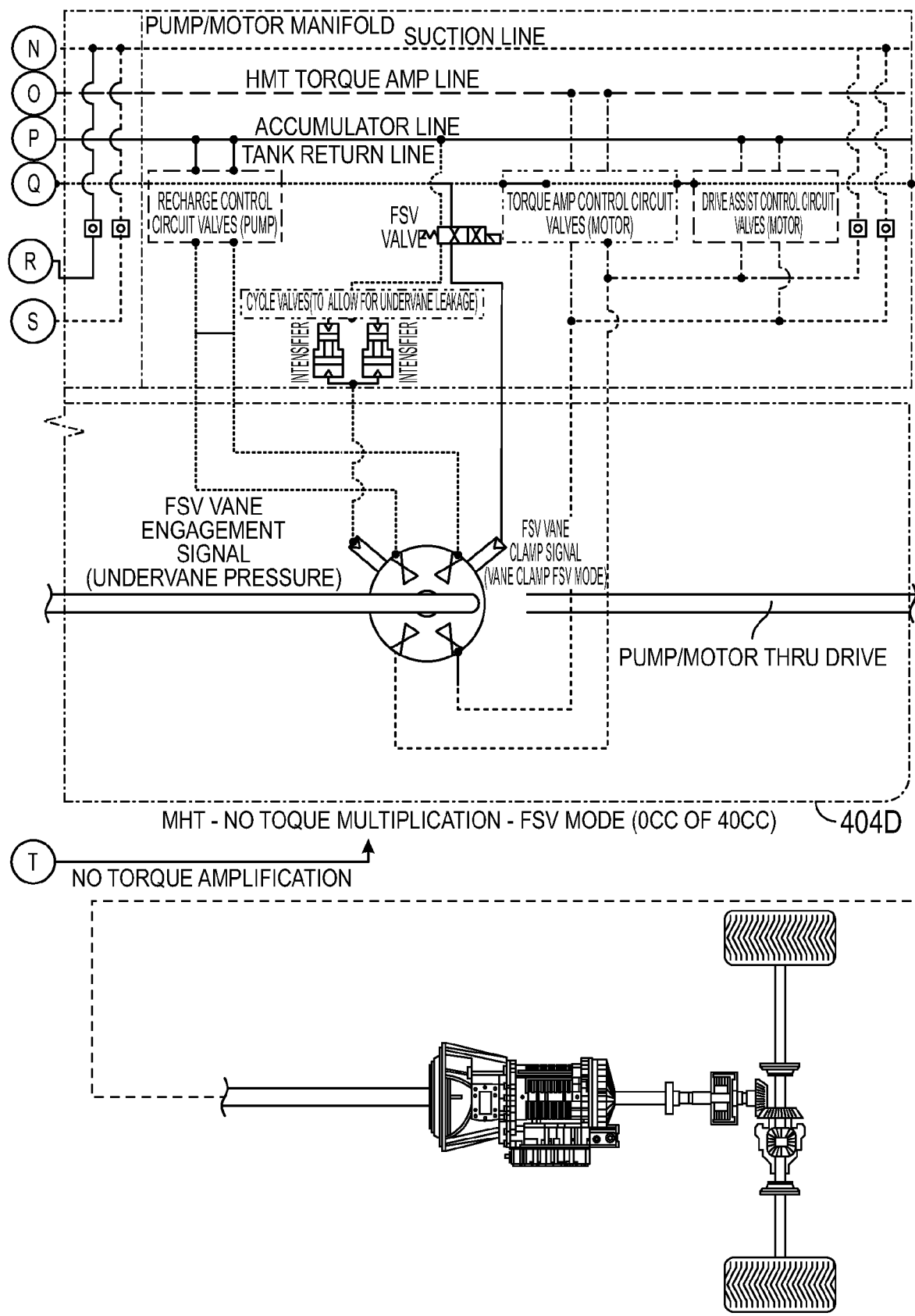
Figure 10A:
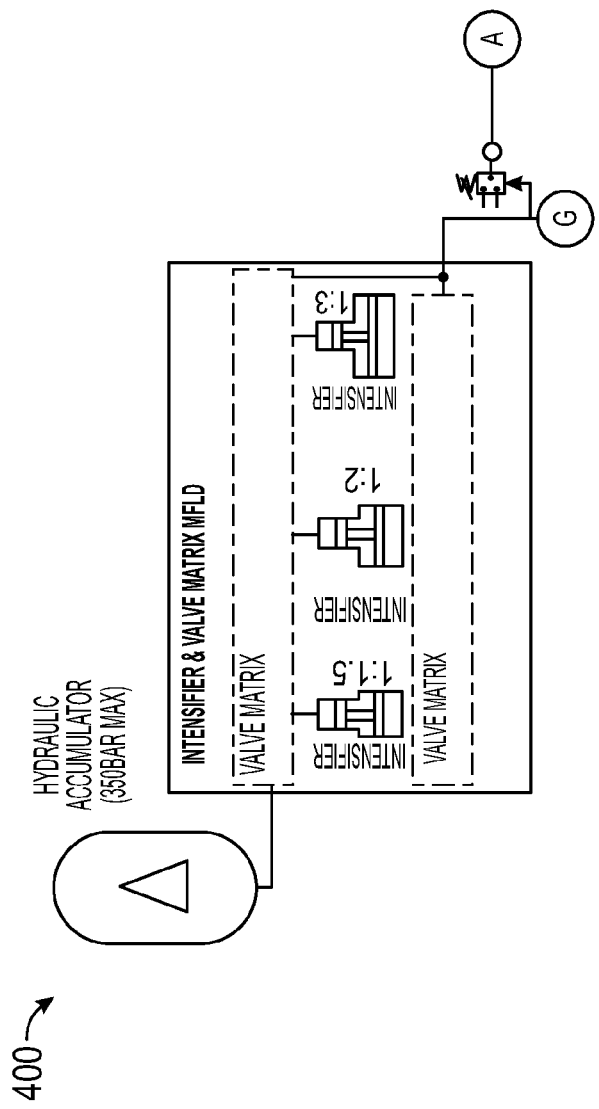
FIG. 10A is a system diagram further illustrating aspects and functions of the system of FIG. 7.
Figure 10A:
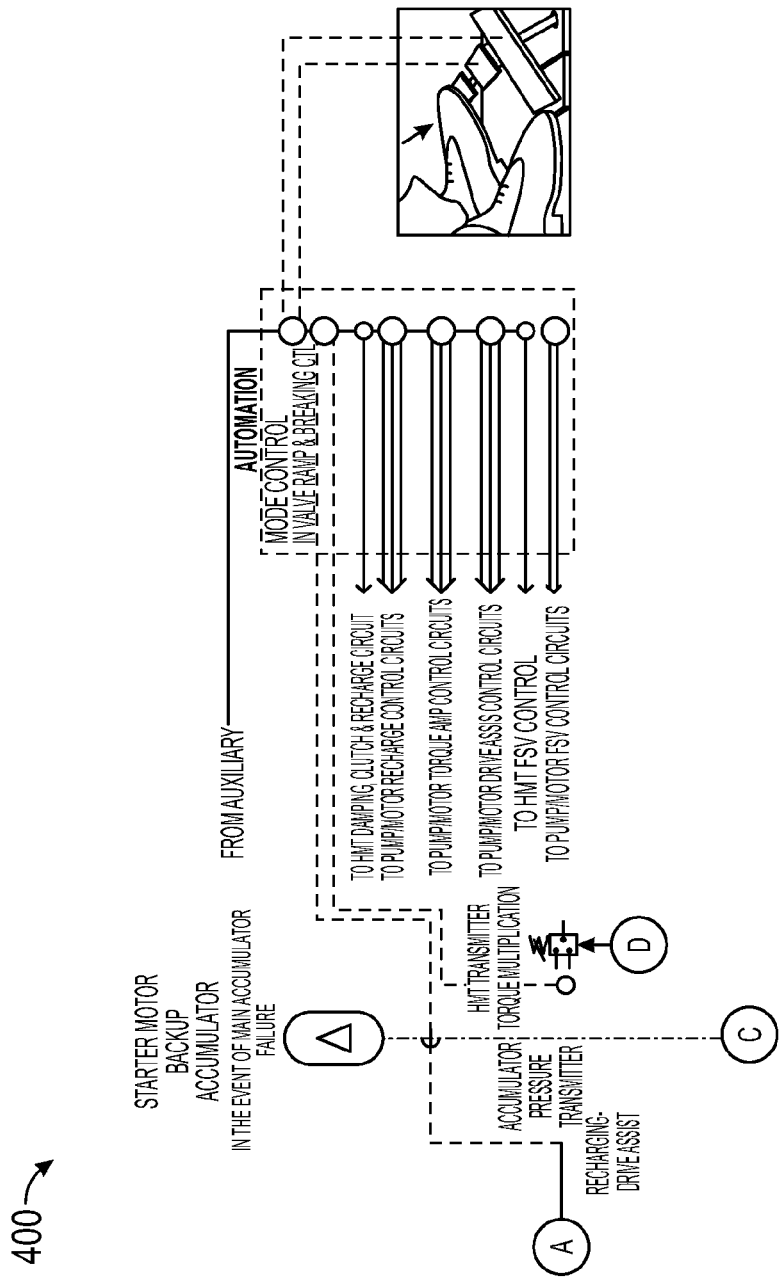
Figure 10A:
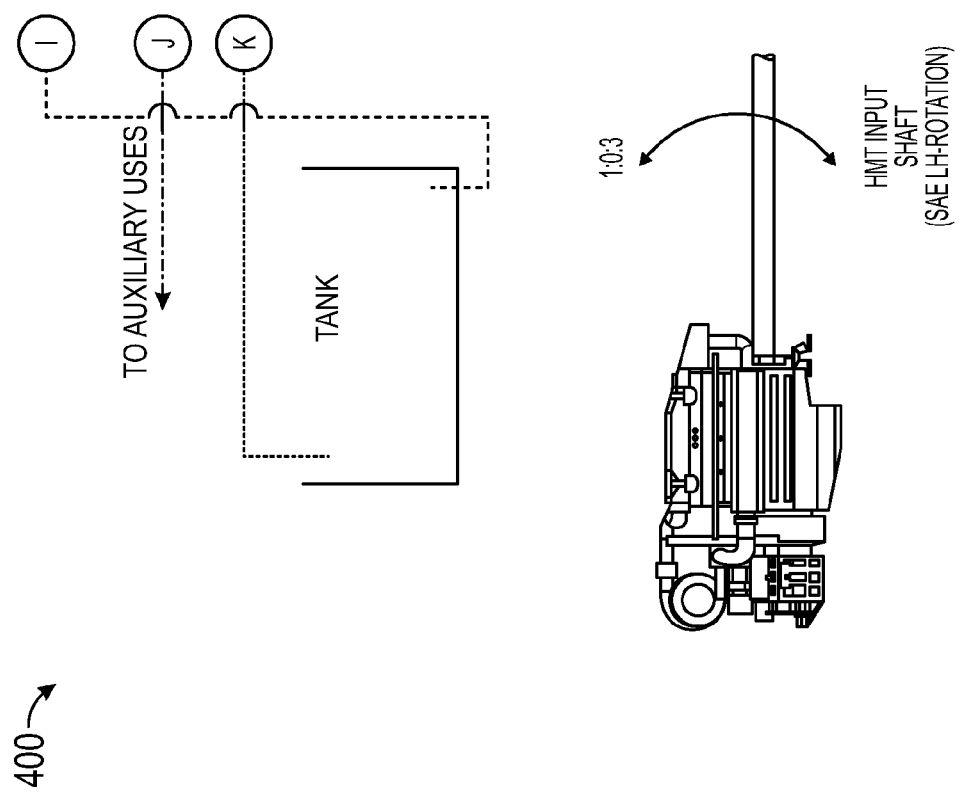
Figure 10A:
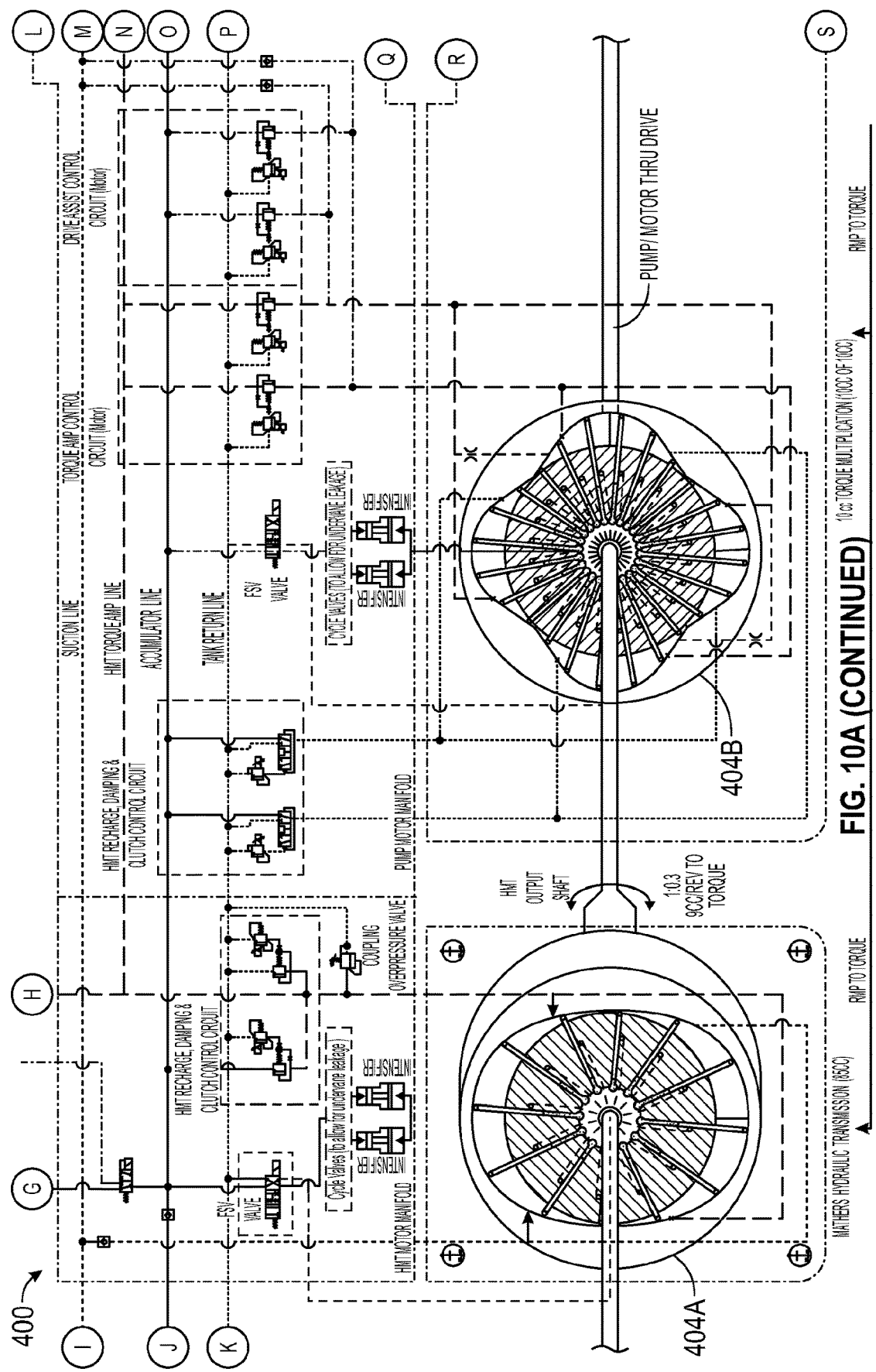
Figure 10A:
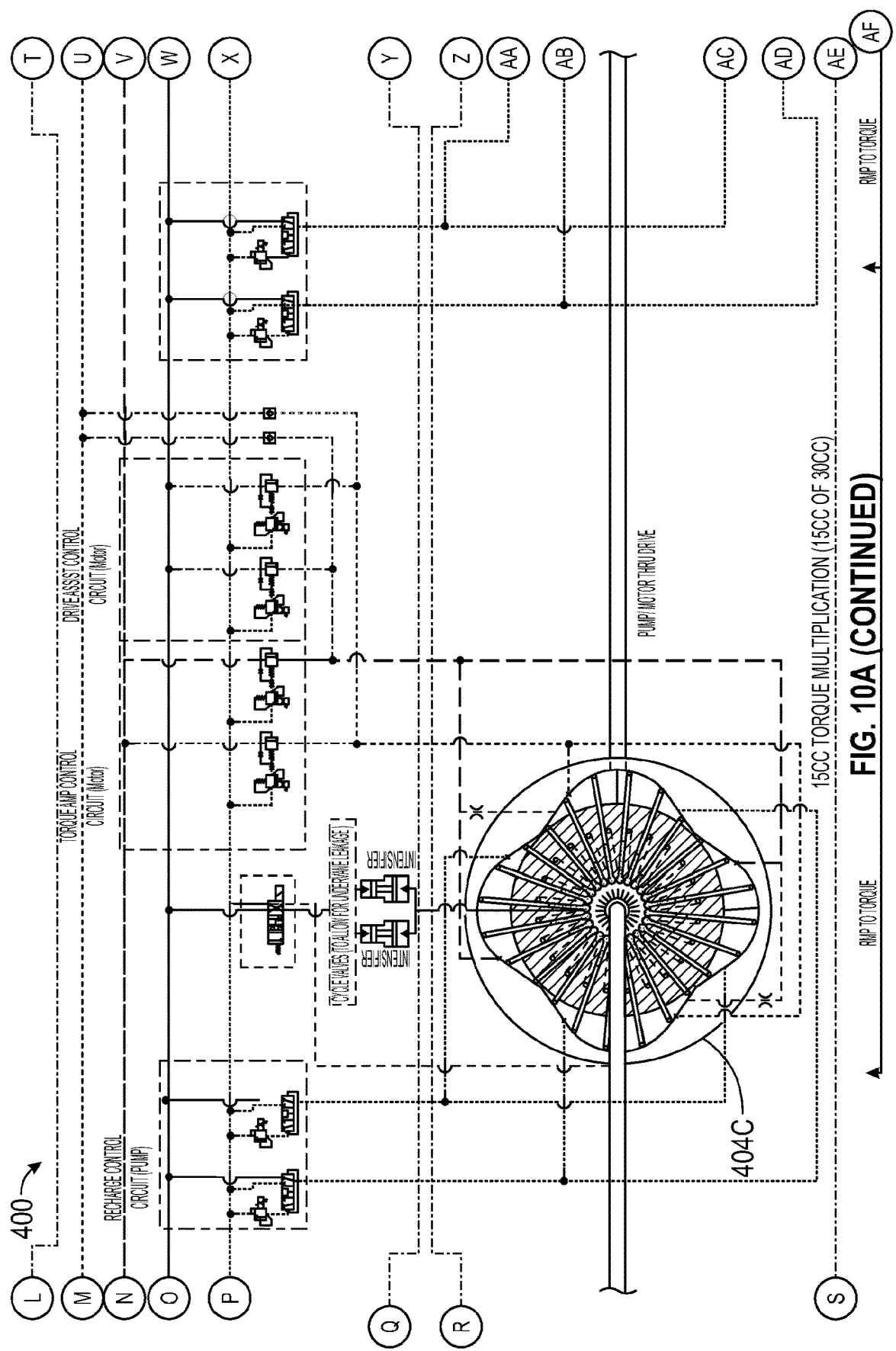
Figure 10A:
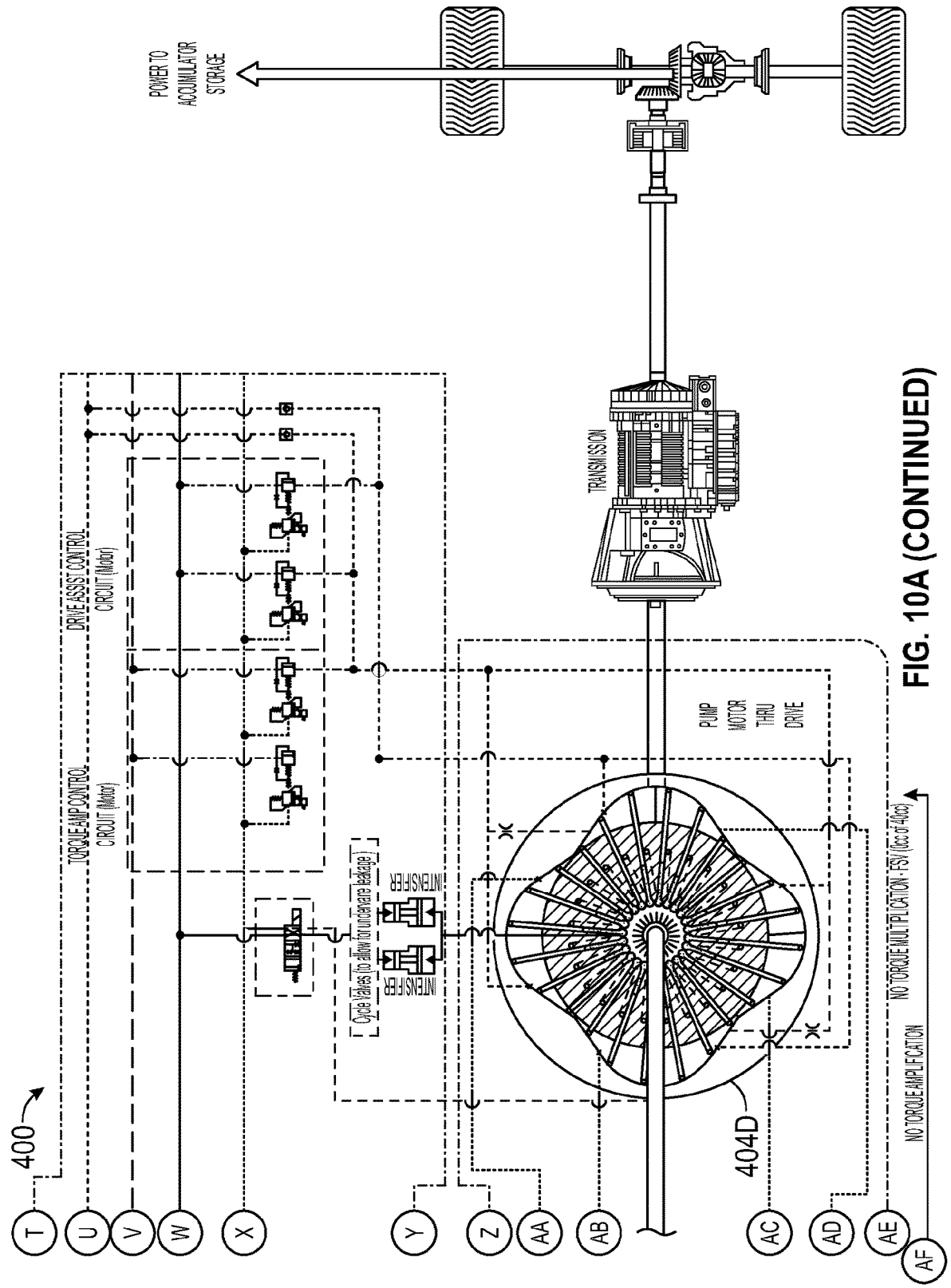

FIGS. 10A-16 show various system operation modes that can be achieved by the plurality of hydraulic devices 404A, 404B, 404C and 404D. For exemplary purposes the system 400 of FIG. 7A is utilized as an example for the following FIGS. However, it is recognized that the operation modes could be achieved with any of the systems of FIG. 8A, 9A or other modified systems. FIG. 10A also show various features of the apparatus and system 400. Some of these aspects have already been discussed herein.

Thus, according to FIG. 10A:
Function Summary—MHT+3× Dual Pump/Motors
Definition of Terms:
  MHT—Mathers Hydrodynamic Transmission
  RPM—Revelations per Minute
  FSV—Fuel Savings Vane's (Vane Clamping)
Function Mode Summary:
  1. MHT RPM>TORQUE AMPLIFICATION MODE.
  2. MHT Starter Motor Mode.
  3. Drive Assist Mode (Motoring).
  4. Brake Torque Recharge FSV Mode (Pumping with HMT Fuel Saving Mode).
  Engine recharge when accumulator is low (Pumping).
Component Feature Summary
  6. Roller Vane
  7. Pump/Motor FSV (Fuel Saving Vane's).
  8. HMT FSV (Fuel Saving Vane's).
  9. Undervane Pressure Control.
System Feature Summary
  Double Pump/Motor Function.
  11. MHT Intensifiers.
  12. Undervane Pressure Intensifiers.
  15. Starter Motor Backup Accumulator in the event of main accumulator failure.
  16. Accumulator power or pump/motor power to auxiliary uses.
  17. HMT Dampening via "HMT RECHARGE, DAMPING & CLUTCH CONTROL CIRCUIT"
  18. Clutch functionality via "TORQUE CONTROL CIRCUIT VALVES" and "HMT RECHARGE, DAMPING & CLUTCH CONTROL CIRCUIT".
  19. Transmission gear band extension via "TORQUE CONTROL CIRCUIT VALVES" AND "HMT RECHARGE, DAMPING & CLUTCH CONTROL CIRCUIT".
  20. Variously sized pump/motors
  21. Intensifier Bank and Valve Matrix Arrangement summary:
  22. Arrangement 1: MHT+LONE DUAL BALANCED VANE PUMP/MOTOR
  23. Arrangement 2: MHT+Multi DUAL BALANCE VANE PUMP/MOTOR
  24. Arrangement 3: MHT+COUPLING SANDWICH DUAL BALANCED VANE
Pump/Motor
  25. Arrangement 4: MHT+MULTI DUAL BALANCE VANE PUMP/MOTOR
7, 8 & 9. FSV VALVE'S. Allows for either Undervane
Pressure or Vane Clamping.
  Undervane pressure ensuring vanes are in outmost position and forced against cam ring preventing any leakage.
  Vane clamping prevents vanes from extending by locking in retraced position preventing any pumping/motoring with negligible friction losses.
Double Pump/Motor.
  Pump/Motor consists of 4 quadrants opposed to 2 allowing for 2 pump/motors on one rotor and ring arrangement.
  24 Vanes to allow for 2× motors per rotor and ring.
6. Roller Vane. Roller tipped vanes
  Allows for higher undervane pressures over all quadrants of MHT and
  Pump/Motors Allows for use with water glycol and other non-oil based pumping fluids.
8. Vane Clamp.
  Vane clamping prevents vanes from extending by locking in retraced position preventing any pumping/motoring with negligible friction losses.
9. Undervane Pressure
  Undervane pressure ensuring vanes are in outmost position and forced against cam ring preventing any leakage.
Numbers 1, 17, 18 & 19 above allow: "HMT RECHARGE, DAMPING & CLUTCH CONTROL EXTENSIONS CIRCUIT". Used in function modes MHT>RPM Torque Amplification, Clutch and Transmission Gear Band Extensions
  10. HMT dampening via "HMT RECHARGE, DAMPING & CLUTCH CONTROL CIRCUIT"
  To provide damping to any drive train and therefore any HMT
Pressure Spikes
  11. Intensifier Bank & Valve Matrix
  Used to allow for lower pumping pressure with higher storage pressures and storage efficiency. This will likely be required for use with a water glycol system.

Also provides better flexibility on storage pressure to suit pump/motor or auxiliary hydraulic functions such as tippers or truck mount cranage etc.

Note, due to valve matrix, system can work with both intensification and de-intensification as required.

1, 17, 18 & 19. TORQUE CONTROL CIRCUIT VALVES

Used in function modes MHT>RPM Torque Amplification, Clutch and Transmission Gear Band 1, 17, 18 & 19. "HMT RECHARGE, DAMPING & CLUTCH CONTROL Extensions 8. Vane Clamp (Vane Capture Shown).

Vane clamping prevents vanes from extending by locking in retraced position preventing any pumping/motoring with negligible friction losses.

2 & 3. Drive Assist Control Circle is used in function modes Starter Motor and Drive Assist.

4 & 5. Recharge Control Circuit Valves are used in function modes MHT>RPM Torque Amplification, Clutch and Transmission Gear Band Extensions 15. Variously Sized Pump/Motors combining small, medium and large Pump/Motors allows for increased variability of use when utilizing multiply pump/motors. This is required to unsure pump/motor displacement is less than current coupling displacement volume at all times allowing for continued Torque Amplification.

Figure 11A:
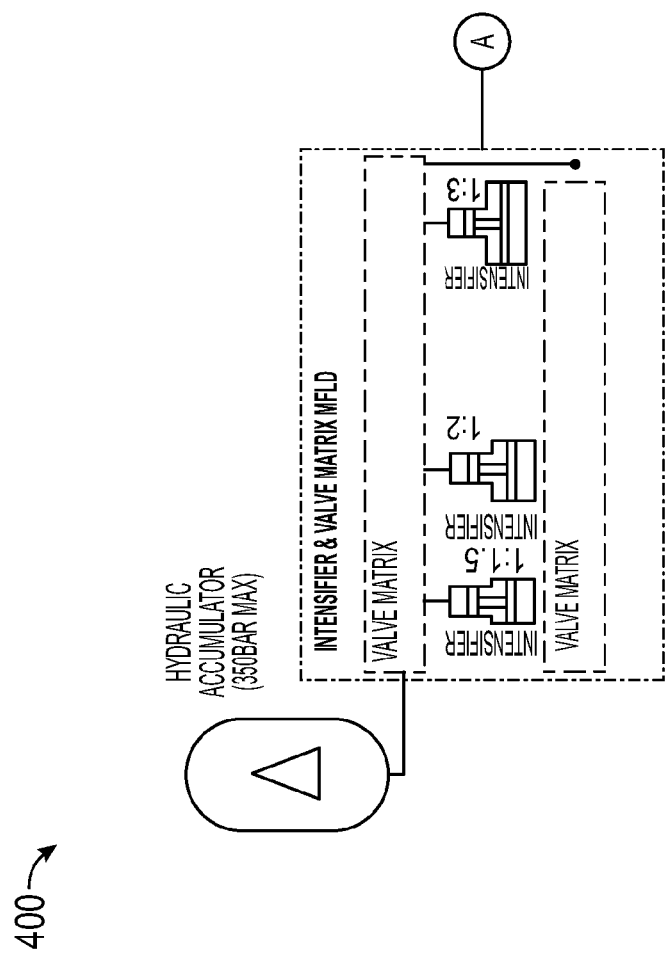
FIG. 11A is a system diagram of the system of FIGS. 7 and 10 during a torque amplification operation mode.
Figure 11A:
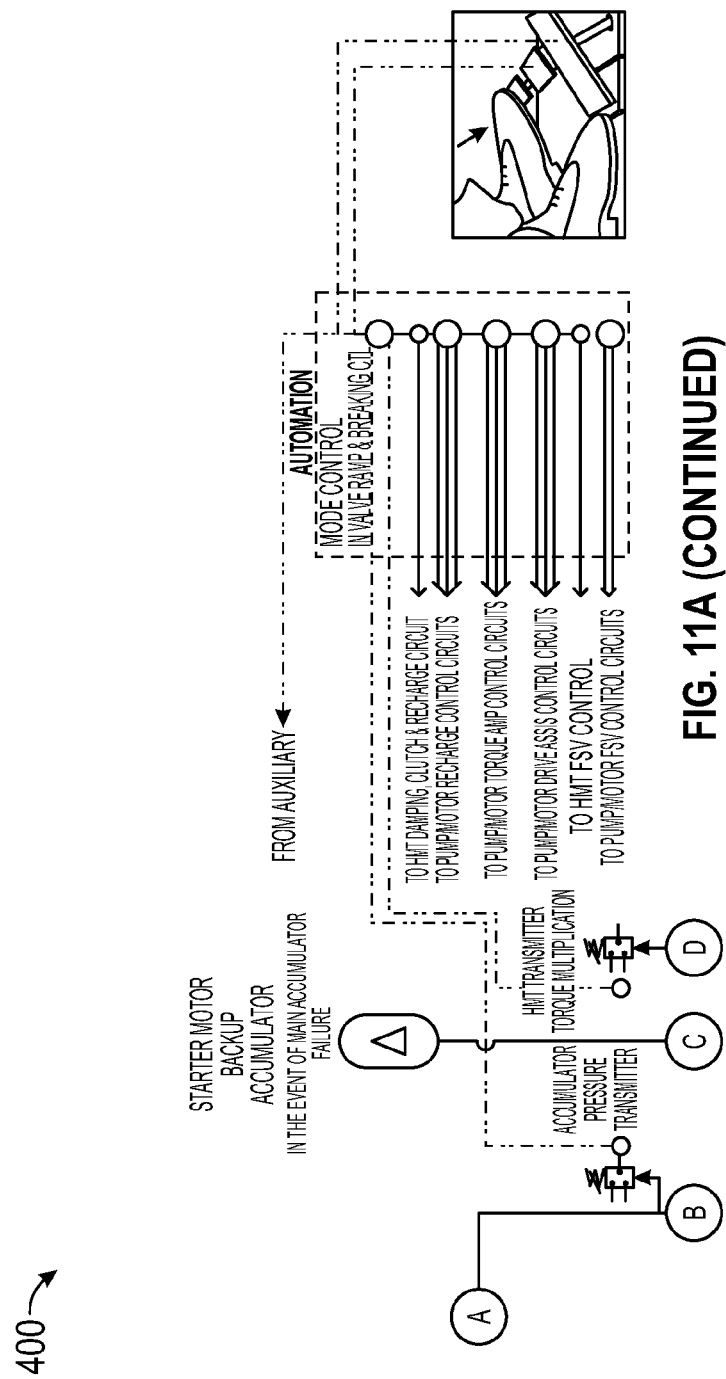
Figure 11A:
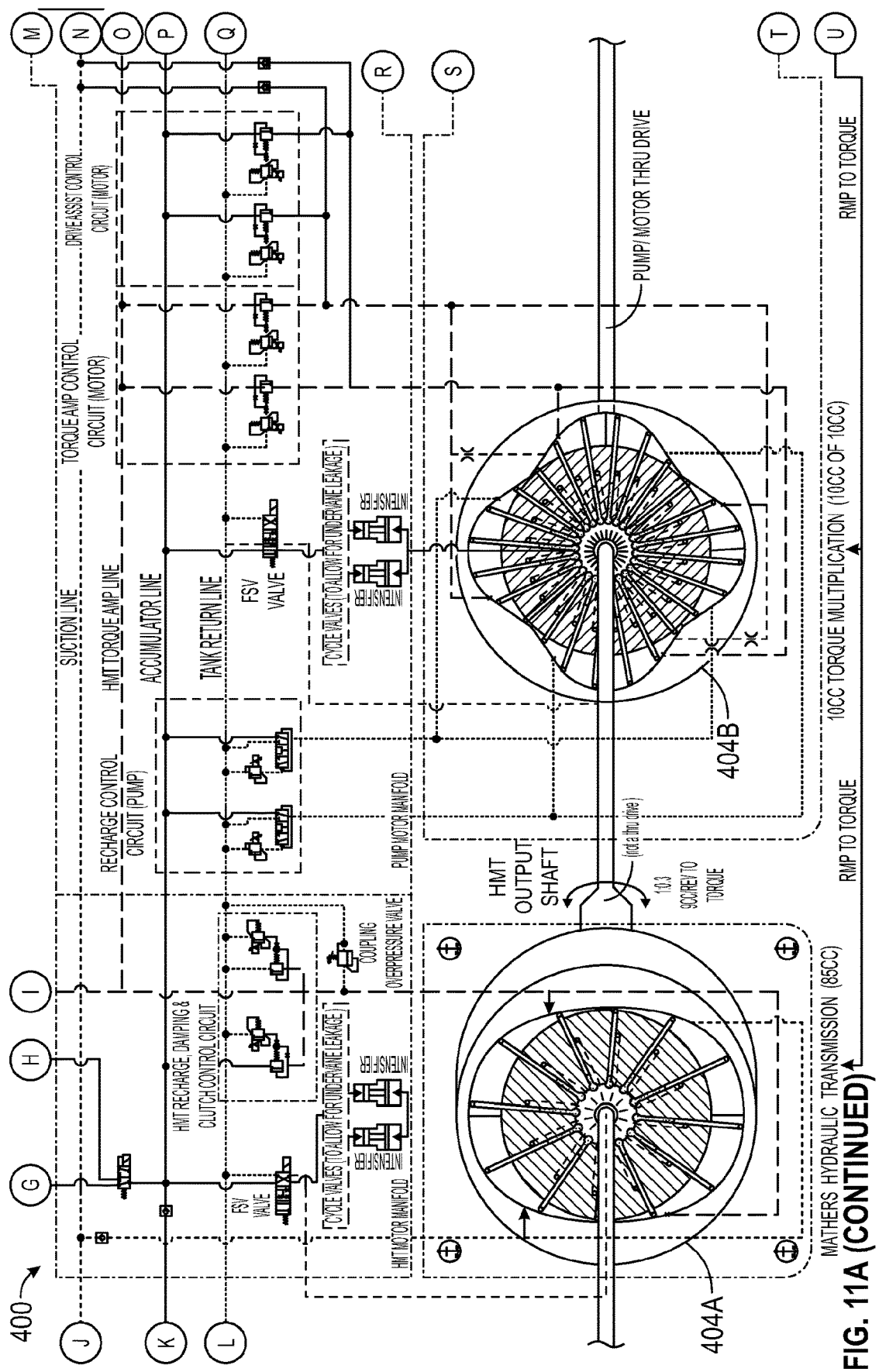
Figure 11A:
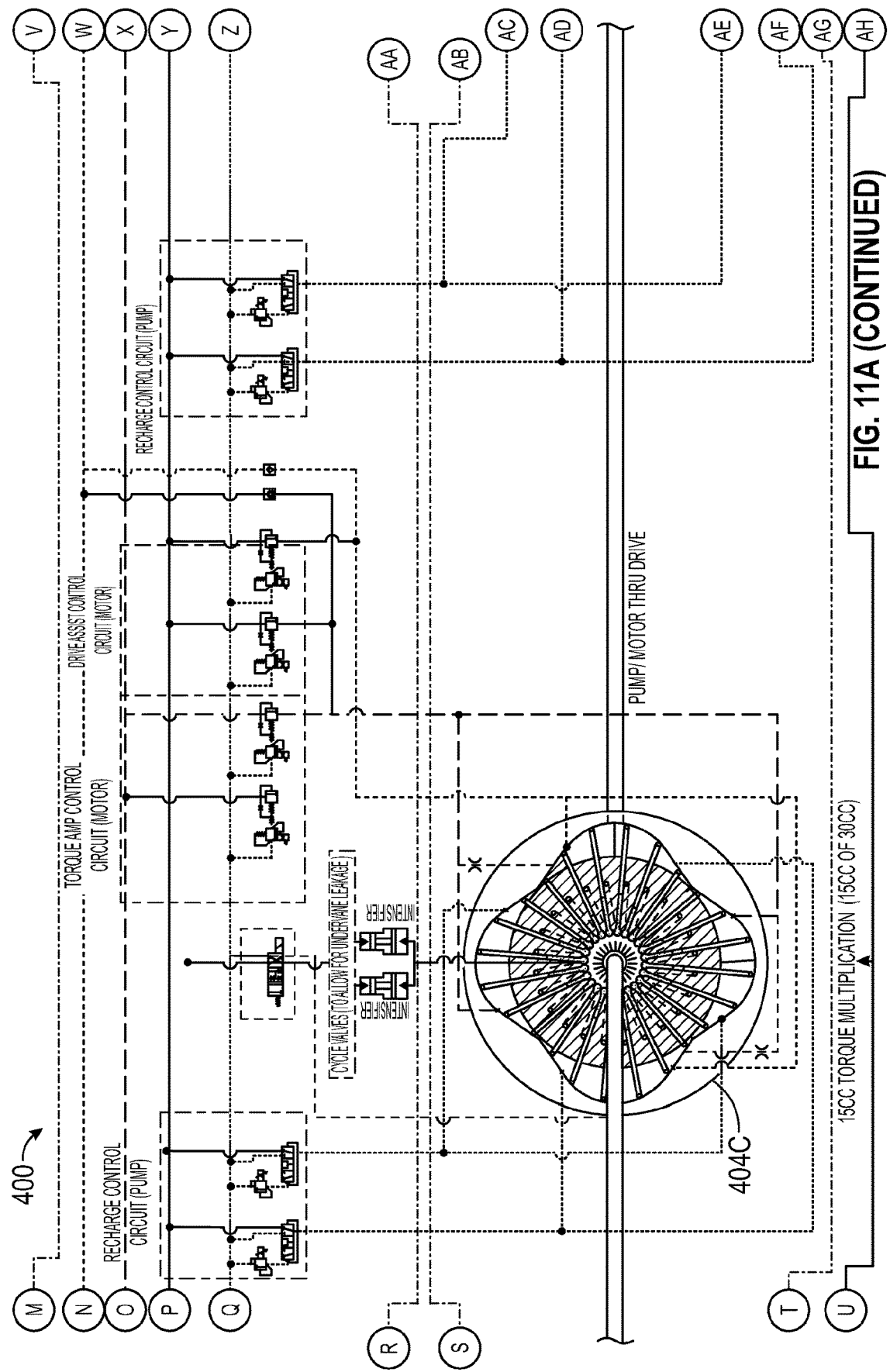
Figure 11A:
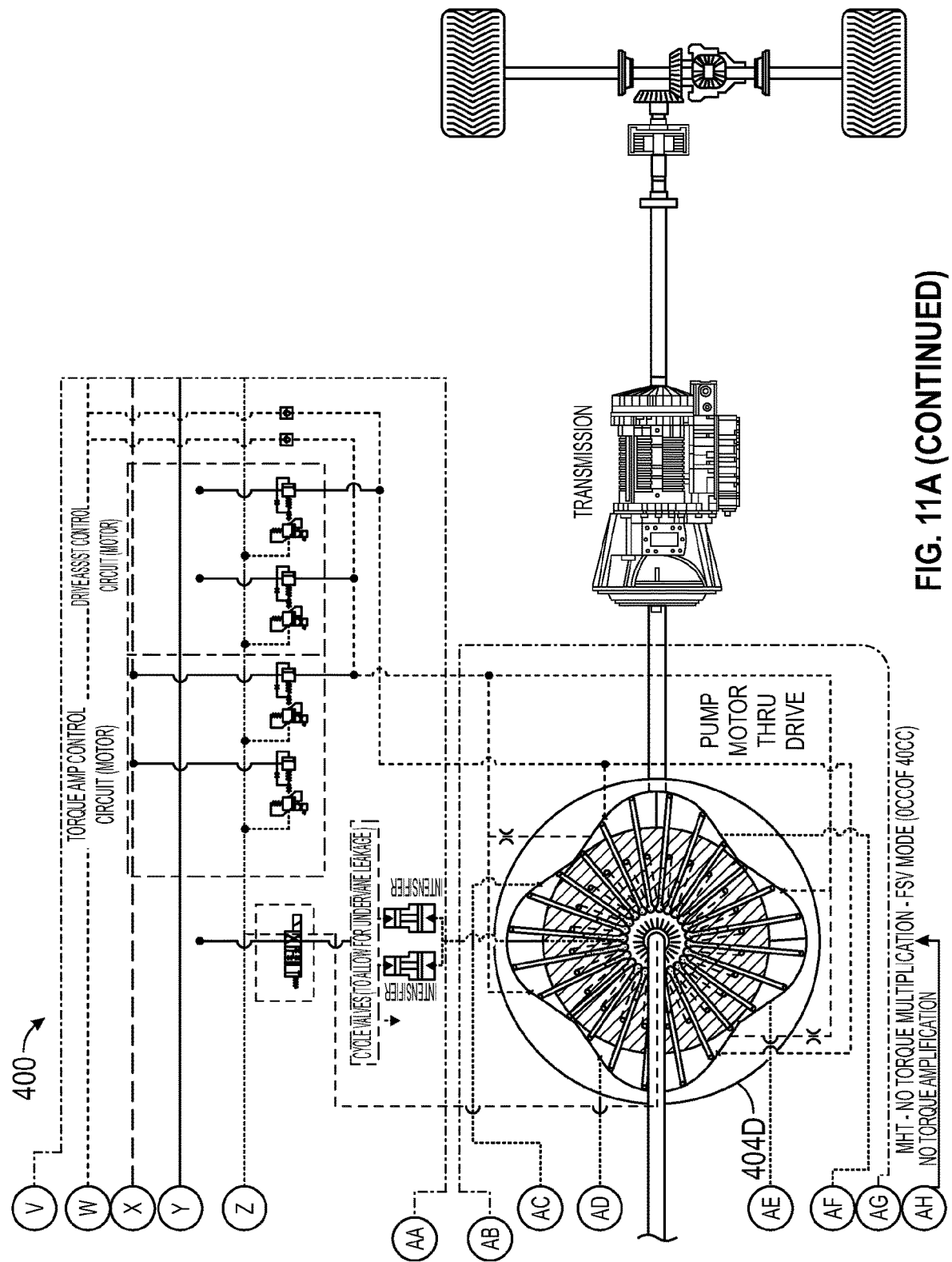

FIG. 11A shows the system 400 of FIG. 10A but during operation in an exemplary torque amplification mode. Thus:

MHT Torque Amplification Mode

MHT 1:0.3-9 cc of 30 cc

Mode Functional Description

1. MHT—Torque Amplification

Slipping of MHT is allowed creating a difference in MHT input & output shaft speeds. Excess power due to differing input v. output shaft speeds created in the form of high pressure hydraulic flow. This flow is directed back through vane motors on output shaft(s) allowing for torque amplification. The difference in shaft angular momentum of input shaft vs output shaft speed and torque amplification can be modified to suit requirement by modulating the use of Pump/Motors "1 to 6" located on the MHT output shaft. Shown adjacent is a MHT shaft.

Speed ratio of 1:0.3 with Pump/Motors "1 to 3" in operation if excess power is not required, excess oil flow can be routed to accumulator depending on accumulator charge.

1.1. MHT—NO FUNCTION (IN HOME POSITION):

No pressure on motor, dead head on MHT and shaft speed ratio of 1:1.

All pumps/motors in FSV Mode.

"RECHARGE CONTROL CIRCUITS" directed to tank (no signal).

1.2. MHT—FUNCTION ENGAGEMENT—TORQUE AMPLIFICATION:

Disengage FSV mode on required Pump/Motors.

Ramp open "TORQUE AMP CONTROL CIRCUIT" Valves to allow slipping of MHT and flow diversion to Pump/Motors causing torque amplification.

1.3. MHT—FUNCTION OPERATION—TORQUE AMPLIFICATION:

"MHT RECHARGE, DAMPING & CLUTCH CONTROL CIRCUITS" to be operational to allow for dampening of pressure spikes during MHT engagement and operation. Dampening is most effective when circuit is open to accumulator allowing the dampening effect of high pressure nitrogen when accumulator opposed to relief valve. This dampening will also trickle charge to accumulator.

2. MHT—CLUTCH:

The MHT can function as, and replaced conventional automotive clutch use. The MHT can be set to modulate from an engine idle, to no speed, up to full drive speed with reduced energy losses.

2.1. MHT CLUTCH—NO FUNCTION (IN HOME POSITION)

Home position is engine at idle with FSV vane capture mode enabled on MHT coupling. All Pumps/Motors also in FSV mode. "RECHARGE CONTROL CIRCUITS" DIRECTED TO TANK (NO SIGNAL)

2.2. MHT CLUTCH—FUNCTION ENGAGEMENT & OPERATION

Disable FSV mode on MHT coupling with all oil flow being directed to tank via "MHT CONTROL CIRCUIT. SHAFT RATIO AT 1:0.

FSV Mode on all Pump/Motors disables and vanes engaged by ramping closed "HMT RECHARGE, DAMPING & CLUTCH CONTROL CIRCUIT TO TANK VALVE", and ramping open "TORQUE AMP CONTROL CIRCUIT" flow is directed to drive train pump/motors creating angular momentum of drive train. As speed and torque is directed to the drive train, pump/motors "1 to 6" are brought ON/OFF line modulating to required wheel speed and torque required.

3. HMT—TRANSMISSION GEAR BAND EXTENSION:

Since the HMT Clutch amplifies shaft angular velocity to torque, gear quantities on heavy vehicles can be minimized as the band on each gear can be increased via modulation of oil flow to the pump/motors. (SIDE NOTE: depending on arrangement it could be possible to elimination a conventional transmission entirely and utilize only the HMT for all transmission gear requirements by increasing the quantity of pump/motors further than shown).

Figure 12A:
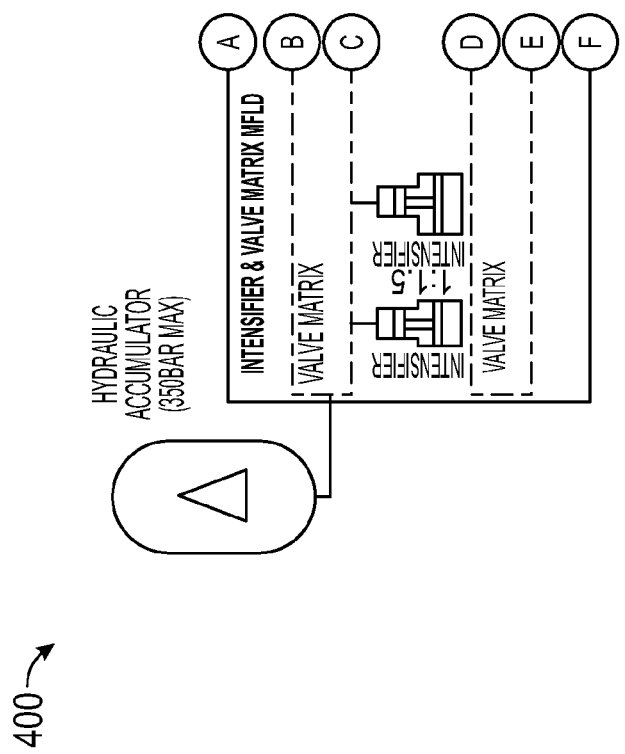
FIG. 12A is a system diagram of the system of FIGS. 7 and 10 during a starter motor operation mode.
Figure 12A:
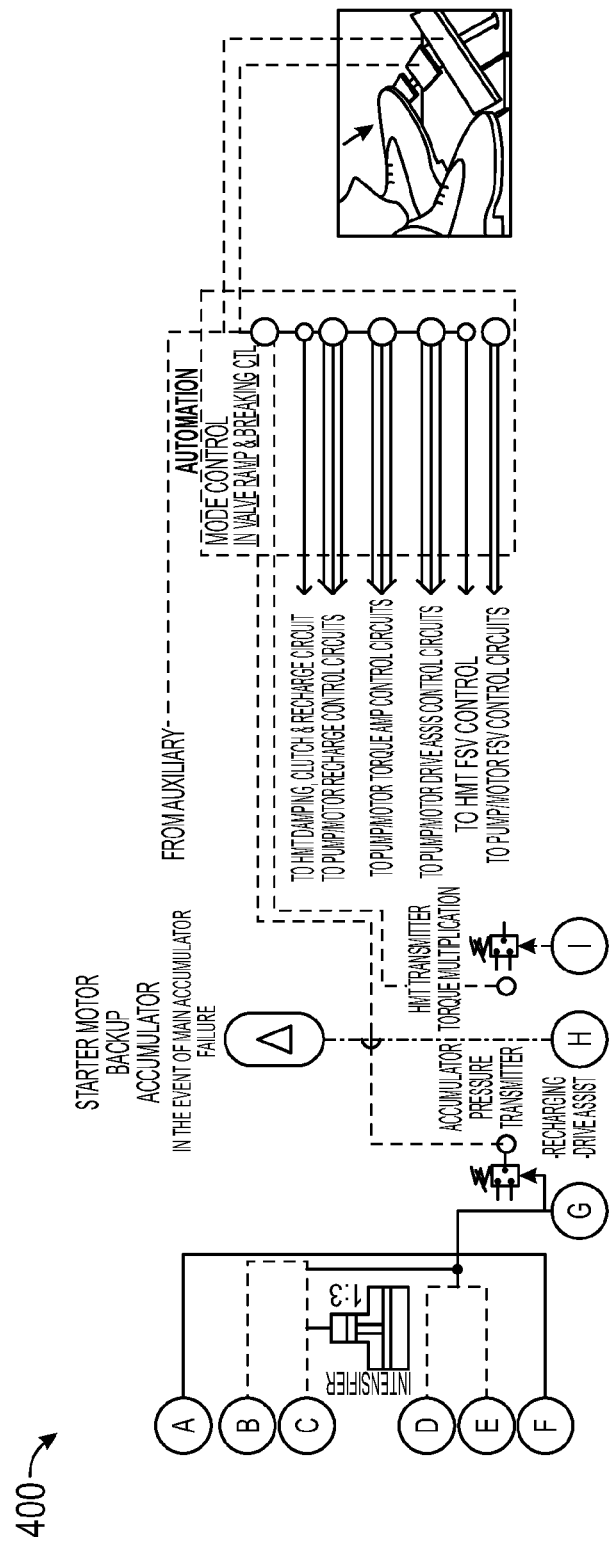
Figure 12A:
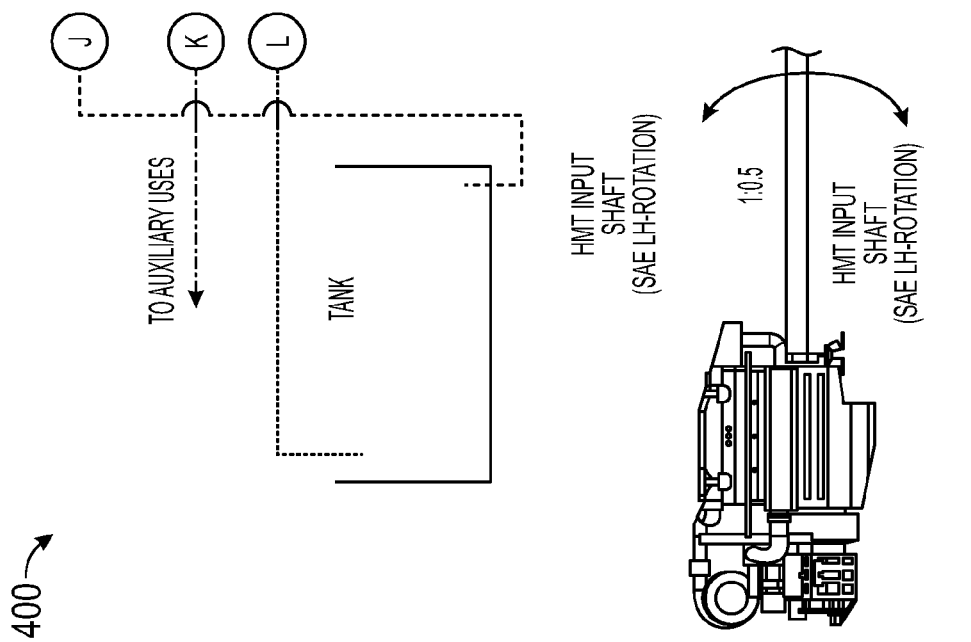
Figure 12A:
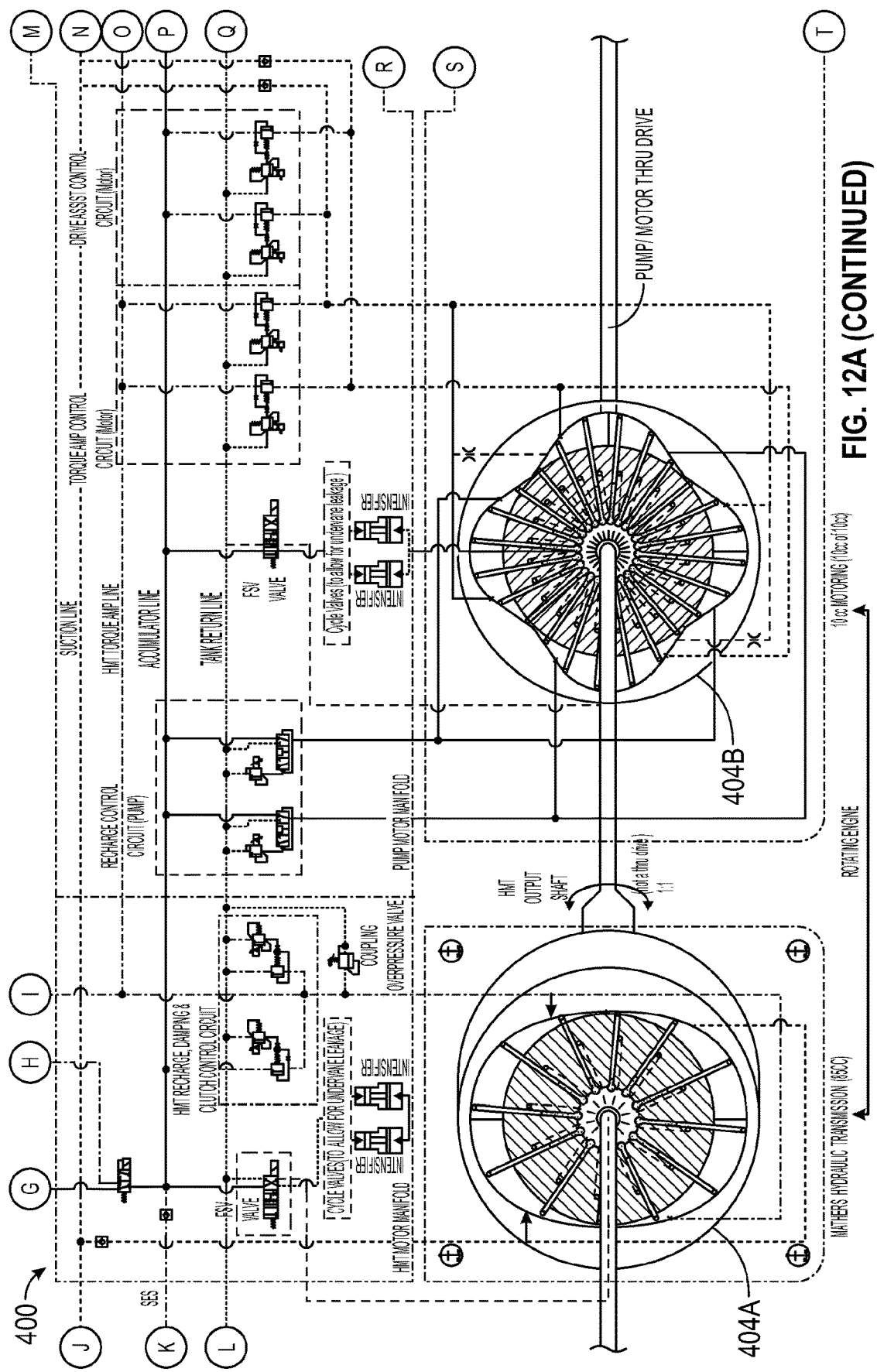
Figure 12A:
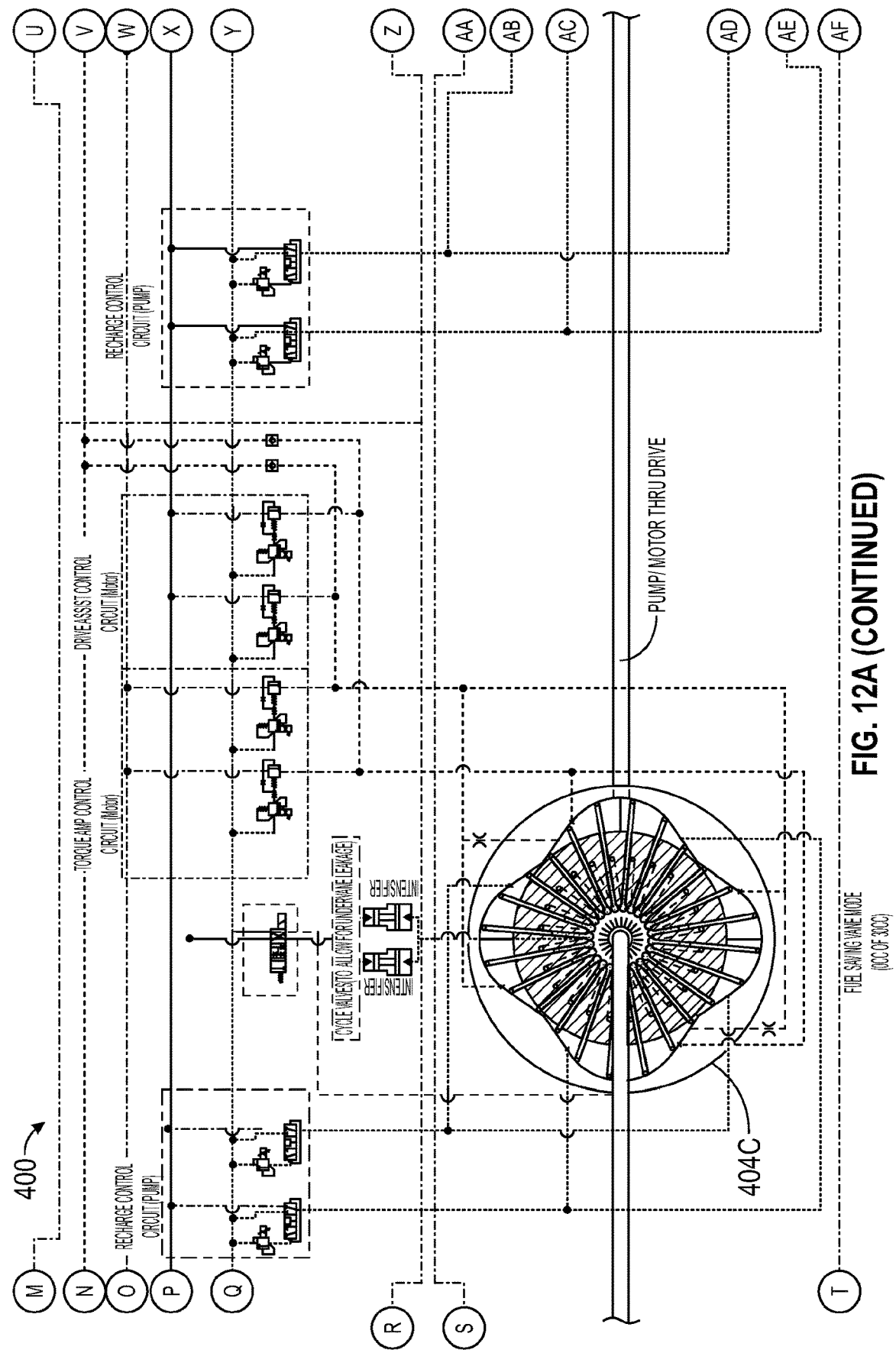
Figure 12A:
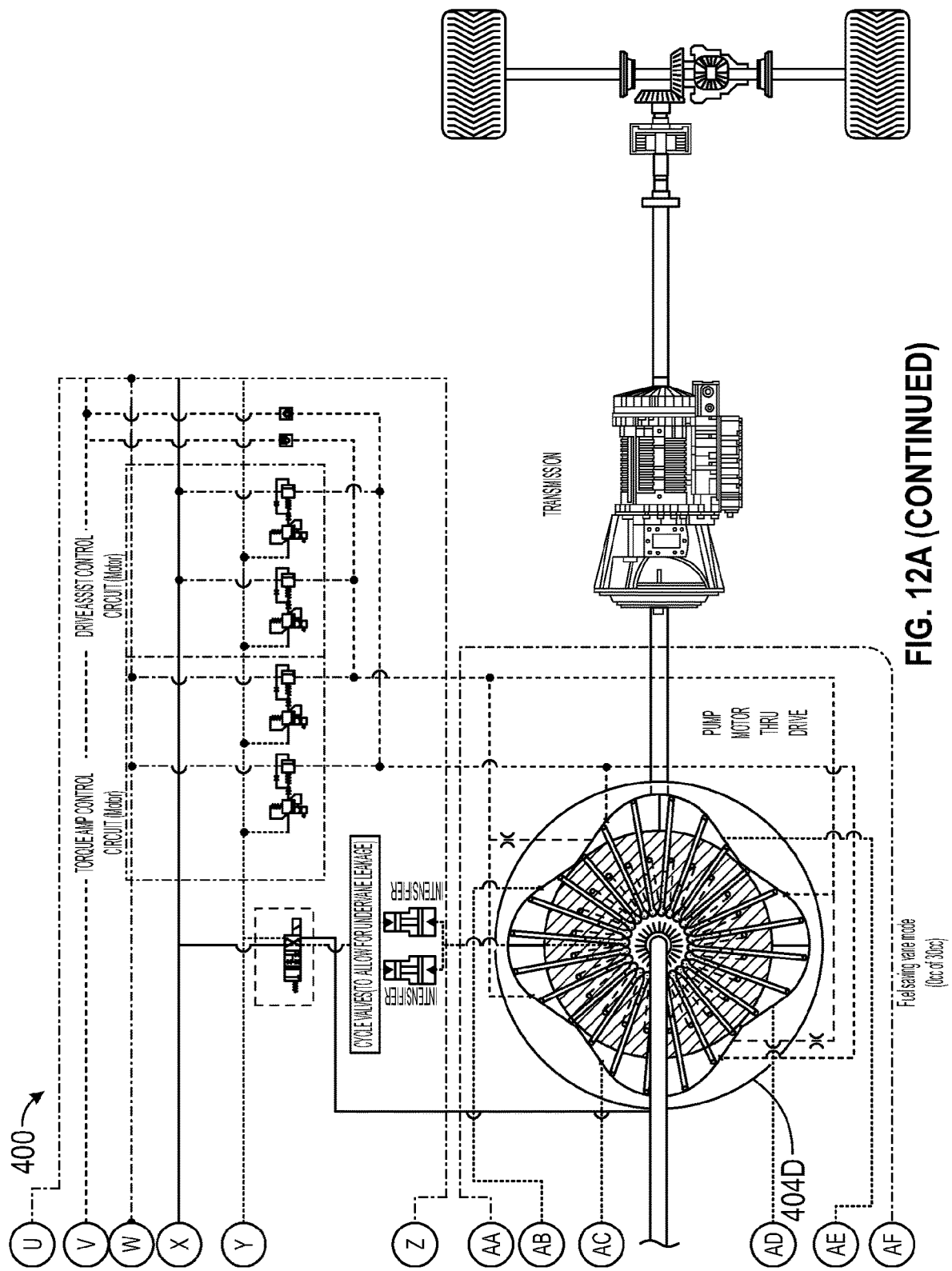

FIG. 12A shows the system 400 of FIG. 10A operating as a starter motor mode. Thus: STARTER MOTOR MODE (MOTORING)

Mode Functional Description

1. STARTER MOTOR—MOTORING

By diverting stored flow from accumulator through the motor while engine transmission is in neutral an angular velocity can be imparted on a stationary engine acting as a starter motor.

1.1. STARTER MOTOR—NO FUNCTION (IN HOME POSITION):

No pressure on motor, dead head on MHT and Shaft Speed Ratio of 1:1.

All Pumps/Motors in FSV Mode.

"RECHARGE CONTROL CIRCUITS" directed to tank (NO SIGNAL)

1.2. STARTER MOTOR—FUNCTION ENGAGEMENT—MOTORING:

Disengage FSV Mode on Pump/Motors as required. Ramp open "DRIVE ASSIST CONTROL CIRCUIT" Valves to create angular velocity of pump/motor 1&2, through locked MHT and into engine. Once engine is started, engine MHT and Pump/Motors to go back to FSV and Engine Idle Mode ready for driving. Due to engine start load requirements, only 2 of six pump/motors is required.

Figure 13A:
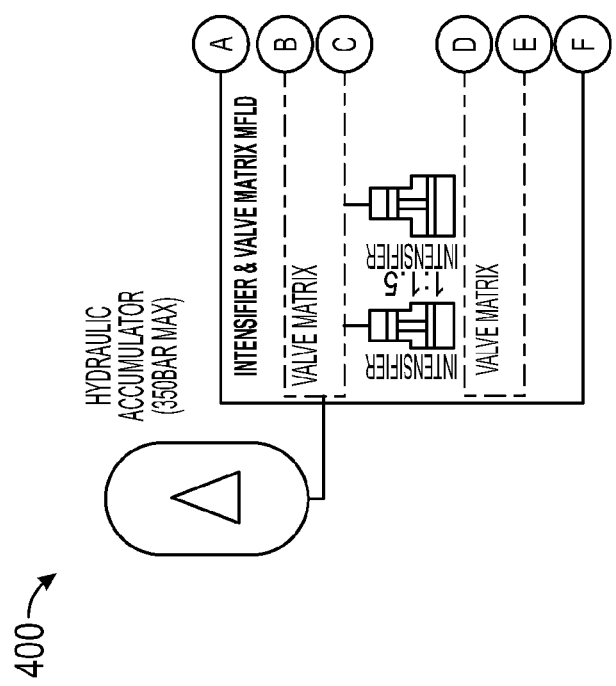
FIG. 13A is a system diagram of the system of FIGS. 7 and 10 during a drive assist (motoring) operation mode.
Figure 13A:
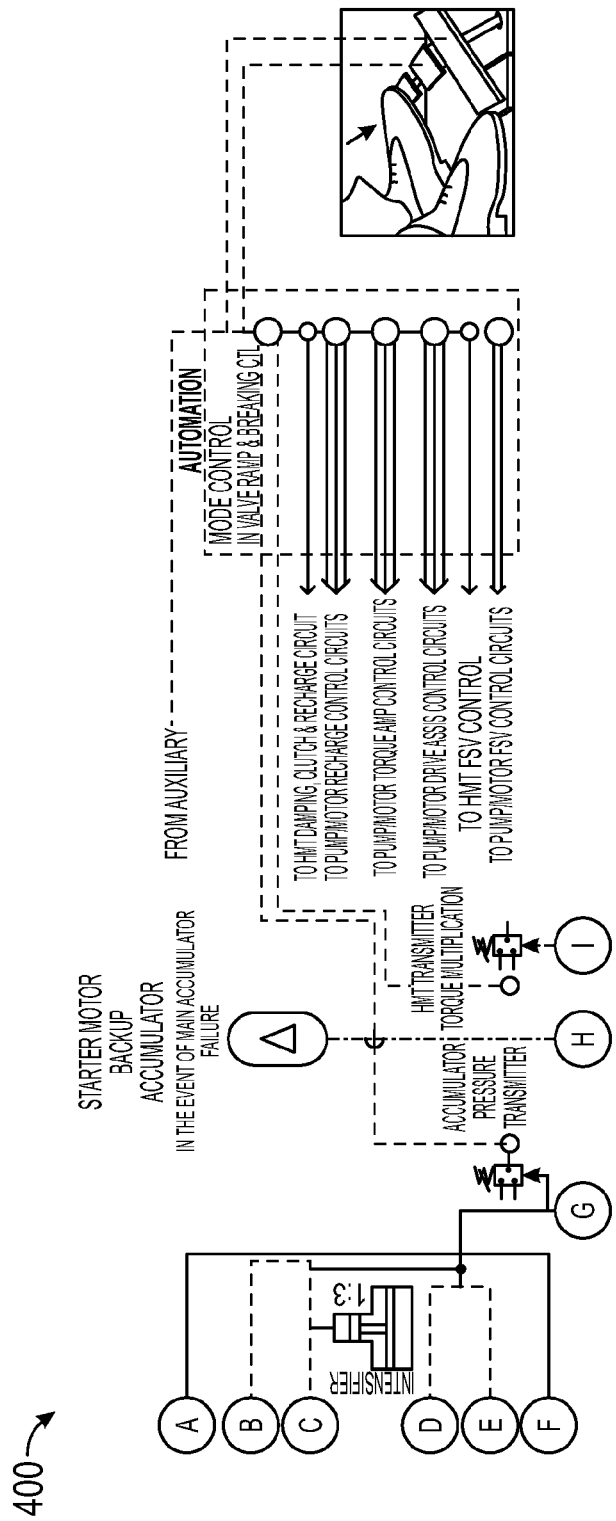
Figure 13A:
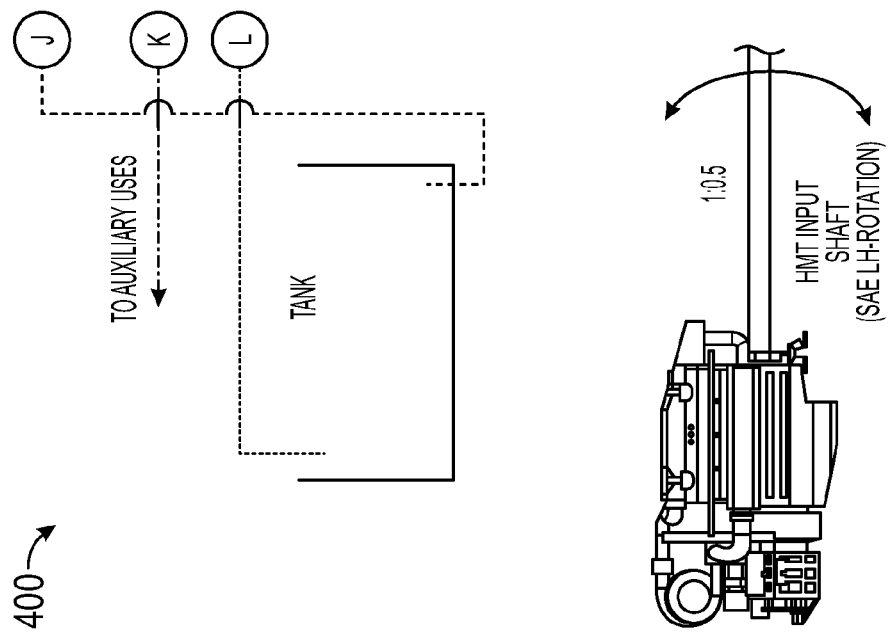
Figure 13A:
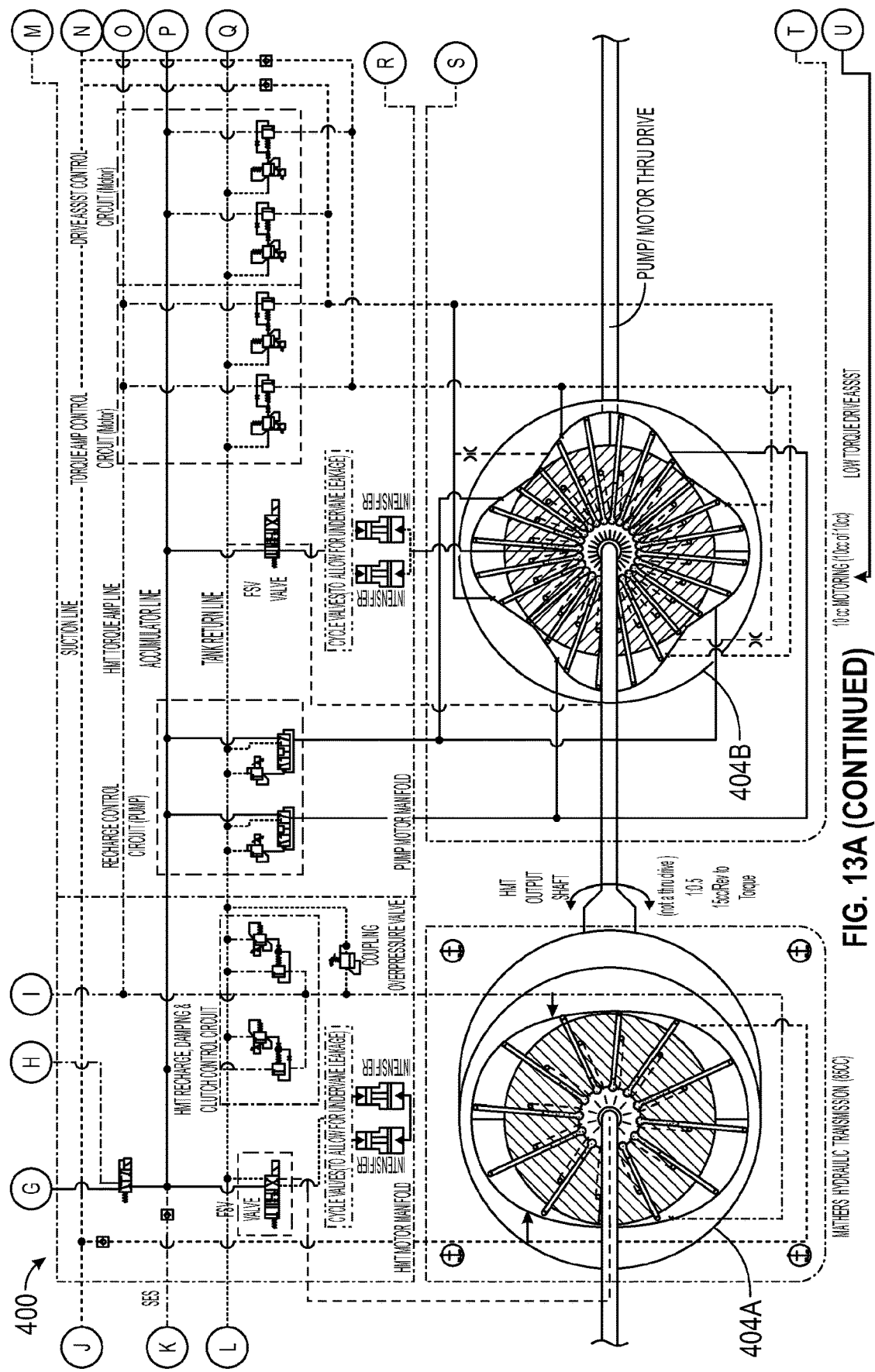
Figure 13A:
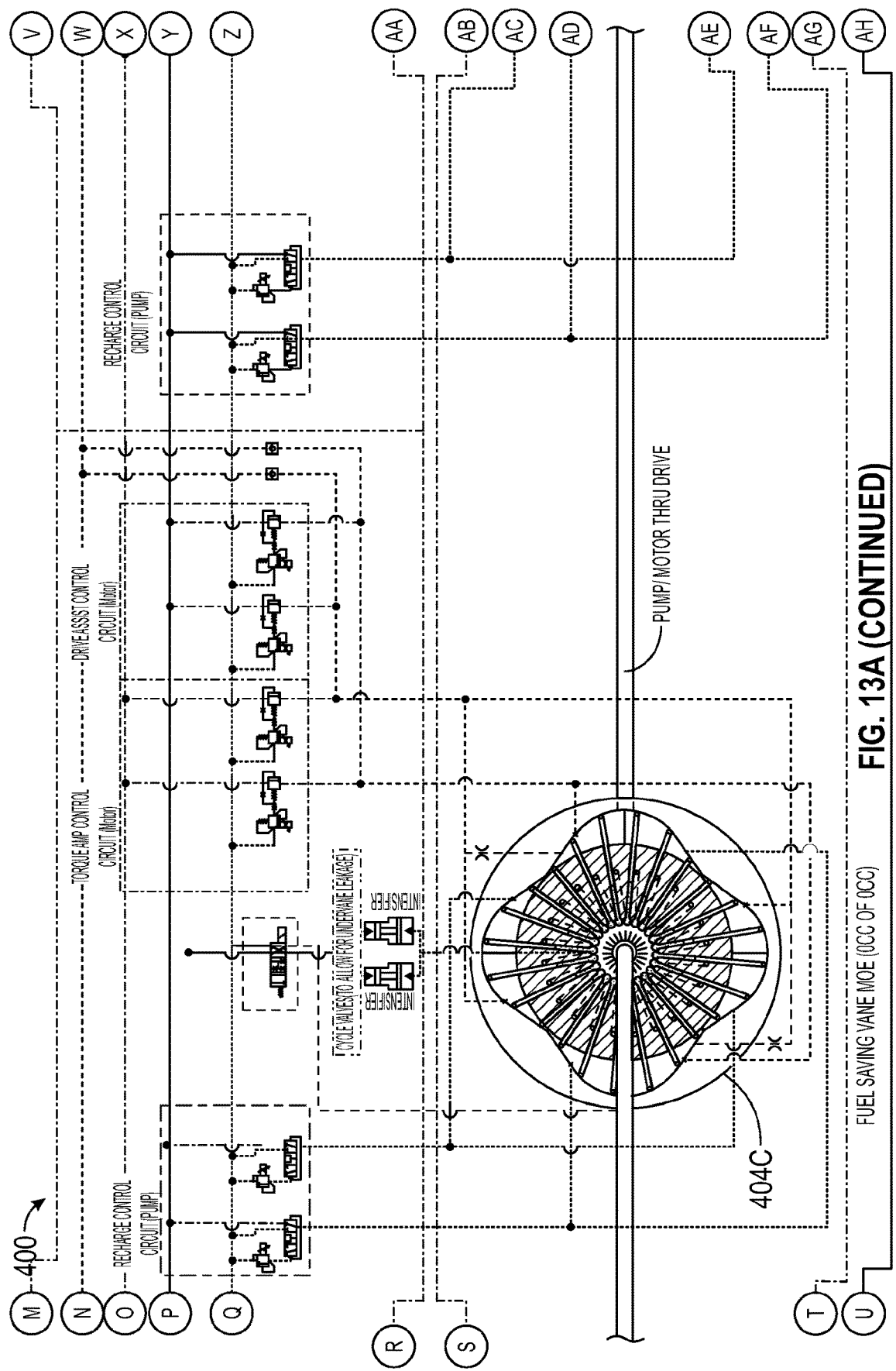
Figure 13A:
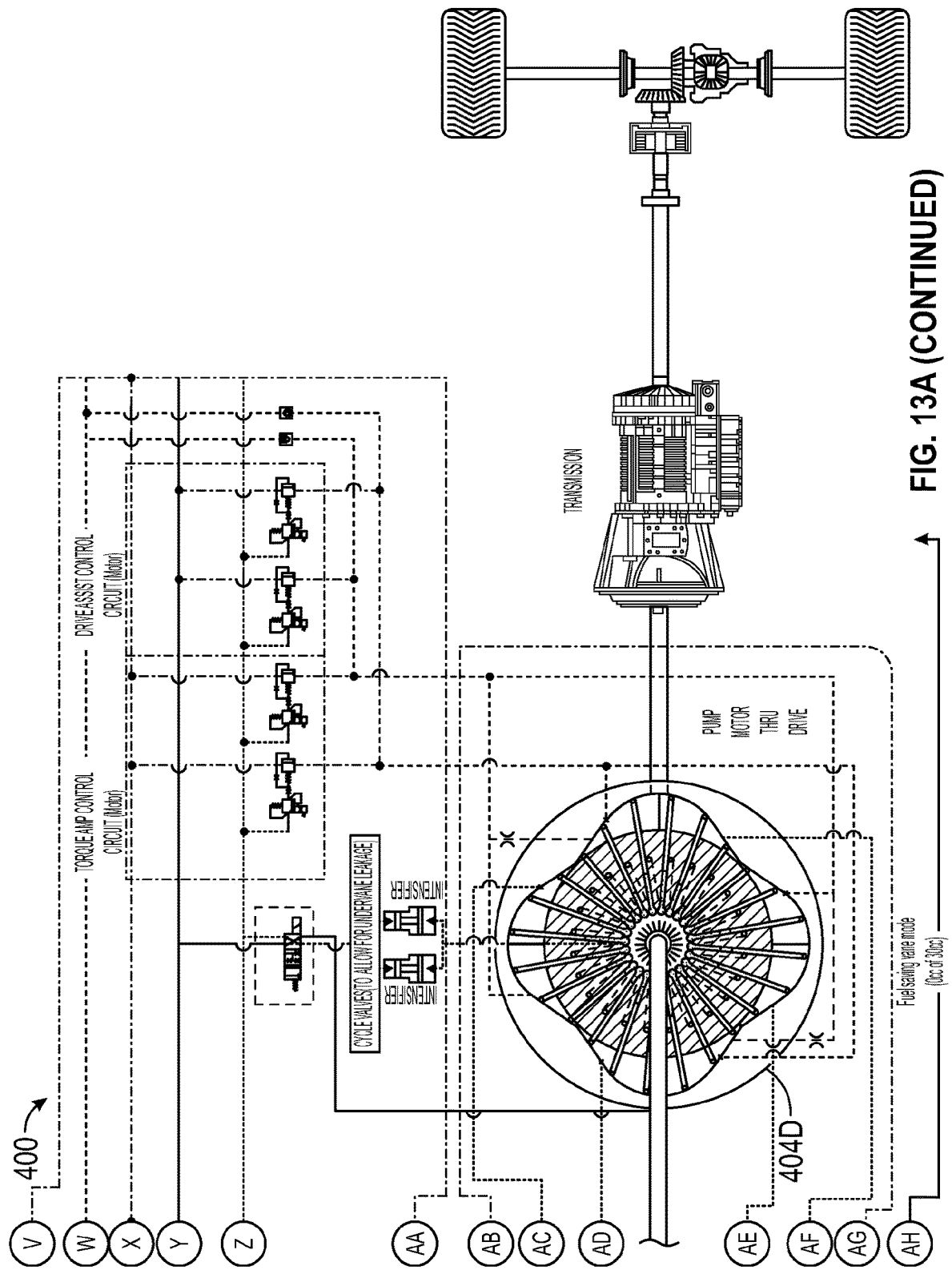
Figure 14A:
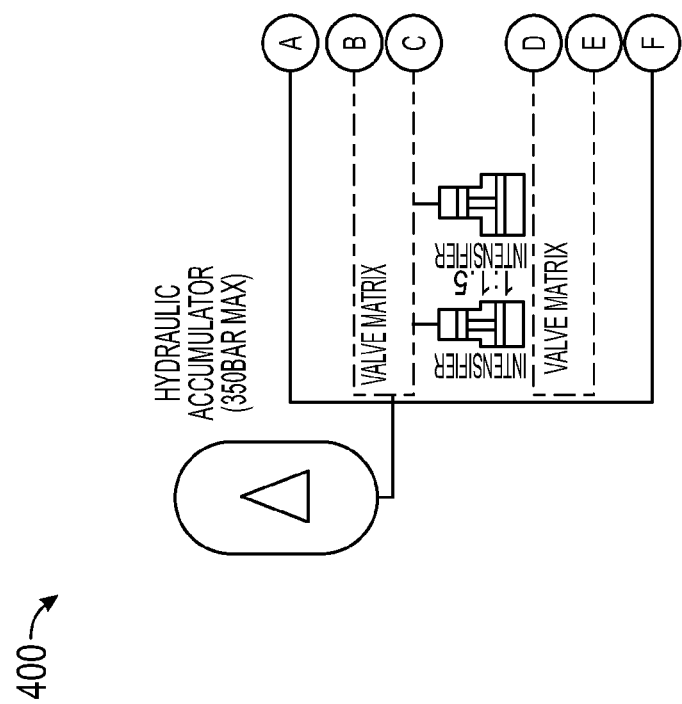
FIG. 14A is a system diagram of the system of FIGS. 7 and 10 during an engine recharge (pumping) operation mode.
Figure 14A:
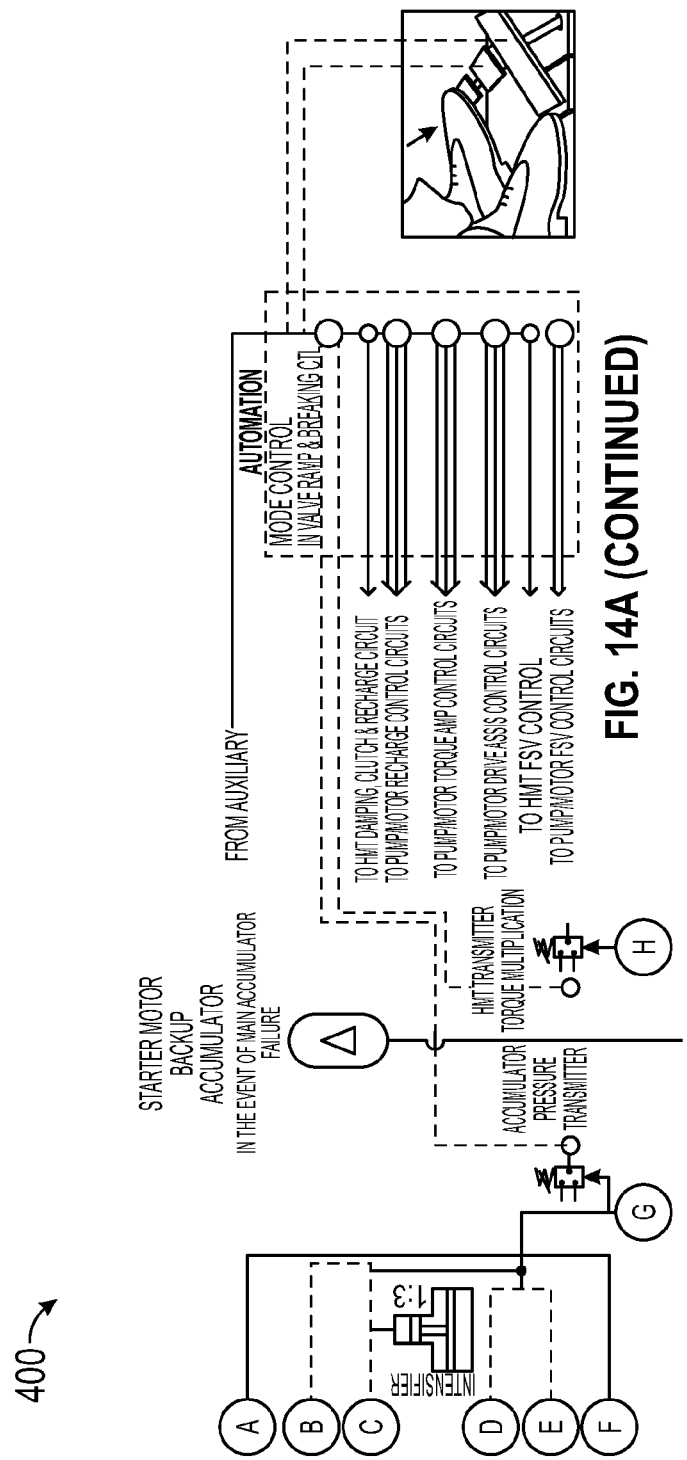
Figure 14A:
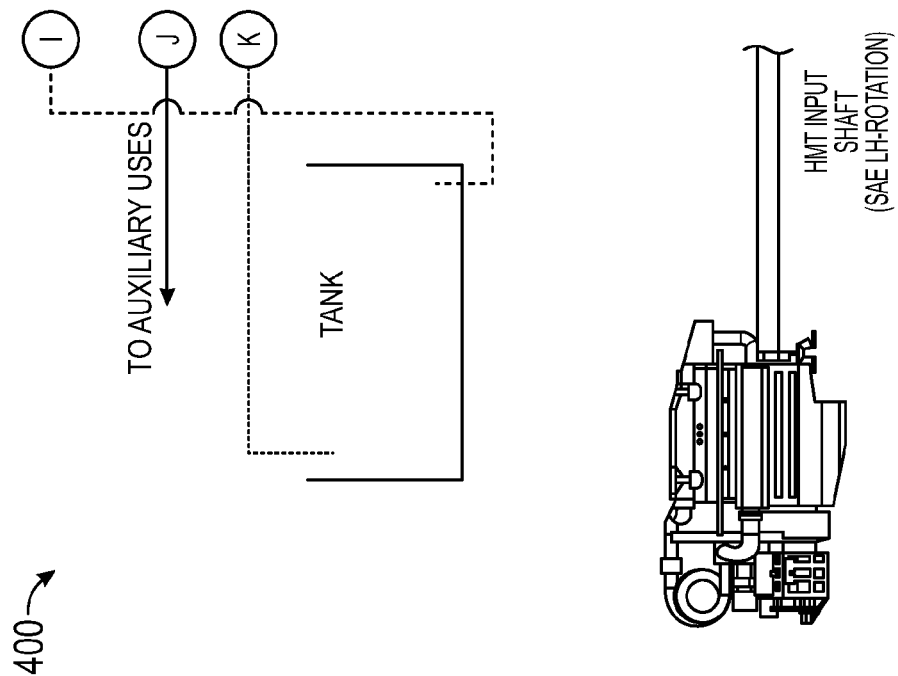
Figure 14A:
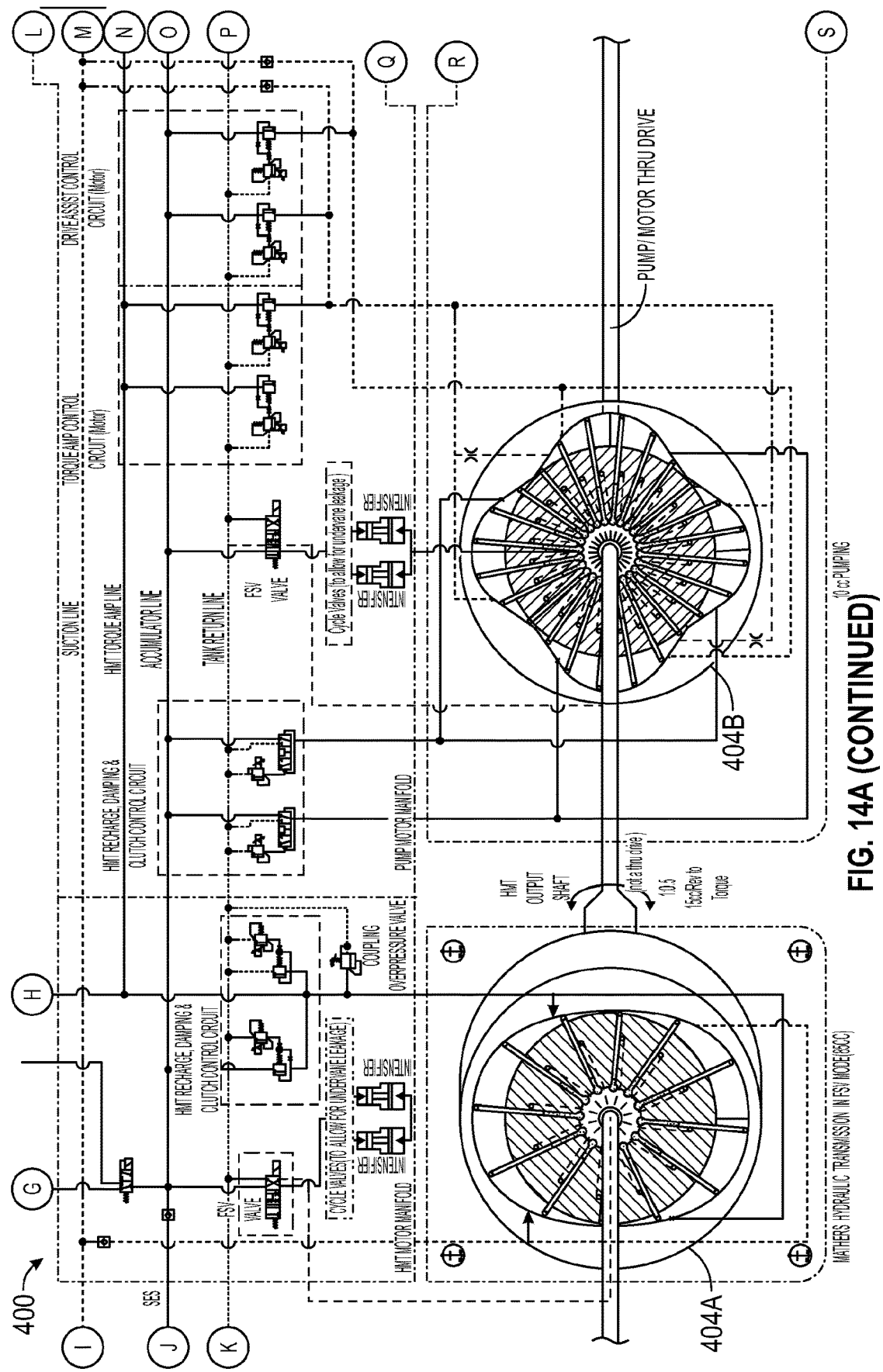
Figure 14A:
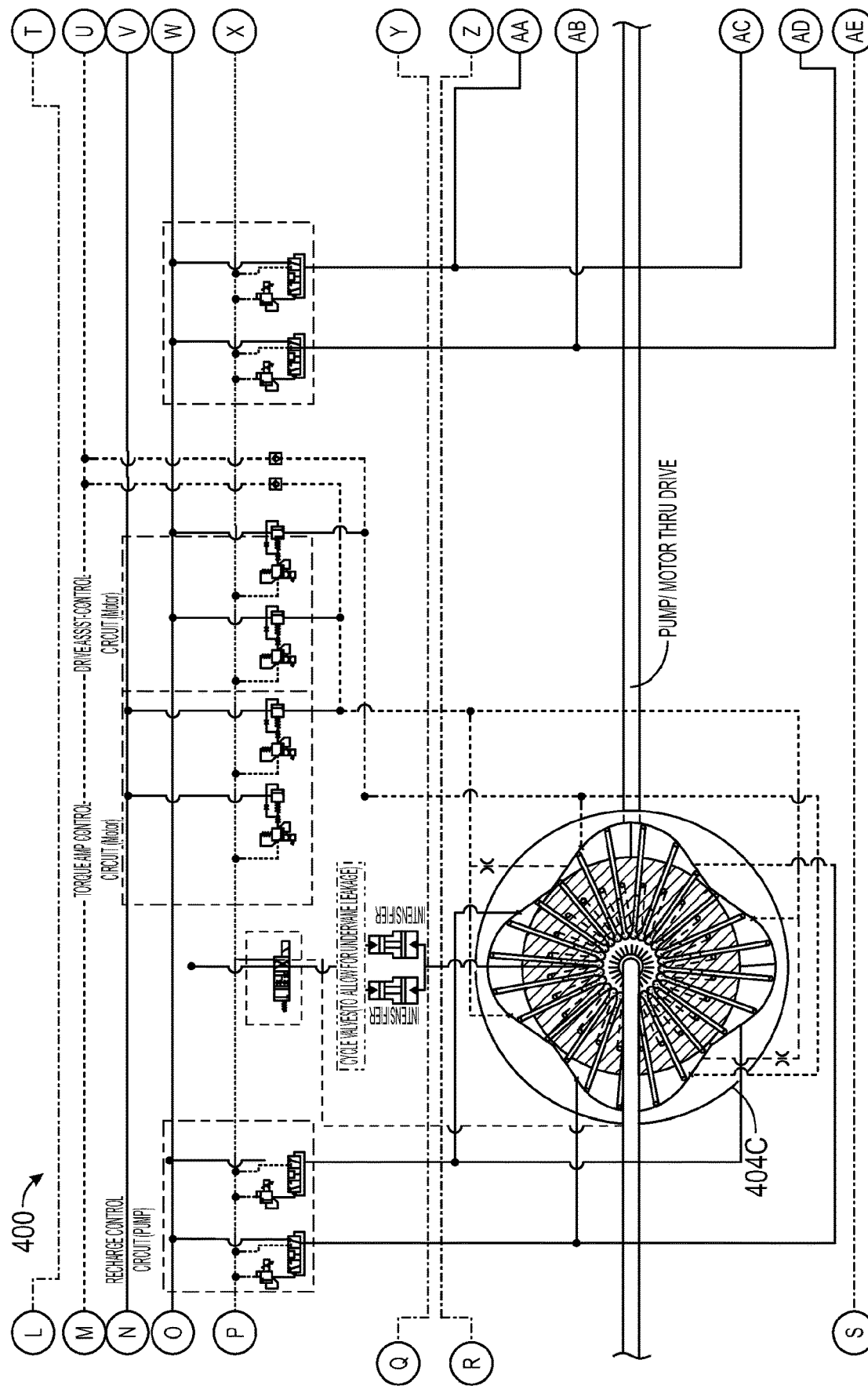
Figure 14A:
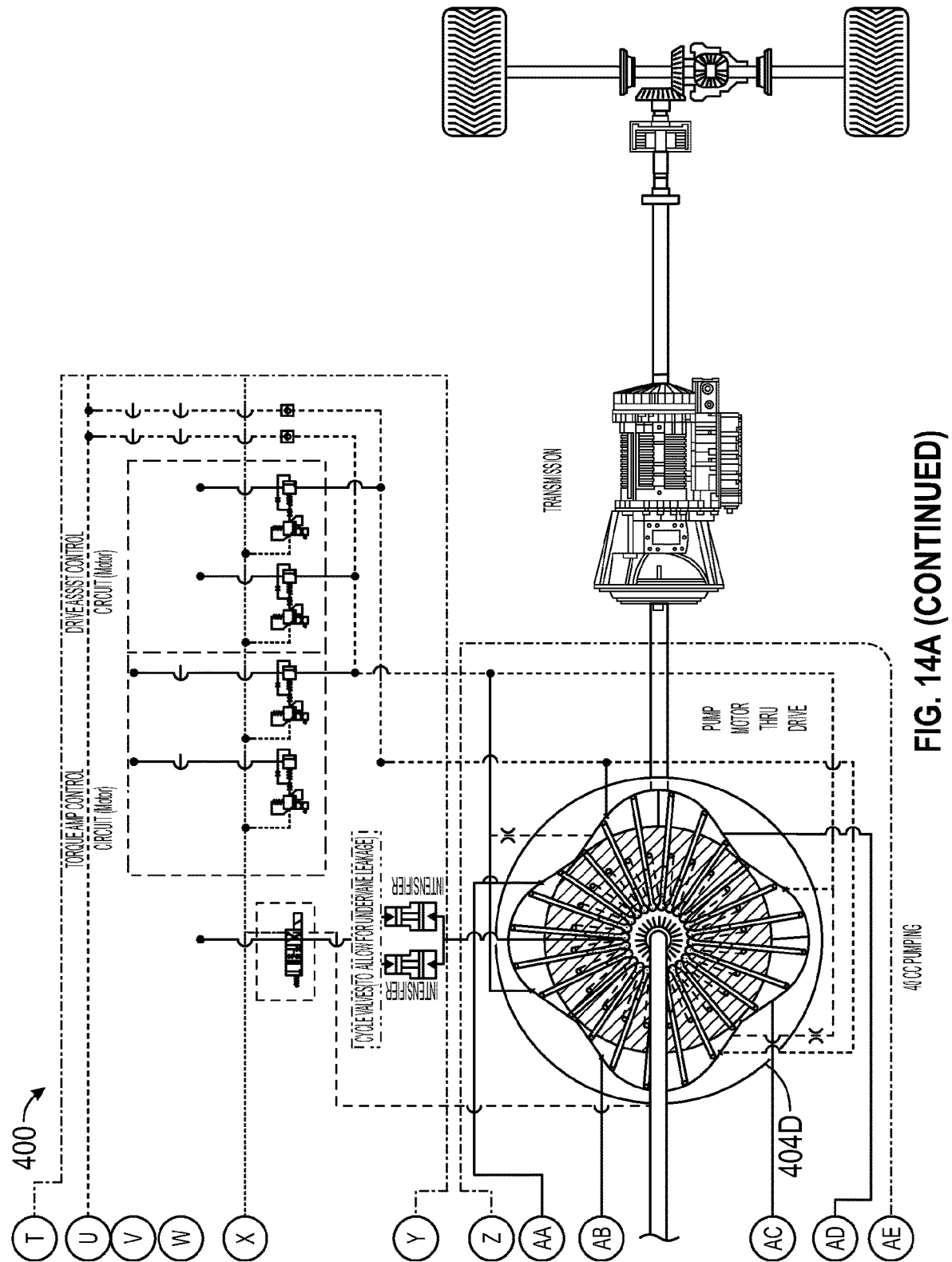
Figure 15A:
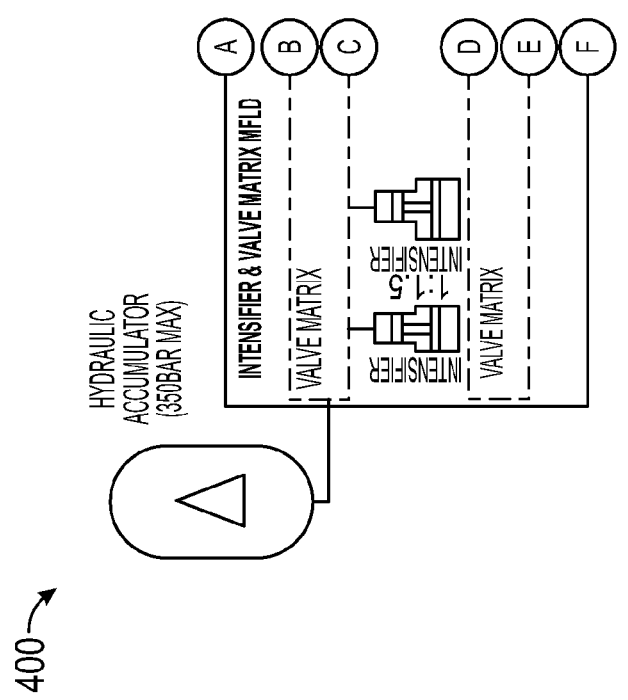
FIG. 15A is a system diagram of the system of FIGS. 7 and 10 during recharge FSV (pumping) operation mode.
Figure 15A:
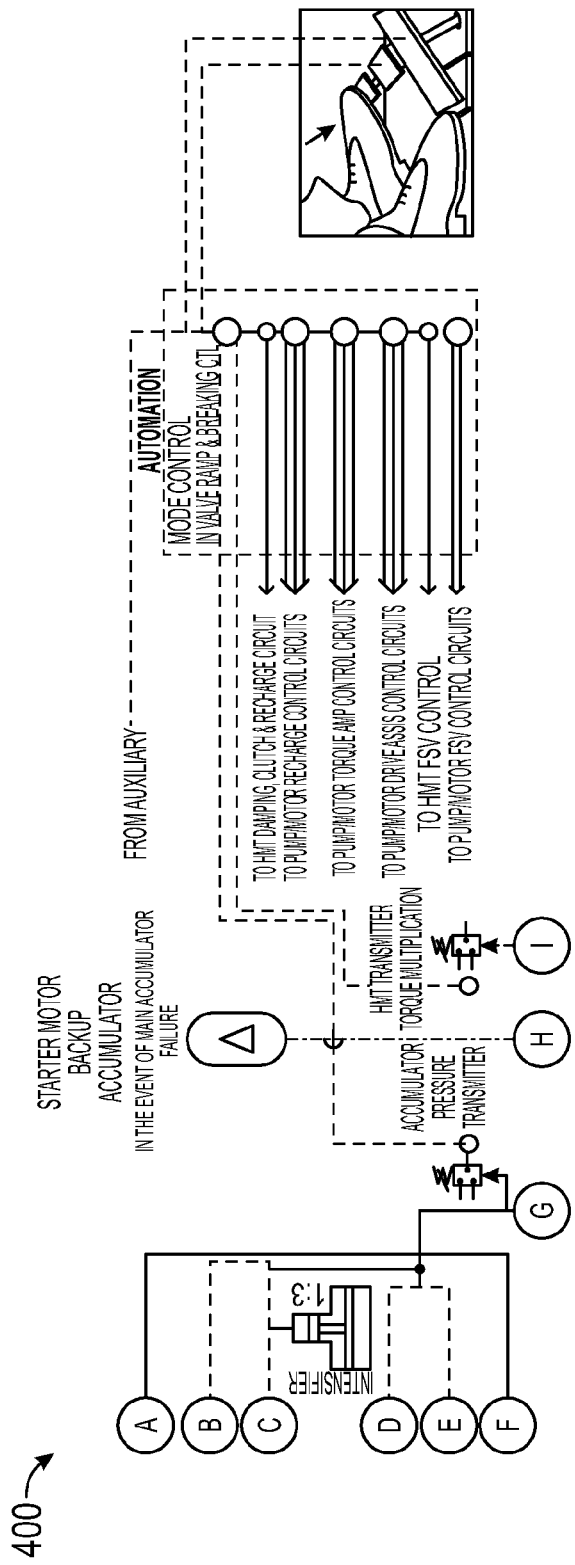
Figure 15A:
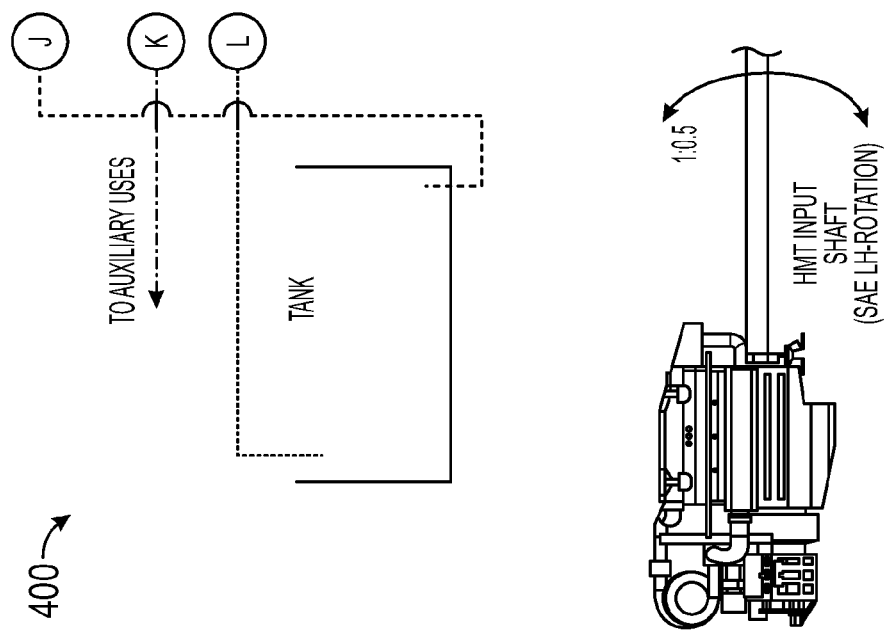
Figure 15A:
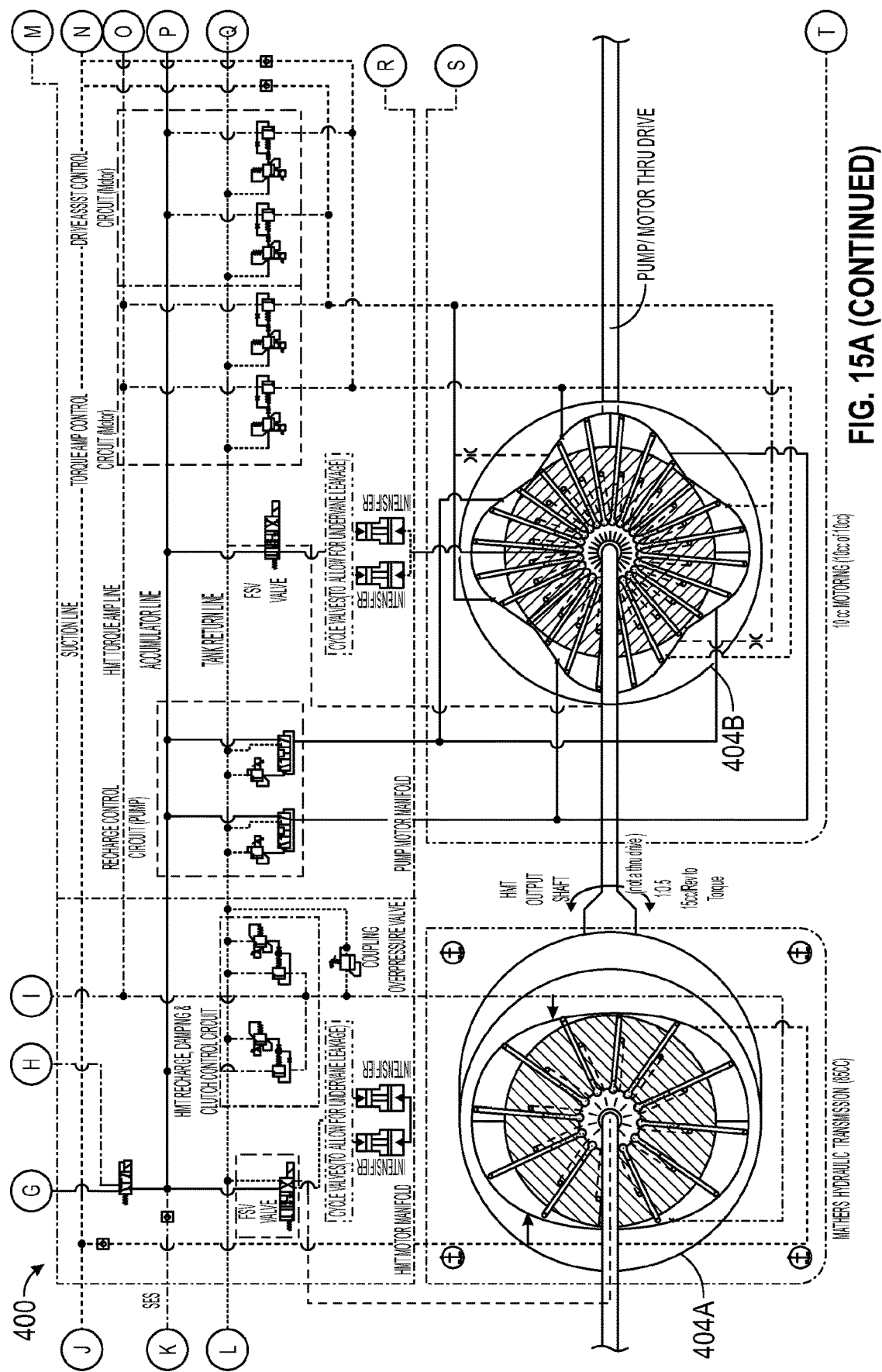
Figure 15A:
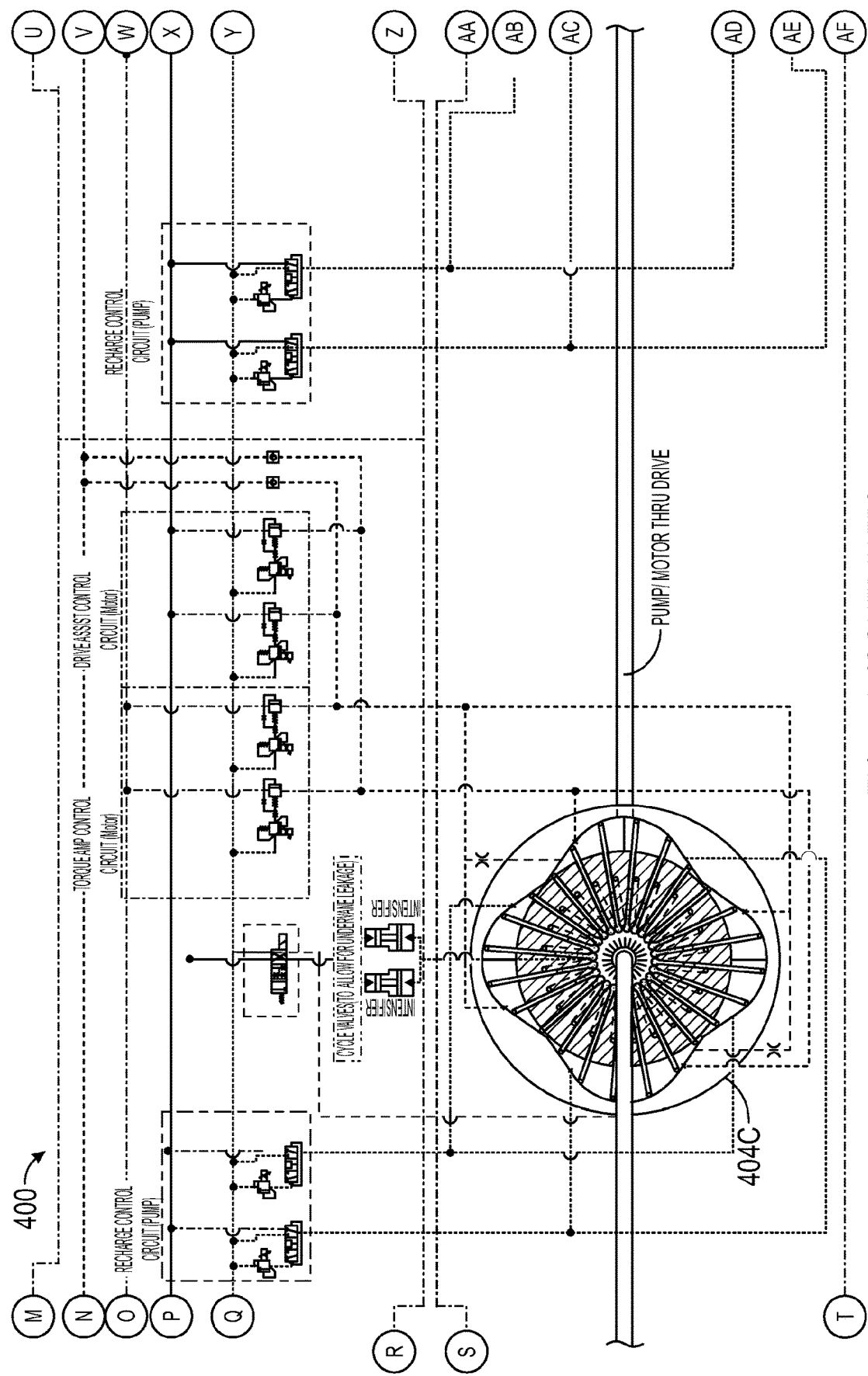
Figure 15A:
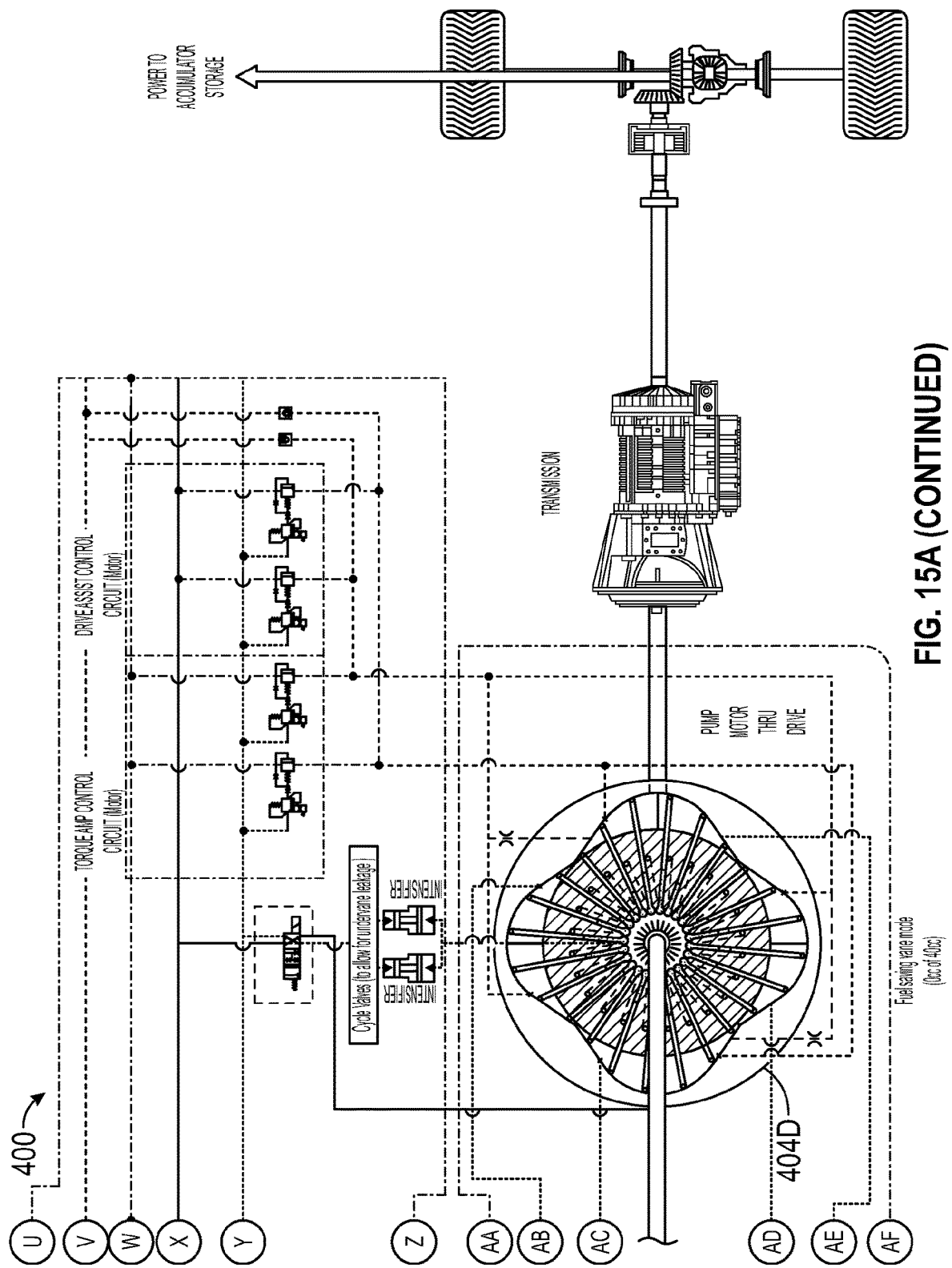

FIG. 13A shows the system 400 of FIG. 10A operating in a drive assist mode (motoring). Thus:

Drive Assist Mode (Motoring)
  Low Torque Assist—4 cc of 30 cc
Mode Functional Description
  1. DRIVE ASSIST—MOTORING
    In the event of continued drive power requirements, the system can function as a drive assist motor where stored flow from the accumulator can be routed through the drive shaft motor while the engine is driving. Therefore, angular torque applied to the drive train by the stored hydraulic energy allows the heavy vehicle to be powered by the engine in addition to stored hydraulic energy, using less fuel.
    Mode shown is of low torque assist using only 2 of 6 pump/motors. If additional torque is required additional pump/motors can be brought online using a higher rate of stored energy and less fuel use.
  1.1. DRIVE ASSIST—NO FUNCTION (IN HOME POSITION):
    No pressure on motor, dead head on MHT and shaft speed ratio of 1:1.
    All pumps/motors in FSV mode "RECHARGE CONTROL CIRCUITS" directed to tank (NO SIGNAL)
  1.2. DRIVE ASSIST—FUNCTION ENGAGEMENT—MOTORING:
    Disengage FSV Mode on Pump/Motors as required. Ramp open "DRIVE ASSIST CONTROL CIRCUIT" Valves allowing hydraulic flow to created additional torque upon pump/motor 1&2 and into drive train. Torque addition and drive assist requirements can be modulated by use of additional pump/motors if required.
    FIG. 14A shows the system 400 of FIG. 10A operating in an engine recharge mode (pumping). Thus:
Engine Recharge Mode (Pumping)
  When Accumulator Low Level and Requires Engine Recharge
  Low Pressure Recharge—30 cc of 30 cc
Mode Functional Description
  1. ENGINE RECHARGE—PUMPING
    In the event of depleted hydraulic energy stores and a low pressure within hydraulic accumulator, the storage system can be recharged from the engine power if required. Mode shown is a low level and low pressure accumulator being recharged by the engine.
  1.1. ENGINE RECHARGE—NO FUNCTION (IN HOME POSITION):
    No pressure on motors, dead head on MHT and shaft speed ratio of 1:1.
    All pumps/motors in FSV mode "RECHARGE CONTROL CIRCUITS" directed to tank (NO SIGNAL)
  1.2. DRIVE ASSIST—FUNCTION ENGAGEMENT & OPERATION—MOTORING:
    Transmission can be in neutral or the heavy vehicle can be in motion under low driving loads. Disengage FSV mode on pumps as required. Ramp "RECHARGE CONTROL CIRCUIT" valves diverting high pressure flow to accumulator storage. Hydraulic flow can be modulated to suit level of charge within accumulator.
    FIG. 15A shows the system of FIG. 10A operating in a recharge FSV mode (pumping). Thus:
Recharge Fsv Mode (Pumping)
  High Pressure Breaking Torque—4 cc of 30 cc
Mode Functional
  1. RECHARGE INC HMT FSV MODE—PUMPING
    In the event of heavy vehicle braking or when descending a decline, the system can function as pump allowing braking torque to be converted to high pressure hydraulic flow and stored in the system accumulator. If no drive power is required common to a descending a decline scenario, the MHT coupling can be set to FSV mode and the engine can be at idle or switched off. Mode shown is of braking torque that would be expected when a heavy vehicle is descending a decline. Braking torque can be increased by allowing further pumps to be brought online as required or if accumulator is of low level and low pressure, braking torque can be applied to multiply pumping units allowing for quicker recharging of accumulator energy stores.
  1.1. RECHARGE INC HMT FSV MODE—NO FUNCTION (IN HOME POSITION):
    No pressure on motors, dead head on MHT and a shaft speed ratio of 1:1.
    All Pumps/Motors in FSV mode.
    "RECHARGE CONTROL CIRCUITS" directed to tank (NO SIGNAL)
  1.2. DRIVE ASSIST—FUNCTION ENGAGEMENT & OPERATION—MOTORING:
    Engage MHT FSV Mode allowing engine to be independent from drive train. Disengage FSV mode on pumps as required with flow directed to tank. Ramp "RECHARGE CONTROL CIRCUIT" valves diverting high pressure hydraulic fluid created by braking torque to accumulator stores. Hydraulic flow can be modulated to suit level of braking torque required or level of charge within accumulator.
    FIG. 16 provides a brief summary of various system and apparatus aspects.
Functional Description:
  8 Ports
    4×300CC and 4×100CC
    Very large OD for Vane Pump
  12 Vanes
  Roller Vane with Roller Vane Extension Ring
  Fuel Saving Vane Pump (FSV) Technology
  Controlled accumulation charging during braking events
  Power steering and auxiliary oil flow priority over accumulator charging. Control to proportionally divert oil where required.
  Undervane independent of system
    Roller vane allows high undervane pressure over full revolution.
    Eliminates vane disengagement issues caused by intermittent high overvane pressure causing vane to bounce when changing segment.
    Proportionally controlled undervane pressure to suit full range of load and speeds.
  Modes
    Power steering and auxiliary backup pump
      High, medium and low flow modes
    Engine Starter Motor
    Drive Assist
      High, medium and low flow modes
    Accumulator charging
    FSV (Fuel Saving Vane) neutral mode
  High & Low Modes
    Note: Dry port valve and cycle have same functionality in both pump and motoring modes. Duplicated fucntionality shown for patent only. Cycle valve will also allow for medium flow mode.
    Dry valve to allow flow mode in backup power steering/Aux/accumultor charge pump modes Dry valve to allow low flow mode in drive assist motor mode or cycle valve to allow low & medium flow mode in backup power steering/aux/accumulator charge pump modes Cycle valve to allow low & medium flow mode in drive assist motor mode.

In further summary:

Component Feature Summary

6. Roller Vane

Allows for higher undervane pressures over all quadrants of MHT and Pump/Motors.

Allows for use with water glycol and other non-oil based pumping fluids.

7. Pump/Motor FSV

Allows for either undervane pressure or vane clamping.

Undervanve pressure nesuring vanves are in outmost position and forced againt cam ring preventing any leakage.

Vanve clamping prevents vanes from extending by locking in retracted position preventing any pumping/motoring with negligible friction losses.

Vane Clamping prevents vanes from extending by locking in retracted position preventing any pumping/motoring with neglibible friction losses.

Undervane Presure ensuring vanves are in outmost position and forced against cam ring preventing leakage.

Double Pump/Motor Function

Pump/Motor consists of four quadrants opposed to two allowing for two additional pump/motors on one rotor and ring arrangement.

24 vanes to allow for 2× motors per rotor and ring.

MHT Intensifiers

Used to allow for lower pumping pressure with higher storage pressures and storage efficiency. This will likely be required for use with water glycol system.

Also provides better flexibility on storage power to suit pump/motor or auxiliary hydraulic functions such as tippers or truck mount cranage, etc.

Note, due to valve matrix, system can work with both intensification and de-intensification as required.

Undervane Pressure Intensifiers

To ensure undervanve pressure is above that of coupling pressure at all times. Often torque will spike on drive train of the unit which will cause pressure spikes in the unit. This is to prevent this spike over under vane pressures, pushing the MHT vanes downwards and leaking over the vane tips will cause undesirable slipping of coupling.

MHT+3 Duel Pump Motors

Variously sized pumps/motors

Figure 17:
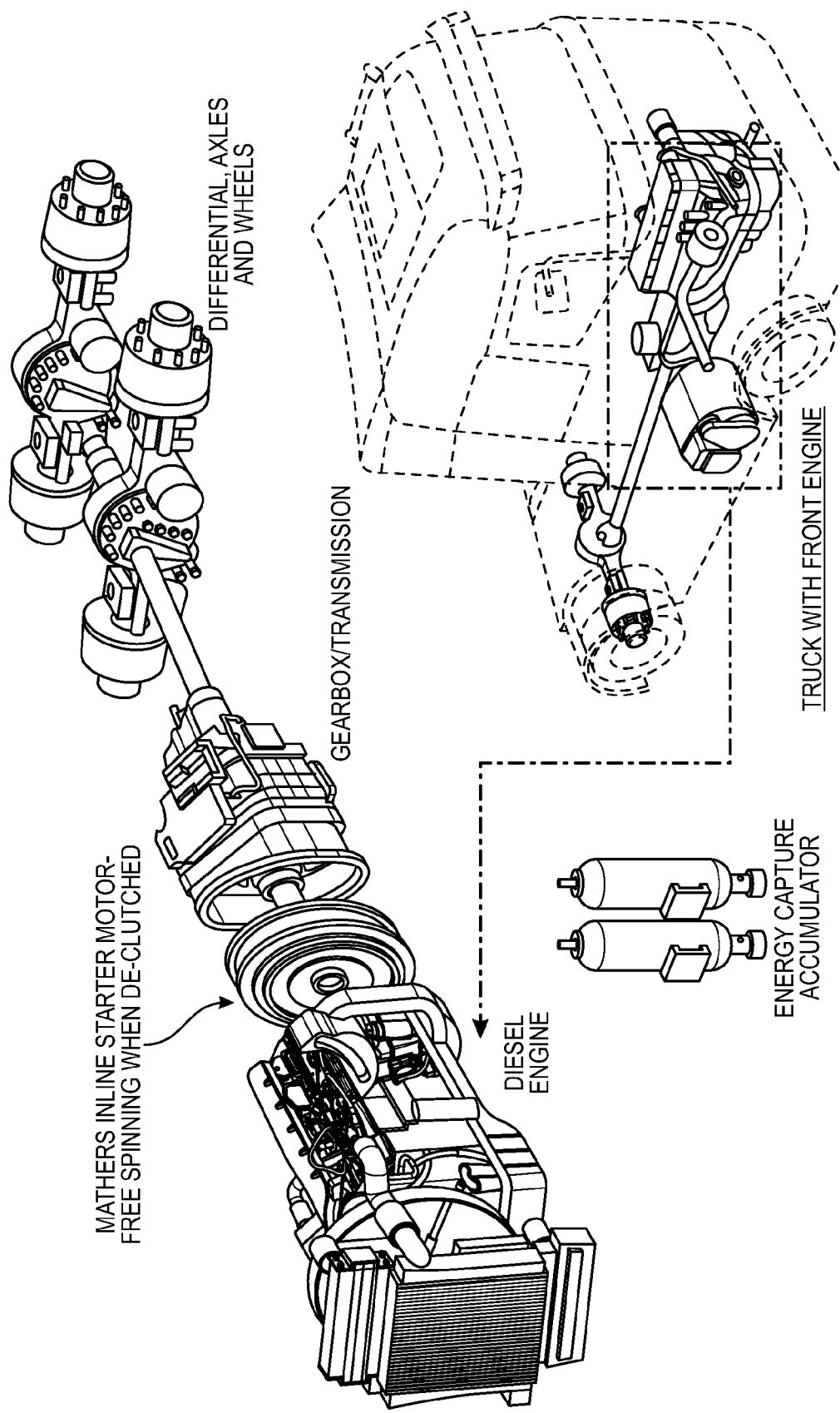
FIGS. 17, 17A shows one of the systems and apparatuses disclosed herein applied to a truck according to an example embodiment.
Figure 17A:
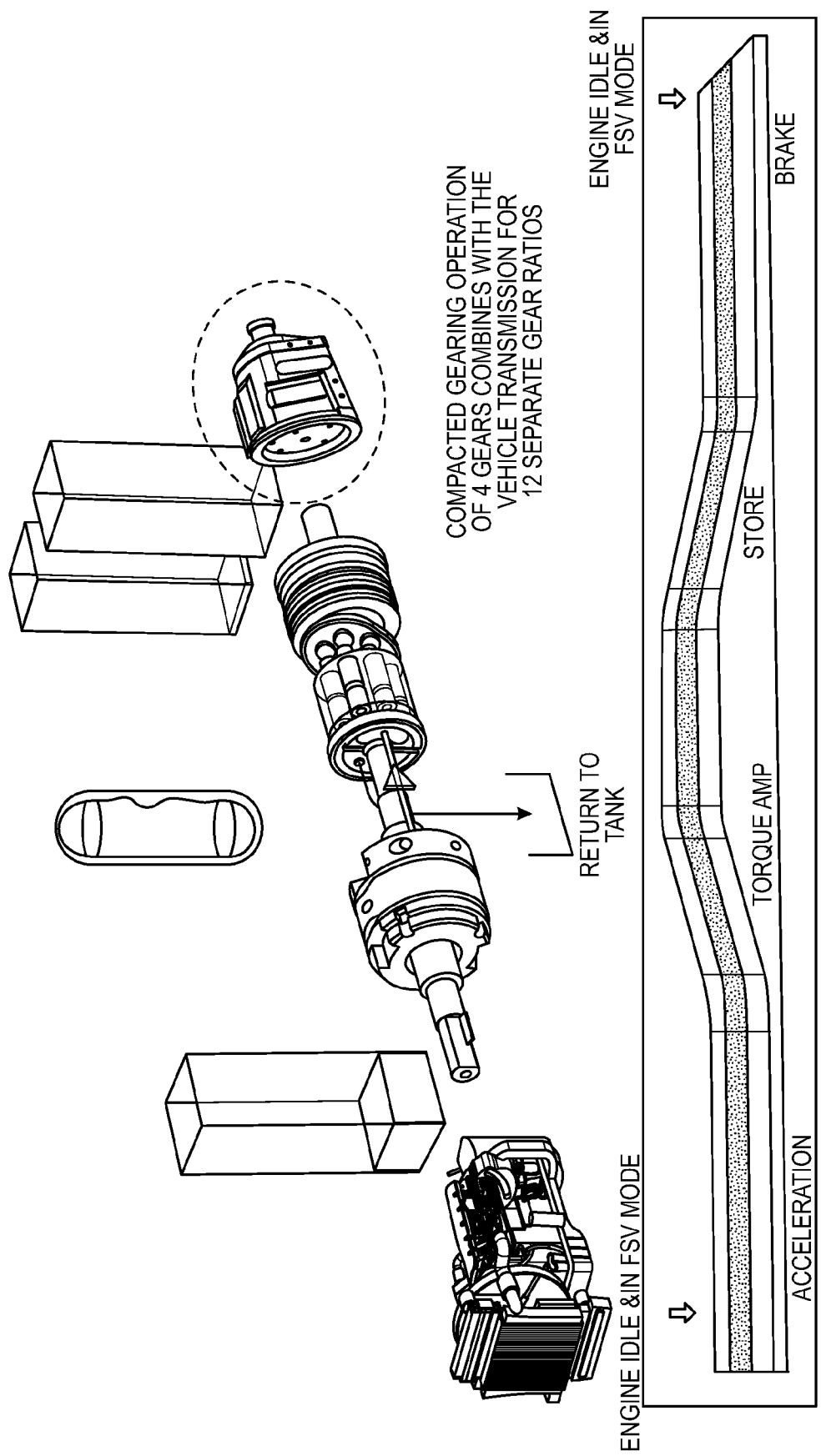
Figure 18:
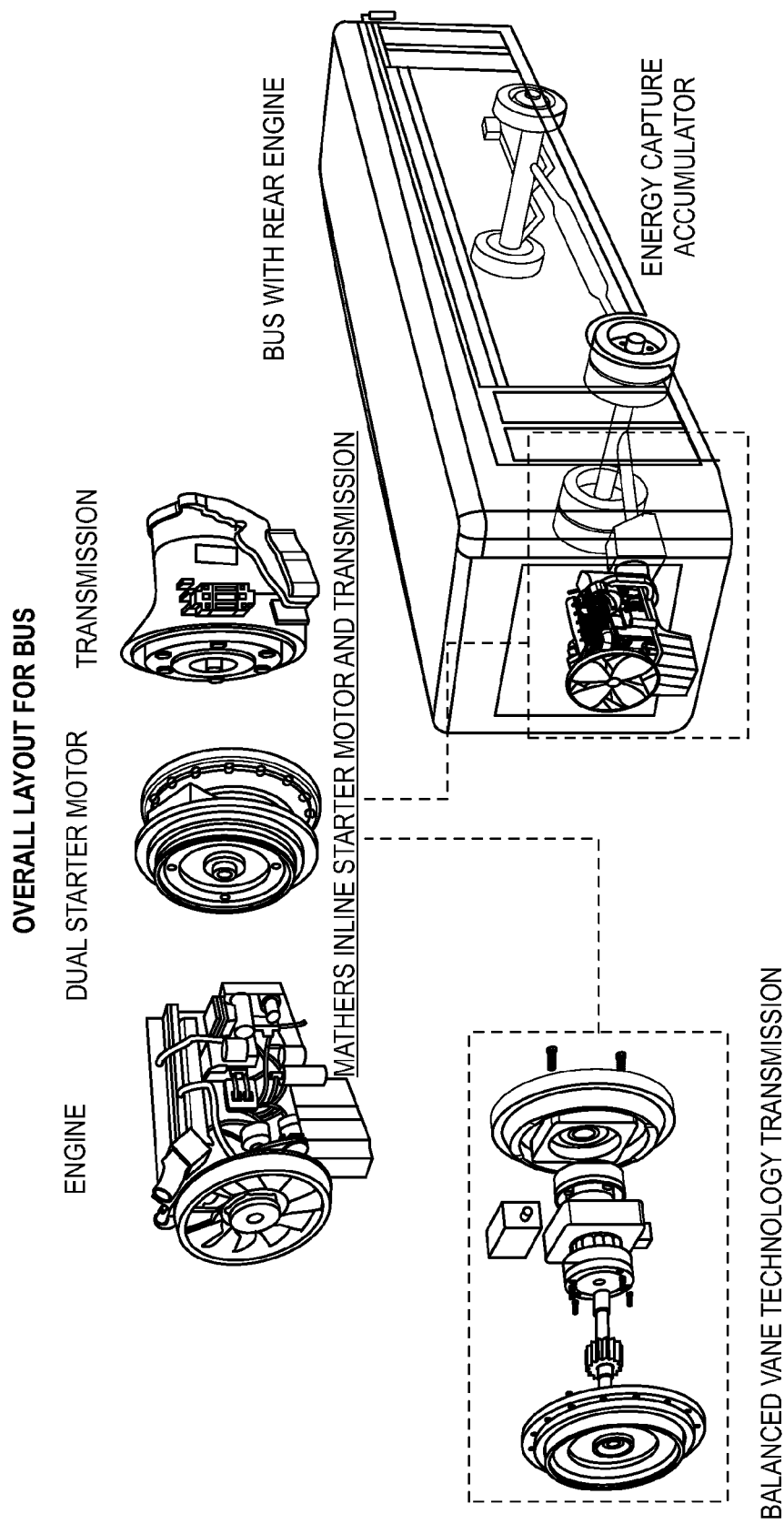
FIG. 18 shows one of the systems and apparatuses disclosed herein applied to a bus according to an example embodiment.

Additionally, for reference in review of FIGS. 17, 17A and 18 (applications of systems and apparatuses discussed herein to buses and trucks:

Mathers Starter Motor Combination Overall Layout for Truck or Bus:

Using Mathers Inline combined fluid transmission and starter motor mounted between engine and drive gears.

Combined transmission coupling and dual high speed starter motor for on & off highway machinery.

Store the hyraulic energy needed for engine start into accumulators.

Fluid options: mineral oil—environment friendly, fire safe water gycol.

Operate the transmission to both power the drive shaft to the gears plus fee pressurized hydraulic power to starter motors to amplify drive torque.

As vehicle speed increases, drop out the flow to one section of the starter motor and the vehicle speed increases just as if a highspeed gear is engaged.

As vehicles speed increases then flow to the second motor section ceases and the vehicle speed increases again.

Select again as required the next gear for higher or lower speed operation.

Anticipated General Gear Requirements:

Bus Operation-Forward-Two Gears—6 speeds

Truck Operation-Forward—Four Gears—12 speeds

Truck or Bus—Reverse-One Gear—3 speeds.

Combined transmission coupling with dual high speed starter motor for all on & off highway machinery.

Smooth shockless gear change to eliminate tail shaft and universal gearing damage by hydraulic control.

Function

Starter motor

Conventional Vane Pump technology

Rotor & Ring Operation

Vane Capture Technology

Application

Starter system with hydraulic power regeneration

Auxiliary power source for any operation: crane, tipper, waste truck, earthmover, etc. by double displacement starter motor assembly Allows flow sources and level of particular applications.

Benefit

Environmentally friendly, low cost and fire safe water glycol to replace mineral oil in select applications.

No hydraulic whine to ensure cabin remains noise reduced.

No transmission shock from gear changes, sudden power need during travel from sharp inclines that cause devastating damage to tail shafts and universal drives that cause fuel increases and services replacement.

Typical Vehicles Requiring Hydraulic Power for Function Operation Eliminates separate hydraulic pump needs and this power source comes with minimum extra cost and complexity for:

Tipping/Dump trucks

Concrete Agitators/Concrete Pumps

Waste/Refuse Collection

Fluid Transfer Power Source

Crane Operation

Military Use

Regenerative braking energy capture system for fuel savings to meet the Petersberg Climage Diaglogue Objectives.

Mathers Fuel Saving System

Regeneration Opportunities for Significant Fuel Reductions.

Drive Torque amplification opportunities.

Reduction in transmission parasitic neutral losses by significant reduction in gearing without reduction in generated drive torque.

Reduction in engine power surges that cause industrial emissions and waste fuel and over speeding fines.

Smooth shockless transfer of torque and power from gear change sudden sharp road rises that currently devastate transmission gears, tail shafts, universals and tires, so fuel use increases from overall efficiency degradation.

Efficiencies and Benefits:

Up to 15% or more fuel savings by hydraulic starter and system technology. 20-25% with power regeneration.

High dynamic engine start/stop.

Highly beneficial to heavier vehicles, using diesel, gas engines and battery power vehicles.

Reduced brake wear with power regeneration.
Fuel reduction from conversion of engine fan to energy capturing wind trubine at road speed.
Contribute to European Manufacturers Associateion (ACEA) objection of 20% reduction in $CO_2$ emissions by 2025, importantly, including buses and vehicles with automatic transmissions.
Image:
Bus Model Example 600 CC PSC. 300 CC and 150 cc dual motor. Motor vanes in separate displacements not timed equally. Outcome would be instead of 12 steps as per a 12 vane motor, it would be a 24 step motor for higher starting torque which is currently an estimated 30% or more lower than current operational efficiency.

Gearing. 600+300+150:1050. Increase pressure up to say 50% in the lower gears even in very heavy loaded conditions on a steep slope for some seconds would be acceptable on most buses and trucks. On though the BULL DOGS when used as dump trucks, MACK and KENWORTH, an extra low gear as they have now.

With Hydraulic Gearing—no tail shaft whip deflecting and bruising the differential with smoother pressure control. No or reduced tire whip or bounce from rubberized wired tires.

600+300+150. 1050. Virtually twice the torque with even a minor pressure rise.
600+300:900.
600+150:750. Change mechanical gear.
On highway use this is estimated to reduce the vehicle parasitic losses of the gears and thus fuel use by 1.5 to 2%.

Each of the following non-limiting examples described above and below as aspects/techniques can stand on its own, or can be combined in various permutations or combinations with one or more of the other examples.

In some aspects, the techniques described herein relate to a system including: a plurality of hydraulic devices arranged in-line in a series arrangement with one another with one or more shafts, each of the hydraulic devices including: a rotor disposed for rotation about an axis; a plurality of vanes, each of the plurality of vanes moveable relative to the rotor between a retracted position and an extended position where the plurality of vanes are configured to work a hydraulic fluid introduced adjacent the rotor; and a ring disposed at least partially around the rotor.

In some aspects, the techniques described herein relate to a system, further including a torque generating device coupled to one or more of the plurality of hydraulic devices via the one or more shafts.

In some aspects, the techniques described herein relate to a system, wherein the one or more shafts include a thru shaft, and wherein one or more of the plurality of hydraulic devices are coupled to the thru shaft.

In some aspects, the techniques described herein relate to a system, further including an energy storage device in fluid communication with the plurality of hydraulic devices, wherein the hydraulic fluid is selectively operable as a starter motor for the torque generating device using the hydraulic fluid supplied from the energy storage device.

In some aspects, the techniques described herein relate to a system, wherein energy storage device includes one or more accumulators.

In some aspects, the techniques described herein relate to a system, further including a valve assembly configured to regulate pressure of the hydraulic fluid to or from the one or more accumulators.

In some aspects, the techniques described herein relate to a system, wherein the valve assembly is configured to intensify the pressure of the hydraulic fluid to the one or more accumulators.

In some aspects, the techniques described herein relate to a system, further including a controller operable to control a system operation mode based on a plurality of vehicle operation parameters.

In some aspects, the techniques described herein relate to a system, wherein the system is configured to operate each of the plurality of hydraulic devices independently as one of a thru drive coupling, a power split coupling or vane pump, and wherein the system operation modes includes controlling the plurality of hydraulic devices and optionally one or more accessories in one or more of a torque amplification mode, a starter motor mode, a drive assist mode, an engine regenerative recharge mode and a regenerative recharge breaking mode.

In some aspects, the techniques described herein relate to a system, wherein a fluid communicating interior portion of the hydraulic device and the one or more accessories are coated in a diamond or diamond-like carbon, and wherein the hydraulic fluid includes glycol or water-glycol.

In some aspects, the techniques described herein relate to a vehicle system including: a drive line included of one or more shafts; a plurality of hydraulic devices arranged in series along the drive line, wherein each of the plurality of hydraulic devices is configured to be operable as vane pump in a first mode of operation and configured to be operable as a hydraulic coupling to couple the at least one input shaft with the at least one output shaft in a second operation.

In some aspects, the techniques described herein relate to a vehicle system, wherein some of the plurality of hydraulic devices are operable as the hydraulic couplings while others of the plurality of hydraulic devices are operable as vane pumps.

In some aspects, the techniques described herein relate to a vehicle system, wherein one or more accessories in fluid communication with the plurality of hydraulic devices and configured to receive a hydraulic fluid from one or more the plurality of hydraulic devices.

In some aspects, the techniques described herein relate to a vehicle system, wherein the one or more accessories include one or more of a hydraulic pump motor, an accumulator, and one or more auxiliary systems.

In some aspects, the techniques described herein relate to a vehicle system, further including a valve assembly configured to intensify the pressure of the hydraulic fluid to the accumulator.

In some aspects, the techniques described herein relate to a vehicle system, wherein the plurality of hydraulic devices include roller bearings.

In some aspects, the techniques described herein relate to a vehicle system, wherein at least one of the plurality of hydraulic devices are mounted to the drive line and allow for passage of the drive line therethrough as a single shaft.

In some aspects, the techniques described herein relate to a vehicle system, wherein one or more of the plurality of hydraulic devices has four or more chambers in which the hydraulic fluid is worked.

In some aspects, the techniques described herein relate to a vehicle system, wherein the plurality of hydraulic devices are arranged between and transfer torque between: an output gear assembly; and a torque generating device coupled to the plurality of hydraulic devices via the drive line.

In some aspects, the techniques described herein relate to a method including: providing a plurality of hydraulic devices arranged in series along a driveline of a vehicle, each of the plurality of hydraulic devices are configured to be selectively operable as one of a hydraulic coupling and a vane pump; and controlling the plurality of hydraulic devices and optionally one or more accessories to operate together as either the hydraulic coupling or vane pump in various operation modes including at least one of a torque amplification mode, a starter motor mode, a drive assist mode, an engine regenerative recharge mode and a regenerative recharge breaking mode.

In some aspects, the techniques described herein relate to a method, including pumping a hydraulic fluid from one or more of the plurality of hydraulic devices to the one or more accessories through a valve assembly that is configured to intensify the pressure of the hydraulic fluid.

In some aspects, the techniques described herein relate to a method, further including directing a hydraulic fluid from the one or more accessories to one or more of the plurality of hydraulic vane devices through a valve assembly.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplate examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is drive in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A system comprising:
a plurality of hydraulic devices comprising at least four hydraulic devices arranged in-line in a series arrangement with one another with one or more shafts, each of the plurality of hydraulic devices comprising:
a rotor disposed for rotation about an axis;
a plurality of vanes, each of the plurality of vanes moveable relative to the rotor between a retracted position and an extended position where the plurality of vanes are configured to work a hydraulic fluid introduced adjacent the rotor; and
a ring disposed at least partially around the rotor;
a torque generating device coupled to one or more of the plurality of hydraulic devices via the one or more shafts; and
an energy storage device in fluid communication with the plurality of hydraulic devices;
wherein the system includes a plurality of operation modes controlling the plurality of hydraulic devices including a starter motor mode where the plurality of vanes of less than all of the at least four hydraulic devices are in the extended position and the less than all of the at least four hydraulic devices are provided with a hydraulic fluid from the energy storage device to create an angular velocity that is transferred to and used to start the torque generating device via the one or more shafts.

2. The system of claim 1, wherein the one or more shafts include a thru shaft, and wherein one or more of the plurality of hydraulic devices are coupled to the thru shaft.

3. The system of claim 1, wherein the energy storage device comprises one or more accumulators.

4. The system of claim 3, further comprising a valve assembly configured to regulate pressure of the hydraulic fluid to or from the one or more accumulators.

5. The system of claim 4, wherein the valve assembly is configured to intensify the pressure of the hydraulic fluid to the one or more accumulators.

6. The system of claim 1, further comprising a controller operable to control a system operation mode based on a plurality of vehicle operation parameters.

7. The system of claim 1, wherein the system is configured to operate each of the plurality of hydraulic devices independently as one of a thru drive coupling, a power split coupling or vane pump, and wherein the system includes further of the plurality of operation modes controlling the plurality of hydraulic devices and optionally one or more accessories in a torque amplification mode, a drive assist mode, an engine regenerative recharge mode and a regenerative recharge breaking mode.

8. The system of claim 1, wherein a fluid communicating interior portion of each of the plurality of hydraulic devices and one or more accessories are coated in a diamond or diamond-like carbon, and wherein the hydraulic fluid comprises glycol or water-glycol.

9. A vehicle system comprising:
a torque generating device;
a drive line comprised of one or more shafts including an input shaft; and
a plurality of hydraulic devices arranged in series along the drive line and coupled to the torque generating device via the drive line, wherein each of the plurality of hydraulic devices is configured to be simultaneously operable in a vane capture mode during idle of the torque generating device, wherein the vane capture mode prevents vanes of the plurality of hydraulic devices from extending by locking the vanes in a retracted position thereby preventing any pumping or motoring.

10. The vehicle system of claim 9, wherein some of the plurality of hydraulic devices are operable as hydraulic couplings while others of the plurality of hydraulic devices are operable as vane pumps.

11. The vehicle system of claim 9, wherein one or more accessories in fluid communication with the plurality of hydraulic devices and configured to receive a hydraulic fluid from one or more the plurality of hydraulic devices.

12. The vehicle system of claim 11, wherein the one or more accessories include one or more of a hydraulic pump motor, an accumulator, and one or more auxiliary systems.

13. The vehicle system of claim 12, further comprising a valve assembly configured to intensify a pressure of the hydraulic fluid to the accumulator.

14. The vehicle system of claim 9, wherein the plurality of hydraulic devices include roller bearings.

15. The vehicle system of claim 9, wherein at least one of the plurality of hydraulic devices are mounted to the drive line and allow for passage of the drive line therethrough as a single shaft.

16. The vehicle system of claim 9, wherein one or more of the plurality of hydraulic devices has four or more chambers in which a hydraulic fluid is worked.

17. The vehicle system of claim 9, wherein the plurality of hydraulic devices are arranged between and transfer torque between:
an output gear assembly; and
a torque generating device coupled to the plurality of hydraulic devices via the drive line.

18. A method comprising:
providing a plurality of hydraulic devices comprising between four and eight hydraulic devices arranged in series along a driveline of a bus, each of the plurality of hydraulic devices are configured to be selectively operable as one of a hydraulic coupling and a vane pump; and
controlling the plurality of hydraulic devices and one or more accessories to operate together as either a hydraulic coupling or a vane pump in various operation modes including at least one of a torque amplification mode, a starter motor mode where less than all of the plurality of hydraulic devices are selectively operable to start a torque generating device, a drive assist mode, an engine regenerative recharge mode and a regenerative recharge breaking mode.

* * * * *